(12) United States Patent
Kajihara et al.

(10) Patent No.: US 8,503,031 B2
(45) Date of Patent: Aug. 6, 2013

(54) IMAGE PROCESSING APPARATUS AND IMAGE PROCESSING METHOD

(75) Inventors: Rie Kajihara, Minoo (JP); Akitoshi Yamada, Yokohama (JP); Mitsuhiro Ono, Tokyo (JP); Tomokazu Ishikawa, Kawasaki (JP); Yuji Konno, Kawasaki (JP); Yutaka Kano, Yokohama (JP); Hitoshi Nishikori, Inagi (JP); Norihiro Kawatoko, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 274 days.

(21) Appl. No.: 12/962,044

(22) Filed: Dec. 7, 2010

(65) Prior Publication Data

US 2011/0075174 A1 Mar. 31, 2011

Related U.S. Application Data

(63) Continuation of application No. PCT/JP2010/004040, filed on Jun. 17, 2010.

(30) Foreign Application Priority Data

Jun. 18, 2009 (JP) ................................ 2009-145719

(51) Int. Cl.
*H04N 1/60* (2006.01)
(52) U.S. Cl.
USPC ......... 358/1.9; 358/3.01; 358/3.03; 358/3.05; 358/3.26
(58) Field of Classification Search
USPC ............. 358/1.9, 3.01, 3.03, 3.05, 1.15, 3.23, 358/3.26, 518
See application file for complete search history.

(56) References Cited

U.S. PATENT DOCUMENTS

| 6,511,143 B1 | 1/2003 | Ishikawa |
| 6,525,838 B1 * | 2/2003 | Nagae et al. ................. 358/3.01 |

(Continued)

FOREIGN PATENT DOCUMENTS

| JP | 8-58119 | 5/1996 |
| JP | 2000-103088 | 4/2000 |

(Continued)

OTHER PUBLICATIONS

Notification of Transmittal of Translation of the International Preliminary Report on Patentability (Jan. 26, 2012), International Preliminary Report on Patentability (Jan. 17, 2012) and Translation of the Written Opinion of the International Searching Authority dated Sep. 21, 2010, issued during prosecution of related PCT application No. PCT/JP2010/004040.

(Continued)

*Primary Examiner* — Kimberly A Williams
(74) *Attorney, Agent, or Firm* — Fitzpatrick, Cella, Harper & Scinto

(57) ABSTRACT

The image processing apparatus executes quantization processing of second multi-valued image data that corresponds to a second relative movement of a plurality of relative movements based on first multi-valued image data that corresponds to a first relative movement of the plurality of relative movements, and executes quantization processing of the first multi-valued image data based on the second multi-valued image data. This makes it possible to output a high-quality image having excellent robustness and reduced graininess by controlling the overlap rate of dots that are printed by the first relative movement and the dots that are printed by the second relative movement.

20 Claims, 29 Drawing Sheets

U.S. PATENT DOCUMENTS

| | | | |
|---|---|---|---|
| 6,967,745 B1 | 11/2005 | Konno | |
| 7,002,708 B2 * | 2/2006 | Damera-Venkata | 358/1.9 |
| 7,099,046 B2 | 8/2006 | Yamada | |
| 7,312,901 B2 | 12/2007 | Yamada | |
| 7,327,491 B2 * | 2/2008 | Kato et al. | 358/1.9 |
| 7,352,489 B2 * | 4/2008 | Chang | 358/1.9 |
| 7,379,211 B2 * | 5/2008 | Ishii et al. | 358/3.03 |
| 7,548,346 B2 | 6/2009 | Yamada | |
| 7,672,011 B2 | 3/2010 | Kato | |
| 7,855,809 B2 | 12/2010 | Kato | |
| 7,859,723 B2 | 12/2010 | Yamada | |
| 7,965,418 B2 | 6/2011 | Yamada | |
| 7,982,916 B2 * | 7/2011 | Spaulding et al. | 358/3.03 |
| 8,098,403 B2 * | 1/2012 | Spaulding et al. | 358/3.03 |
| 2009/0268226 A1 * | 10/2009 | Horii | 358/1.14 |
| 2011/0085183 A1 | 4/2011 | Tsuchiya | |
| 2011/0085189 A1 | 4/2011 | Sano | |
| 2011/0116115 A1 | 5/2011 | Kawotoko | |

FOREIGN PATENT DOCUMENTS

| | | |
|---|---|---|
| JP | 2001-150700 | 5/2001 |
| JP | 2002-171407 | 6/2002 |
| JP | 2004-9534 | 1/2004 |

OTHER PUBLICATIONS

Japanese Office Action dated Mar. 9, 2012 issued during prosecution of related Japanese application No. 2009-145719 (includes whole English-language translation).

* cited by examiner

FIG.7A

FIRST PLANE

| 1 | 0 | 0 | 1 |
|---|---|---|---|
| 0 | 1 | 0 | 0 |
| 0 | 0 | 1 | 0 |

SECOND PLANE

| 0 | 0 | 1 | 0 |
|---|---|---|---|
| 1 | 0 | 0 | 0 |
| 0 | 1 | 0 | 1 |

FIG.7B

FIRST PLANE

| 1 | 0 | 0 | 1 |
|---|---|---|---|
| 0 | 1 | 0 | 0 |
| 0 | 0 | 1 | 0 |

SECOND PLANE

| 0 | 0 | 1 | 0 |
|---|---|---|---|
| 1 | 1 | 0 | 0 |
| 0 | 0 | 0 | 1 |

FIG.7C

FIRST PLANE

| 1 | 0 | 0 | 1 |
|---|---|---|---|
| 0 | 1 | 0 | 0 |
| 0 | 0 | 1 | 0 |

SECOND PLANE

| 0 | 0 | 0 | 1 |
|---|---|---|---|
| 1 | 1 | 0 | 0 |
| 0 | 0 | 0 | 1 |

FIG.7D

FIRST PLANE

| 1 | 0 | 0 | 1 |
|---|---|---|---|
| 0 | 1 | 0 | 0 |
| 0 | 0 | 1 | 0 |

SECOND PLANE

| 1 | 0 | 0 | 1 |
|---|---|---|---|
| 0 | 1 | 0 | 0 |
| 0 | 0 | 0 | 1 |

FIG.7E

FIRST PLANE

| 1 | 0 | 0 | 1 |
|---|---|---|---|
| 0 | 1 | 0 | 0 |
| 0 | 0 | 1 | 0 |

SECOND PLANE

| 1 | 0 | 0 | 1 |
|---|---|---|---|
| 0 | 1 | 0 | 0 |
| 0 | 0 | 1 | 0 |

FIG.7F

FIRST PLANE

| 1 | 0 | 0 | 1 |
|---|---|---|---|
| 0 | 1 | 0 | 0 |
| 0 | 0 | 1 | 0 |

SECOND PLANE

| 0 | 0 | 0 | 1 |
|---|---|---|---|
| 0 | 1 | 0 | 0 |
| 0 | 0 | 1 | 0 |

FIG.7G

FIRST PLANE

| 1 | 0 | 0 | 1 |
|---|---|---|---|
| 0 | 1 | 0 | 0 |
| 0 | 0 | 1 | 0 |

SECOND PLANE

| 0 | 0 | 0 | 0 |
|---|---|---|---|
| 0 | 1 | 0 | 0 |
| 0 | 0 | 0 | 1 |

FIG.7H

| | TOTAL NUMBER OF DOTS | NUMBER OF OVERLAPPING DOTS | DOT OVERLAP RATE (%) |
|---|---|---|---|
| (A) | 8 | 0 | 0 (=0÷8×100) |
| (B) | 8 | 2 | 25 (=2÷8×100) |
| (C) | 8 | 4 | 50 (=4÷8×100) |
| (D) | 8 | 6 | 75 (=6÷8×100) |
| (E) | 8 | 8 | 100 (=8÷8×100) |
| (F) | 7 | 6 | 86 (=6÷7×100) |
| (G) | 6 | 2 | 33 (=2÷6×100) |

DIFFUSION MATRIX A

|   | ● | 9 | 3 |
|---|---|---|---|
| 5 | 9 | 3 |   |
|   | 3 |   |   |

● PIXEL TO BE PROCESSED

FIG.13A

DIFFUSION MATRIX B

|   |   | ● | 2 | 1 |
|---|---|---|---|---|
| 1 | 1 | 2 | 1 |   |

● PIXEL TO BE PROCESSED

FIG.13B

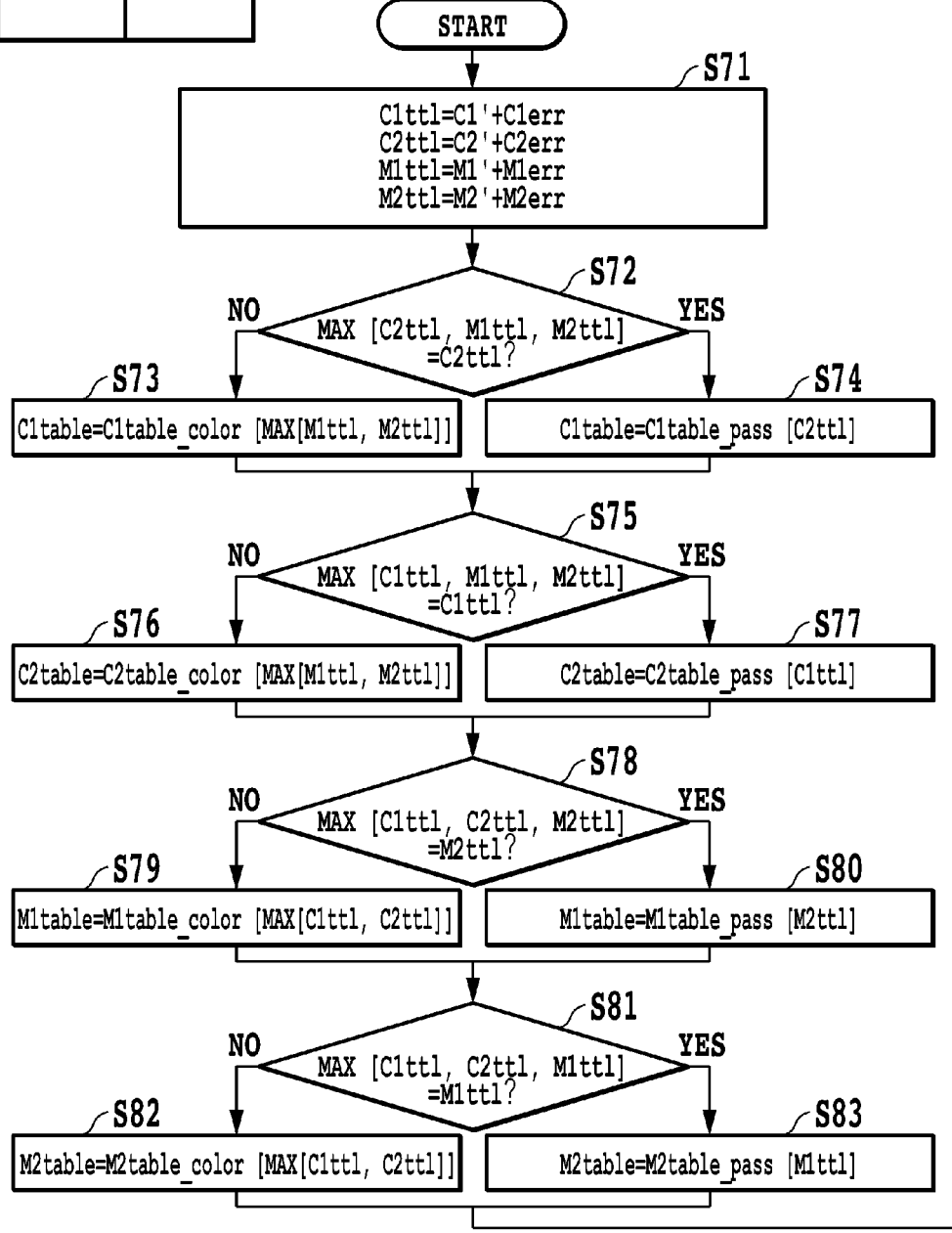

IMAGE PROCESSING APPARATUS AND IMAGE PROCESSING METHOD

This application is a continuation application of International Application No. PCT/JP2010/004040, having an international filing date of Jun. 17, 2010, which claims priority to Japanese Application 2009-145719, filed on Jun. 18, 2009, the contents of each of which are incorporated by reference herein.

BACKGROUND OF THE INVENTION

1. Field of the Invention

The present invention relates to an image processing apparatus and image processing method that process multi-valued image data that corresponds to a same area in order to print images in the same area by relatively moving a print means a plurality of times or by relatively moving a plurality of printing element groups with respect to the same area of a printing medium.

2. Description of the Related Art

An inkjet printing method that prints dots on a printing medium by ejecting ink from printing elements (nozzles) is known as an example of a printing method that uses a printing head comprising a plurality of printing elements for printing dots. This kind of inkjet printing apparatus can be categorized as full-line type or serial type according to differences in construction. Regardless of whether the device is full-line type or serial type, variation occurs in the ejection amount and ejecting direction of the plurality of printing elements of the printing head. In addition, due to these kinds of variations, density unevenness or stripes may occur in the image.

A multi-pass printing method is known as technology for reducing this kind of density unevenness or stripes. In the multi-pass printing method, image data that is to be printed on the same area of a printing medium is divided into image data to be printed in a plurality of printing scans. Moreover, the divided image data is sequentially printed according to the plurality of printing scans with a conveying operation in between each printing scan. By doing so, even though there are variations in ejection characteristics of each of the individual print element, it is possible to disperse the effect of individual print elements over a wide range without the dots printed by one print element being continuous in the scanning direction. As a result, it is possible to obtain a uniform and smooth image.

This kind of multi-pass printing method can be applied to either a serial type or full-line type printing device that comprise a plurality of printing heads (or a plurality of printing element groups) that eject the same kind of ink. That is, image data is divided into image data that is to be printed by a plurality of printing element groups that eject the same kind of ink, and that divided image data is printed during at least one relative movement for each of the plurality of printing element groups. As a result, even though there is variation in the ejection characteristics of the individual print elements, it is possible to reduce the effect of that variation. Furthermore, it is possible to combine the two printing methods described above, and to print an image by performing printing scanning a plurality of times while using a plurality of printing element groups that eject the same kind of ink.

Conventionally, in performing this kind of division of image data, masks were used for which data that allows printing of dots (1: data that does not mask image data) and data that does not allow printing of dots (0: data that masks image data) are arranged beforehand. More specifically, by performing a logical AND operation between binary image data to be printed on the same area of a printing medium and the aforementioned mask, the binary image data is divided into binary image data that is to be printed by each printing scan or each printing head.

In this kind of mask, the arrangement of data that allows printing (1) is set so that there is a complementary relationship between the plurality of printing scans (or plurality of printing heads). In other words, pixels that are set to be printed (1) by the binarized image data are such that one dot is printed by either one printing scan or one printing head. By doing so, the image information before division is saved even after division.

However, recently, by performing the multi-pass printing described above, a new problem has emerged in that changes in density or density unevenness occur due to printing position displacement (registration) in units of printing scans or printing heads (printing element groups). The shift in the printing position in printing scan units or printing element group units referred to here is as described below. That is, this shift is a shift between dot groups (planes) such as a shift in the dot group (plane) that is printed by the first printing scan (or a printing element group) and the dot group (plane) that is printed by the second printing scan (or a different printing element group). The shift between these planes is caused by fluctuation in the distance between the printing medium and the ejection port face and fluctuation in the amount the printing medium is conveyed. In addition, when shifting does occur between planes, there is fluctuation in the dot coverage, which causes density fluctuation or density unevenness in image. As was described above, dot groups and pixel groups that are printed by the same printing scan and the same unit (for example, one printing element group that ejects the same kind of ink) is hereafter called a 'plane'.

As described above, recently there is a demand for even higher quality images, and a data image processing method during multi-pass printing that is capable of tackling a shift in the printing position between planes that is caused by fluctuation of various printing conditions is desired. Hereafter, in this specification, resistance to density fluctuation or density unevenness that is caused by shifting in the printing position between planes due to any printing condition is referred to as 'robustness'.

Japanese Patent Laid-Open No. 2000-103088 and Japanese Patent Laid-Open No. 2001-150700 disclose an image data processing method for improving robustness. These disclosures focus on that fluctuation of image density due to fluctuation of various printing conditions is caused by a perfect complementary relationship between the binary image data after being distributed so that the image data corresponds to different printing scans or different printing element groups. Moreover, these disclosures point out that by creating image data that corresponds to different printing scans or different printing element groups such that the complementary relationship is reduced, it is possible to achieve multi-pass printing with excellent 'robustness'. Furthermore, in these disclosures, in order that large density fluctuation does not occur even when there is shifting between a plurality of planes, multi-valued image data before binarization is divided so that the image data corresponds to different printing scans or printing element groups, and that divided multi-valued image data is then binarized independently (without correlation).

FIG. 10 is a block diagram for explaining the image data processing method that is disclosed in Japanese Patent Laid-Open No. 2000-103088 or Japanese Patent Laid-Open No. 2001-150700. Here, the case is illustrated in which multi-valued image data is distributed for two printing scans. The multi-valued image data (RGB) that is inputted from a host computer is converted by a palette conversion process 12 to multi-value density data (CMYK) that corresponds to the ink color of the printing apparatus. After that, the multi-value density data (CMYK) undergoes gradation correction by a gradation correction process. The following processing is performed independently for each of the colors black (K), cyan (C), magenta (M) and yellow (Y).

The multi-value density data of each color is distributed by an image data distribution process 14 for first scan multi-value data 15-1 and second scan multi-value data 15-2. In other words, when the value of multi-valued image data for black is '200', for example, the image data '100', which corresponds to half of '200', is distributed for the first scan, and similarly, the image data '100' is distributed for the second scan. After that, the multi-value data 15-1 for the first scan undergoes quantization processing by a first quantization process 16-1 according to a specified diffusion matrix, then is converted to binary data 17-1 for the first scan and stored in a band memory for the first scan. On the other hand, the multi-value data 15-2 for the second scan undergoes quantization processing by a second quantization process 16-2 according to a different diffusion matrix, then is converted to binary data 17-2 for the second scan and stored in a band memory for the second scan. In the first printing scan and second printing scan, ink is ejected according to the binary data that is stored in the respective band memory. In FIG. 10, the case of distributing one image data for two printing scans was explained; however, in Japanese Patent Laid-Open No. 2000-103088 and Japanese Patent Laid-Open No. 2001-150700, the case in which the one image is distributed for two printing heads (two printing element groups) is also disclosed.

FIG. 6A is a diagram that illustrates the arrangement state of dots (black dots) 1401 to be printed in a first printing scan and dots (white dots) 1402 to be printed in a second printing scan when dividing image data using a mask pattern having a complementary relationship. Here, the case is illustrated in which 255 density data are inputted for all of the pixels, and one dot is printed for all of the pixels by either the first printing scan or second printing scan. In other words, the dots that are printed by the first printing scan and the dots that are printed by the second printing scan are arranged so that they do not overlap each other.

On the other hand, FIG. 6B is a diagram that illustrates the arrangement state of dots when distributing the image data according to the method disclosed in Japanese Patent Laid-Open No. 2000-103088 and Japanese Patent Laid-Open No. 2001-150700. In the diagram, the black dots are dots 1501 that are to be printed in a first printing scan, the white dots are dots 1502 that are to be printed in a second printing scan, and the gray dots are dots 1503 that are printed by overlapping of the first printing scan and second printing scan. In FIG. 6B, there is no complementary relationship between the dots to be printed by the first printing scan and the dots to be printed by the second printing scan. Therefore, when compared with the case in FIG. 6A where the dots are in a complete complementary relationship, portions (gray dots) 1503 occur where two dots overlap, and there are blank areas where no dots are printed.

Here, the case is considered in which a first plane, which is a collection of dots to be printed by the first printing scan, and a second plane, which is a collection of dots to be printed in the second printing scan, are shifted by the amount of one pixel in either the main scanning direction or the sub-scanning direction. In that case, when the first plane and second plane are in a complete complementary relationship as in FIG. 6A, the dots that are printed in the first plane completely overlap the dots that are printed in the second plane, so areas of blank paper are exposed, and there is a large drop in image density. Even when there is shifting that is not as large as one pixel, fluctuation of distance between or overlapping of adjacent dots greatly affects the coverage of dots in blank areas and image density. That is, it is known that when this kind of shifting between planes changes according to fluctuation in the distance between the printing medium and the ejection port face (distance to the paper), or fluctuation in the amount the printing medium is conveyed, that the image density will also fluctuate, causing density unevenness.

On the other hand, in the case of FIG. 6B, even when there is shifting as much as the amount of one pixel between the first plane and second plane, there is not much fluctuation in coverage of dots on the printing medium. Areas where there is overlap of the dots that are printed in the first printing scan and the dots that are printed in the second printing scan newly appear; however, there are also areas where two dots that were already overlapping are separated. Therefore, when making a judgment over a large area, there is not much fluctuation of the coverage of the dots on the printing medium, so it is also difficult for fluctuation in image density to occur. In other words, by employing the method disclosed in Japanese Patent Laid-Open No. 2000-103088 or Japanese Patent Laid-Open No. 2001-150700, even though there is fluctuation in the distance between the printing medium and the ejection port face (distance to the paper) or fluctuation in the amount the printing medium is conveyed, it is possible to suppress the fluctuation in image density or density unevenness that is caused by these, and thus it is possible to output an image having excellent robustness.

However, in the method disclosed in Japanese Patent Laid-Open No. 2000-103088 or Japanese Patent Laid-Open No. 2001-150700, the plurality of planes are not correlated with the binary data, so there may be cases in which graininess becomes worse. For example, as illustrated in FIG. 9A, when taken from the aspect of reducing graininess, in highlighted portions, the ideal is to disperse dots evenly while maintain a certain amount of distance between the small number of dots (1701, 1702). However, as illustrated in FIG. 9B, in construction in which the plurality of planes are not correlated with the binary data, locations (1603) where dots overlap, and locations (1601, 1602) where dots are printed touch each other occur irregularly, this clump of dots causes the graininess to become worse.

SUMMARY OF THE INVENTION

In consideration of the problems described above, the object of the present invention is to provide an image processing apparatus and image processing method that are capable of suppressing density fluctuation and keeping graininess low.

The first aspect of the present invention is an image processing apparatus for processing input image data that corresponds to a pixel area in order to perform printing in the pixel area by a plurality of relative movement including a first relative movement and a second relative movement of a print unit with respect to a printing medium, comprising: a generation unit configured to generate, based on the input image data, first multi-valued image data that corresponds to the first relative movement and second multi-valued image data that corresponds to the second relative movement; and a quantization unit configured to perform quantization processing of the second multi-valued image data based on the first multi-valued image data, and perform quantization processing of the first multi-valued image data based on the second multi-valued image data.

The second aspect of the present invention is an image processing apparatus for processing input image data that corresponds to a pixel area in order to execute printing in the pixel area by a plurality of relative movements of a print unit and a printing medium, comprising: a generation unit configured to generate, based on the input image data, first multi-valued image data that corresponds to at least one relative movement among the plurality of relative movements and second multi-valued image data that corresponds to at least one other relative movement among the plurality of relative movements; and a quantization unit configured to perform quantization processing of the second multi-valued image data based on the first multi-valued image data, and perform quantization processing of the first multi-valued image data based on the second multi-valued image data.

The third aspect of the present invention is an image processing apparatus for processing input image data that corresponds to a pixel area in order to print in the pixel area by a relative movement of a plurality of printing element groups, which eject ink of the same color in nearly equal amount, with respect to a printing medium, comprising: a generation unit configured to generate, based on the input image data, first multi-valued image data that corresponds to at least one printing element group among the plurality of printing element groups and second multi-valued image data that corresponds to at least one other printing element group among the plurality of printing element groups; and a quantization unit configured to perform quantization processing of the second multi-valued image data based on the first multi-valued image data, and perform quantization processing of the first multi-valued image data based on the second multi-valued image data.

The fourth aspect of the present invention is an image processing apparatus for processing input image data that corresponds to a pixel area in order to perform printing in the pixel area by a plurality of relative movements of a first printing element group for discharging a first color of ink and a second printing element group for discharging a second color of ink with respect to a printing medium, comprising: a generation unit configured to generate, based on the input image data, first multi-valued image data for the first printing element group that corresponds to a preceding relative movement, second multi-valued image data for the second printing element group that corresponds to the preceding relative movement, third multi-valued image data for the first printing element group that corresponds to a following relative movement, and fourth multi-valued image data for the second printing element group that corresponds to the following relative movement; and a quantization unit configured to perform quantization processing of the first multi-valued image data based on the second, third and fourth multi-valued image data, perform quantization processing of the second multi-valued image data based on the first, third and fourth multi-valued image data, perform quantization processing of the third multi-valued image data based on the first, second and fourth multi-valued image data, and perform quantization processing of the fourth multi-valued image data based on the first, second and third multi-valued image data.

The fifth aspect of the present invention is an image processing method for processing input image data that corresponds to a pixel area in order to perform printing in the pixel area by a plurality of relative movements, including a first relative movement and second relative movement, of a print unit with respect to a printing medium, comprising the steps of: generating, based on the input image data, first multi-valued image data that corresponds to the first relative movement and second multi-valued image data that corresponds to the second relative movement; and performing quantization processing of the second multi-valued image data based on the first multi-valued image data, and perform quantization processing of the first multi-valued image data based on the second multi-valued image data.

The sixth aspect of the present invention is an image processing method for processing input image data that corresponds to a pixel area in order to perform printing in the pixel area by a plurality of relative movements of a print unit with respect to a printing medium, comprising the steps of: generating, based on the input image data, first multi-valued image data that corresponds to at least one relative movement among the plurality of relative movements and second multi-valued image data that corresponds to at least one other relative movement among the plurality of relative movements; and performing quantization processing of the second multi-valued image data based on the first multi-valued image data, and perform quantization processing of the first multi-valued image data based on the second multi-valued image data.

The seventh aspect of the present invention is an image processing method for processing input image data that corresponds to a pixel area in order to print in the pixel area by a relative movement of a plurality of printing element groups, which eject ink of the same color in nearly equal amount, with respect to a printing medium, comprising the steps of: generating, based on the input image data, first multi-value data that corresponds to at least one printing element group among the plurality of printing element groups and second multi-valued image data that corresponds to at least one other printing element group among the plurality of printing element groups; and performing quantization processing of the second multi-valued image data based on the first multi-valued image data, and perform quantization processing of the first multi-valued image data based on the second multi-valued image data.

Further features of the present invention will become apparent from the following description of exemplary embodiments (with reference to the attached drawings).

BRIEF DESCRIPTION OF THE DRAWINGS

FIGS. 7A to 7H are diagrams for explaining dot overlap rate;

FIGS. 13A and 13B are diagrams illustrating an example of an error diffusion matrix that is used in quantization processing;

FIG. 16 is a diagram showing the relationship of FIGS. 16A and 16B.

FIG. 16A is a flowchart for explaining the processing when the control unit 3000 executes quantization processing;

DESCRIPTION OF THE EMBODIMENTS

In the following, embodiments of the present invention will be explained in detail with reference to the accompanying drawings.

The embodiments that will be described below are examples of an inkjet printing apparatus; however, the present invention is not limited to an inkjet printing apparatus. The invention can also be applied to devices other than an inkjet printing apparatus as long as the device uses a method of printing images on a printing medium by a print means while moving the print unit for printing dots relative to the printing medium.

Moreover, 'relative movement' between the print means and printing medium is an operation of the print means moving (scanning) relative to the printing medium, or is an operation of the printing medium moving (being conveyed) relative to the print means. In the case of executing multi-pass printing with a serial-type printing apparatus, the scanning by the printing head is executed a plurality of times so that the print means faces the same area of the printing medium a plurality of times. On the other hand, in the case of executing multi-pass printing with a full-line type printing apparatus, conveying the printing medium is executed a plurality of times so that the print means faces the same area of the printing medium a plurality of times. The print means is one or more printing element group (nozzle array) or one or more printing head.

Figure 11:
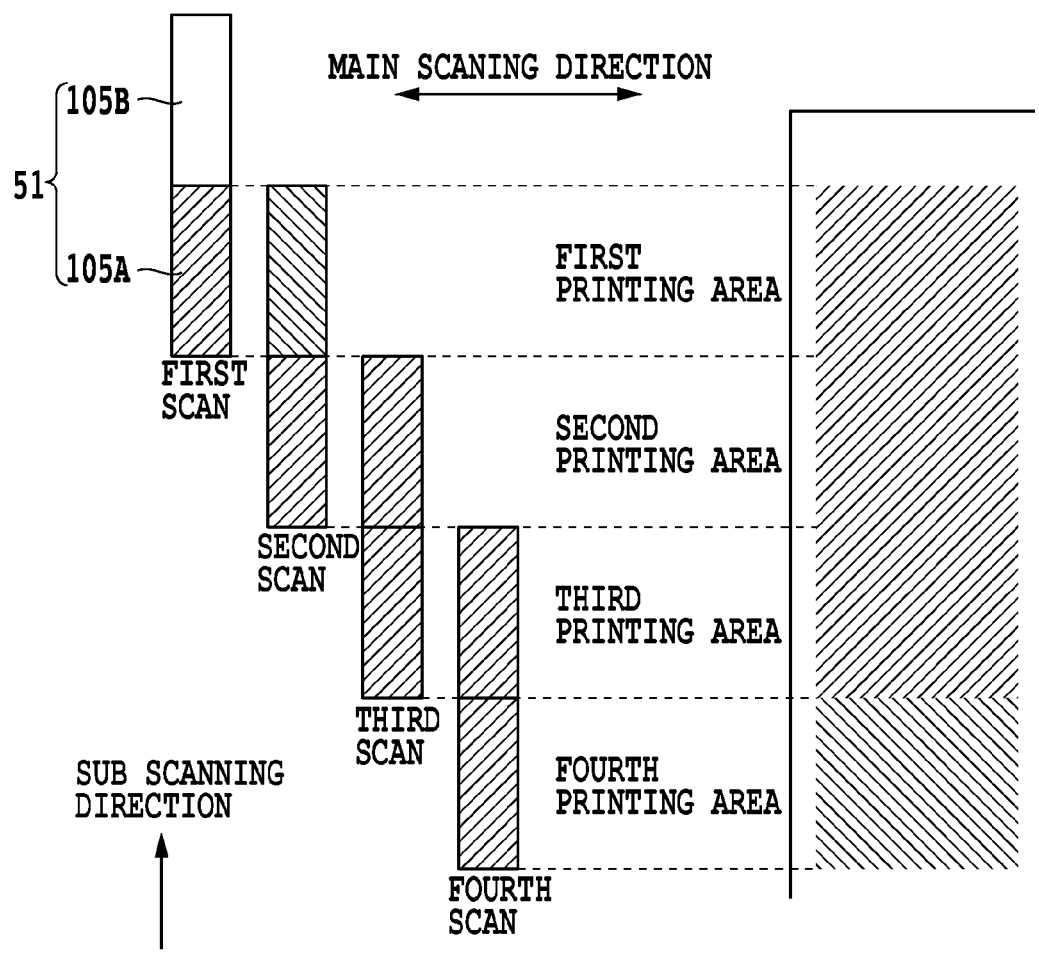
FIG. 11 is a diagram that illustrates the state of 2-pass multi-pass printing.

In the image processing apparatus described below, data is processed in order to print an image on the same area by relatively moving the print means a plurality of times, or by relatively moving a plurality of printing element groups with respect to the same area (specified area) of the printing medium. Here, the 'same area (specified area)' in a micro sense is a 'one pixel area', and in a macro sense is an 'area that can be printed during one relative movement' A pixel area may simply be referred to as a 'pixel', and is the minimum unit of area that is capable of gradation expression using multi-valued image data. On the other hand, an 'area that can be printed during one relative movement' is an area on a printing medium over which the print means passes during one relative movement, or an area that is a little smaller than this area (for example, one raster area). For example, in a serial-type printing apparatus, when executing a multi-pass mode of M (M is an integer 2 or greater) number of passes such as illustrated in FIG. 11, on a macro sense, it is possible to define one printing area in the figure as the same area.

<Summary Explanation of the Printing Apparatus>

Figure 1:
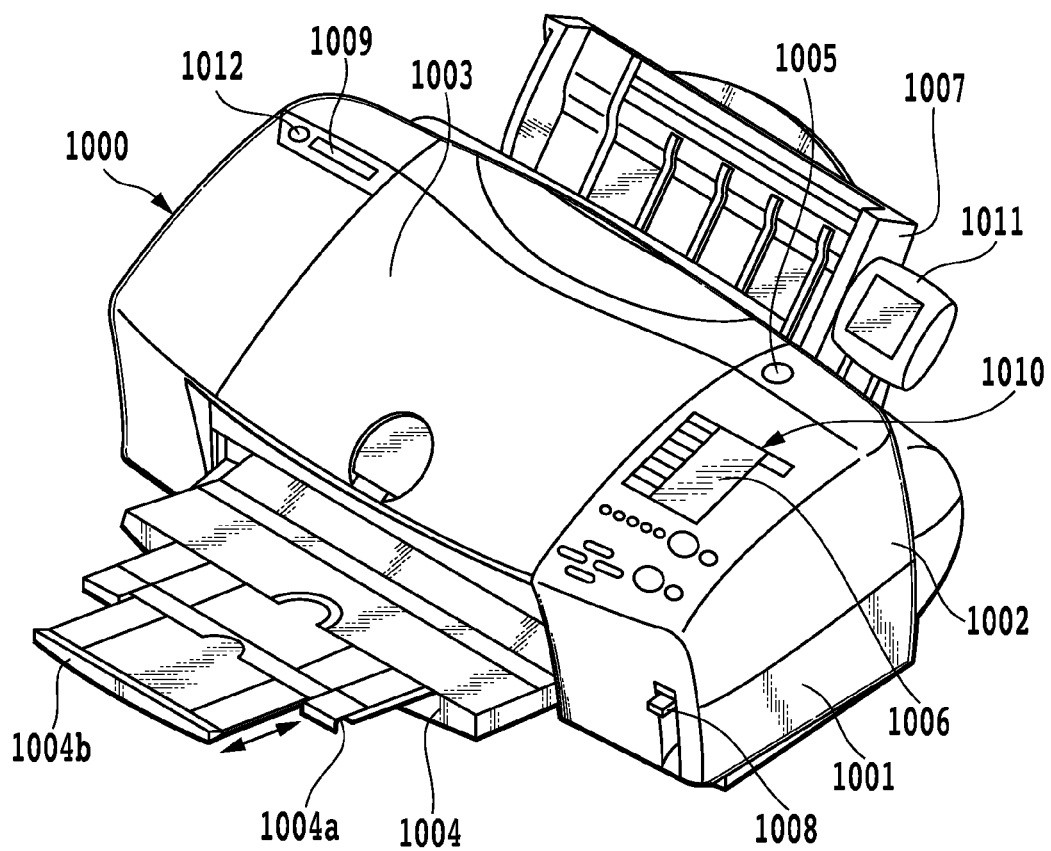
FIG. 1 is a perspective view of a photo direct printer (hereafter, referred to as a PD printer) of one embodiment of the present invention.

FIG. 1 is a perspective view of a photo direct printer (hereafter, referred to as a PD printer) 1000 of one embodiment of the present invention, or in other words is an image formation device (image processing apparatus). In addition to functioning as a normal PC printer that receives data from a host computer and prints, the PD printer 1000 has other various functions as described below. That is, there is a function of directly reading image data that is stored on a memory medium such as a memory card and printing it, and a function of receiving image data from a digital camera or PDA and printing it.

In FIG. 1, the main body of the outer shell of the PD printer 1000 of this embodiment has a bottom case 1001, top case 1002, access cover 1003, and discharge tray 1004. The bottom case 1001 forms approximately the lower half of the main body of the PD printer 1000, and the top case forms approximately the upper half of the main body. By combining both cases, an empty structure is formed having storage space for internally storing all of the mechanisms to be described later, with various opening sections being formed on the top surface and the front surface.

One end of the discharge tray 1004 is supported in the bottom case 101 so that it can be rotated freely, and by rotating the discharge tray 1004, it is possible to open or close the opening section that is formed on the front surface of the bottom case 1001. Therefore, by opening the opening section by rotating the discharge tray 1004 toward the front surface side, the printing medium (including normal paper, special paper, plastic sheets) that will be printed can be output, and the printing medium that is outputted is sequentially stacked. In addition, two supplement trays 1004a, 1004b are stored in the discharge tray 1004, and by pulling each tray forward as necessary, it is possible to increase or decrease the support surface for supporting the printing medium in three stages.

One end of the access cover 1003 is supported by the top case 1002 such that it can freely rotate, making it possible to open or close the opening section that is formed in the top surface. By opening the access cover 1003, it is possible to replace the printing head cartridge (not shown in the figure) or ink tank (not shown in the figure) that are stored inside the main body. When opening or closing the access cover 1003, a protrusion that is formed on the rear surface of the cover rotates a cover open/close lever, and by detecting the position of rotation by a micro switch etc., it is possible detect the opened/closed state of the access cover 1003.

A power key 1005 is provided on the top surface of the top case 1002. A control panel 1010 comprising a liquid-crystal display section 1006 and various key switches is provided on the right side of the top case 1002. The construction of the control panel 1010 will be described later with reference to FIG. 2. An auto feed unit 1007 automatically feeds the printing medium inside the printer. A head-to-paper distance selection lever 1008 is a lever for adjusting the space between the printing head and the printing medium. An adapter in which memory cards can be mounted is inserted into a card slot 1009, and an image can be printed by directly reading the image data that is stored on a memory card by way of this adapter. Examples of memory cards (PC) include, for example, a compact flash memory, smart media and memory stick. A viewer (liquid-crystal display section) 1011 which is detachable from PD printer 1000 is used to display one frame images or index images at a time when searching for an image to be printed from among the images stored on a PC card. There is a USB terminal 1012 for connecting a digital camera as will be described later. On the rear of the PD printer 1000, there is a USB connector for connecting a personal computer (PC).

<Summary Explanation of the Control Unit>

Figure 2:
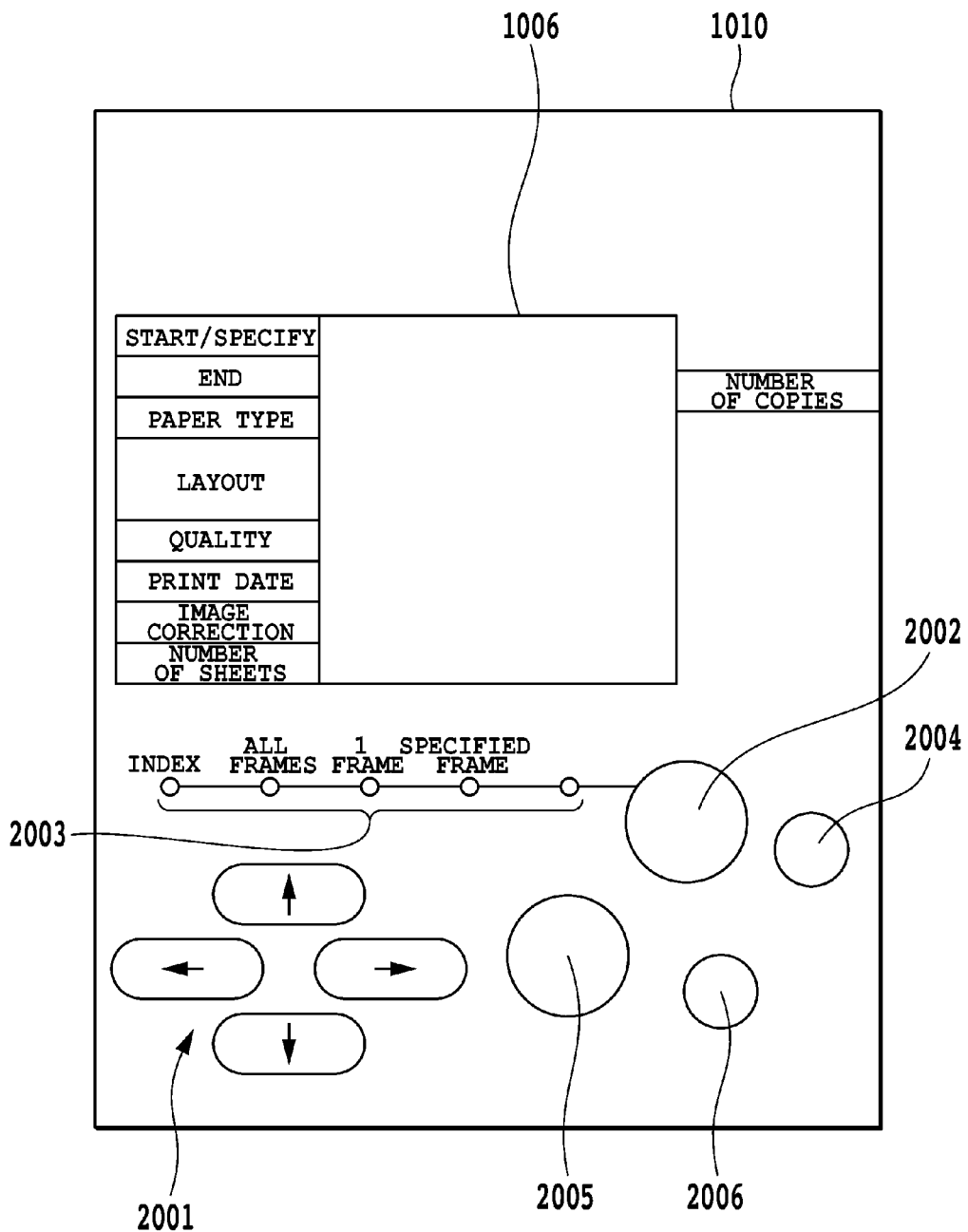
FIG. 2 is a view of the control panel 1010 of the PD printer 1000 of one embodiment of the present invention.

FIG. 2 is a view of the control panel 1010 of the PD printer 1000 of one embodiment of the present invention. In the figure, menu items for performing various settings of printing related conditions are displayed on the liquid-crystal display unit 1006. For example, the following items may be displayed.

The starting number of photographic images to be printed from among a plurality of photographic image files
Specified frame number (starting frame specification/printed frame specification)
The ending number (end) where printing is to be ended
Number of printed copies (number of copies)
Type of printing medium (paper type) to be used in printing
Setting for the number of photographs to print on one printing medium (layout)
Printing quality specification (quality)
Specification of whether or not to print the date the photo was taken (date)
Specification of whether or not to correct the photograph before printing (image correction)
Display of the number of sheets of printing medium required for printing (number of sheets)

These items can be selected or specified using a cursor key 2001. It is also possible to switch the type of printing (index printing, all frames printing, 1 frame printing, specified frame printing) each time the mode key 2002 is pressed, with an LED 2003 that corresponds to the selection lighting up. A maintenance key 2004 is a key for performing maintenance of the printing apparatus, such as cleaning of the printing head and the like. A start printing key 2005 is pressed to give an instruction to start printing, or to establish maintenance settings. A stop printing key 2006 is pressed when stopping printing or when giving an instruction to stop maintenance.

<Summary of Electrical Specifications of the Control Unit>

Figure 3:
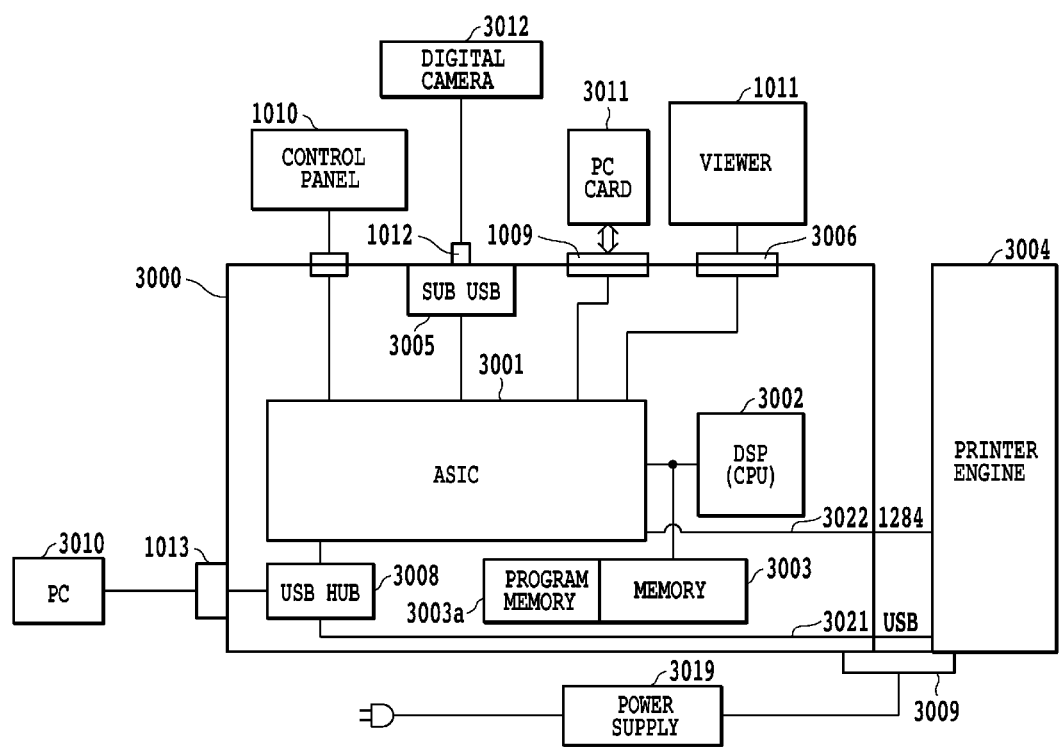
FIG. 3 is a block diagram illustrating the main parts related to control of the PD printer 1000 of one embodiment of the present invention.

FIG. 3 is a block diagram illustrating the main parts related to control of the PD printer 1000 of one embodiment of the present invention. In FIG. 3, the same reference numbers are given to parts that are common with those in the previously described figures, so an explanation of those parts will be omitted. As can be clearly seen from the following explanation, the PD printer 1000 functions as an image processing apparatus.

In FIG. 3, reference number 3000 is the control unit (control board). Also, reference number 3001 is an image processing ASIC (special customized LSI). Reference number 3002 is a DSP (Digital Signal Processor), and having an internal CPU, performs various control processing that will be described later, as well as image processing such as conversion from a brightness signal (RGB) to a density signal (CMYK), scaling, gamma conversion, error diffusion and the like. Reference number 3003 is a memory, and has a program memory 3003a that stores a control program for the CPU of the DSP 3002, a RAM area that stores programs during execution, and a memory area that functions as a work memory for storing image data and the like. Reference number 3004 is a printer engine, where here a printer engine for an inkjet printing apparatus that prints color images using a plurality of color inks is mounted. Reference number 3005 is a USB connector that is used as a port for connecting a digital camera (DSC) 3012. Reference number 3006 is a connector for connecting a viewer 1011. Reference number 3008 is a USB hub, and when the PD printer 1000 performs printing based on image data from a PC 3010, data from the PC 3010 passes through as is and output to the printer engine 3004 via the USB 3021. By doing so, the connected PC 3010 is able to execute printing by directly exchanging data and signals with the printer engine 3004 (functions as a normal PC printer). Reference number 3009 is a power connector to which power from the power supply 3010 that has been converted from commercial AC voltage to DC voltage is input. The PC 3010 is a typical personal computer, reference number 3011 is a memory card (PC card) as described above, and reference number 3012 is a digital camera (DSC: Digital Still Camera).

The exchange of signals between this control unit 3000 and the printer engine 3004 is performed via the USB 3021 described above, or an IEEE 1284 bus 3022.

<Summary of Electrical Specifications for the Printer Engine>

Figure 4:
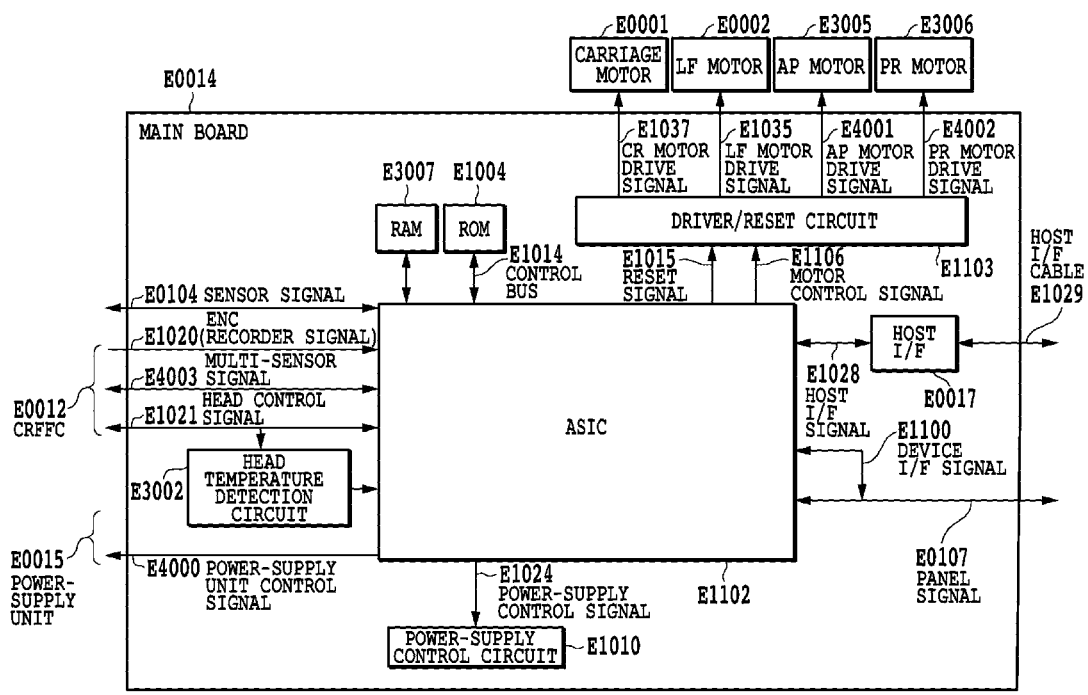
FIG. 4 is a block diagram illustrating the internal construction of a printer engine 3004 of one embodiment of the present invention.

FIG. 4 is a block diagram illustrating the internal construction of a printer engine 3004 of one embodiment of the present invention. In the figure, reference number E0014 denotes the main board. Reference number E1102 denotes an engine unit ASIC (Application Specific Integrated Circuit). This engine unit ASIC E1102 is connected to the ROM E1004 via a control bus E1014, and performs various control according to a program stored in the ROM E1004. For example, the engine unit ASIC E1102 transmits or receives sensor signals E0104 that are related to the sensors, or multi-sensor signals E4003 that are related to multi-sensors E3000. In addition, the engine unit ASIC E1102 detects the state of an encoder signal E1020 as well as output from the power key 1005 and various keys on the control panel 1010. Moreover, the engine unit ASIC E1102 performs judgment of various logical operations and various conditions according to the connection and data input state of the host I/F E0017 and device I/F E0100 on the front panel, controls all of the component elements and performs control for driving the PD printer 1000.

Reference number E1103 denotes a driver/reset circuit. The driver/reset circuit E1103 drives each motor by generating a CR motor drive signal E1037, an LF motor drive signal E1035, an AP motor drive signal E4001 and a PR motor drive signal E4002 according to a motor control signal E1106 from the engine unit ASIC E1102. Moreover, the driver/reset circuit E1103 has a power-supply circuit, which supplies power required for each unit such as the main board E0014, the carriage board of the moving carriage in which the printing head is mounted, and control panel 1010. Furthermore, the driver/reset circuit E1103 detects a drop in power-supply voltage, as well as generates a reset signal E1015 and performs reset.

Reference number E1010 denotes a power-supply control circuit which controls the power supply to each sensor having optical elements according to a power-supply control signal E1024 from the engine unit ASIC E1102.

The host I/F E0017 is connected to the PC 3010 via the image processing ASIC 3001 and the USB HUB 3008 in the control unit 3000 in FIG. 3. In addition, the host I/F signals E1028 from the engine unit ASIC E1102 are sent to the host I/F cable E1029, and signals from the cable E1029 are sent to the engine unit ASIC E1102.

The power for the printer engine is supplied from a power-supply unit E0015 that is connected to the power-supply connector 3009 in FIG. 3, and as necessary, undergoes voltage conversion and is supplied to each of the units inside and outside of the main board E0014. On the other hand, the power-supply unit control signal E4000 is sent to the power-supply unit E0015 from the engine unit ASIC E1102, and is used for controlling the low-power consumption mode of the PD printer.

The engine unit ASIC E1102 is a semiconductor integrated circuit having a single-chip arithmetic processing unit, and outputs signals such as the motor control signal E1106 described above, a power-supply control signal E1024, and a power-supply unit control signal E4000. The engine unit ASIC E1102 also receives signals from the host I/F E0017, and receives signals from the device I/F E0100 on the control panel via the panel signal E0107. Moreover, the engine unit ASIC E1102 via sensor signals E0104, detects states from the sensors such as the PE sensor and ASF sensor. Furthermore, the engine unit ASIC E1102 controls the multi sensor E3000 as well as detects the state via a multi-sensor signal E4003. The engine unit ASIC E1102 also detects the state of panel signals E0107, controls driving of panel signals E0107 and controls flashing of the LED 2003 on the control panel.

Furthermore, the engine unit ASIC E1102 detects the state of the encoder signal (ENC) E1020, creates a timing signal, interfaces with the printing head by a head control signal E1021 and controls the printing operation. Here, the encoder signal (ENC) E1020 is an output signal from the encoder sensor E0004 that is input via a CRFFC E0012. Also, the head control signal E1021 is connected to the carriage board (not shown in the figure) via a flexible flat cable E0012. The head control signal that is received by the carriage board is supplied to the printing head H1000 via a head drive voltage modulation circuit and head connector that are constructed here, and various information is sent from the printing head H1000 to the ASIC E1102. Of this information, head temperature information for each ejecting unit is amplified by a head temperature detection circuit E3002 on the main board, after which it is input to the engine unit ASIC E1102 and used for determining various control.

In the figure, reference number E3007 denotes a DRAM that is used as a buffer, such as a data buffer for printing, or a reception data buffer for data received from the PC 3010 via the image processing ASIC 3001 or USB HUB 3008 of the control unit 3000 in FIG. 3. The DRAM 3007 is also used as a necessary work area when performing various control operations.

<Summary of the Printing Unit>

Figure 5:
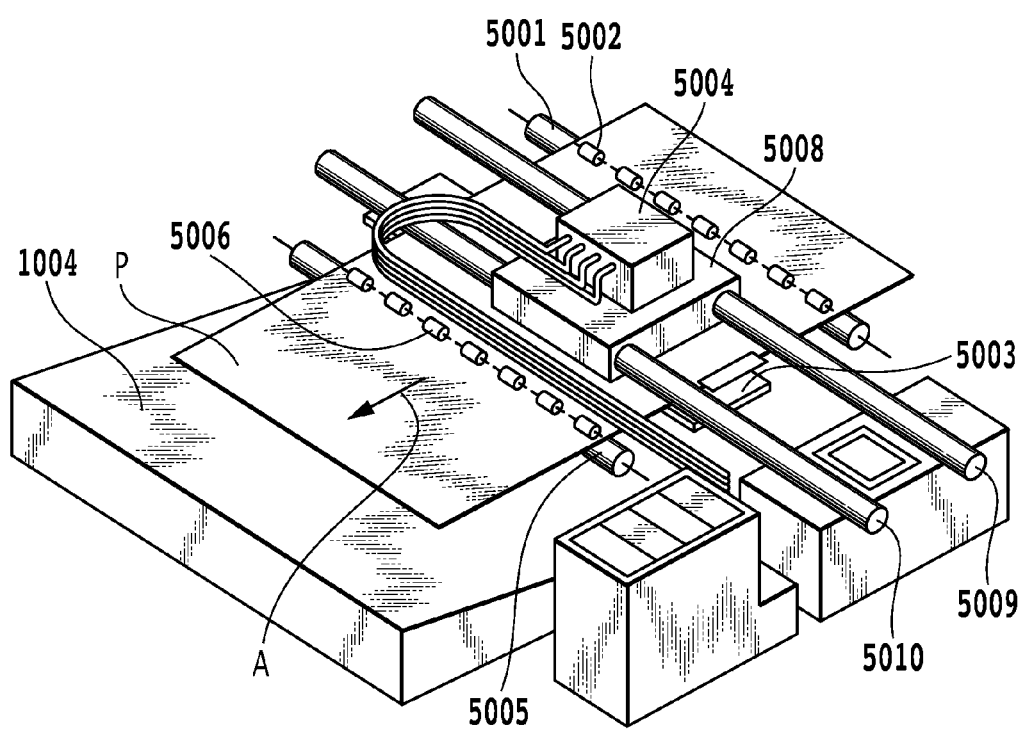
FIG. 5 is a perspective diagram illustrating the printing unit of the printer engine of a serial-type inkjet printing apparatus of one embodiment of the present invention.
Figure 6A:
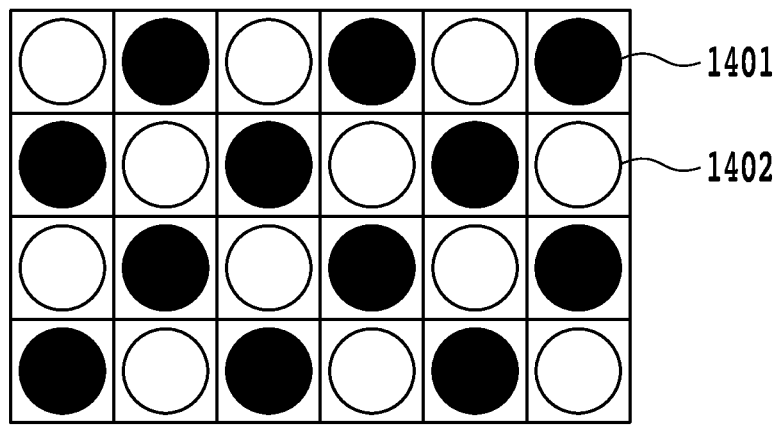
FIG. 6A is a diagram illustrating the dot arrangement when image data is divided using mask patterns having a complimentary relationship with each other.
Figure 6B:
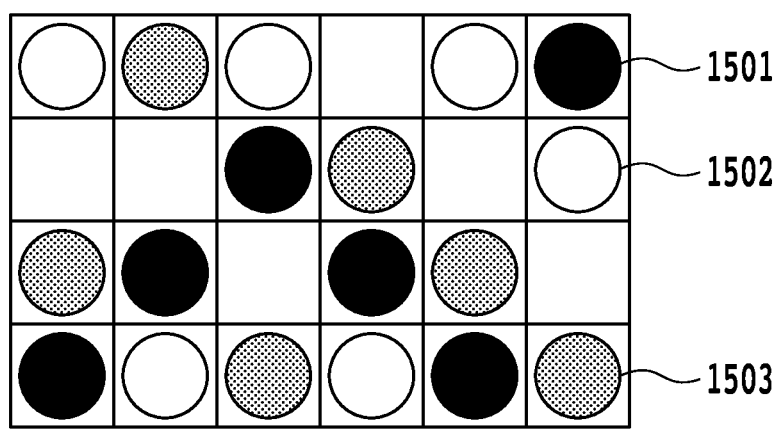
FIG. 6B is a diagram illustrating the dot arrangement when image data is divided according to the methods disclosed in Japanese Patent Laid-Open No. 2000-103088 and Japanese Patent Laid-Open No. 2001-150700.

FIG. 5 is a perspective diagram illustrating the summary of the printing unit of the printer engine of a serial-type inkjet printing apparatus of one embodiment of the present invention. The printing medium P is fed by the auto feed unit 1007 to the nip section of a conveying roller 5001 that is located on the conveying path and the pinch roller 5002 that follows it. After that, the printing medium P is conveyed in the direction of the arrow 'A' (sub scanning direction) in the figure by a rotation of the conveying roller 5001 while being guided and supported by a platen 5003. The pinch roller 5002 is elastically pressed against the conveying roller 5001 by a pressure method such as a spring (not shown in the figure). The conveying roller 5001 and the pinch roller 5002 are component elements of a first conveying unit located up line in the conveyance direction of the printing medium.

The platen 5003 is provided at a printing position that faces the surface (ejection surface) on which the ejection port of the inkjet type printing head 5004 is formed, and by providing support to the rear surface of the printing medium P, the distance between the surface of the printing medium and the ejection surface is kept at a constant distance. The printing medium P that is conveyed and printed on the platen 5003 is held between a rotating discharging roller 5005 and a rotating spur 5006 that rotates following discharging roller 5005 and conveyed in the direction 'A', then discharged from the platen 5003 to a discharge tray 1004. The discharging roller 5005 and spur 5006 are component elements of a second conveying unit that is located down line in the conveying direction of printing medium.

The printing head 5004 is mounted in the carriage 5008 such that it can be mounted or removed, and such that the ejection port face is facing the platen 5003 or printing medium P. The carriage 5008 is moved back-and-forth along two guide rails 5009, 5010 by the driving force of the carriage motor E0001, and during this movement process the printing head 5004 executes the ink ejecting operation according to a print signal. The direction that the carriage 5008 moves in is a direction that crosses the direction that the printing medium is conveyed (direction of arrow 'A'), and is called the main scanning direction. On the other hand, the direction that the printing medium is conveyed in is called the sub scanning direction. Printing on the printing medium is performed by alternately repeating main scanning of the carriage 5008 and the printing head 5004 (movement that accompanies printing) and conveying the printing medium (sub scanning).

Figure 20:
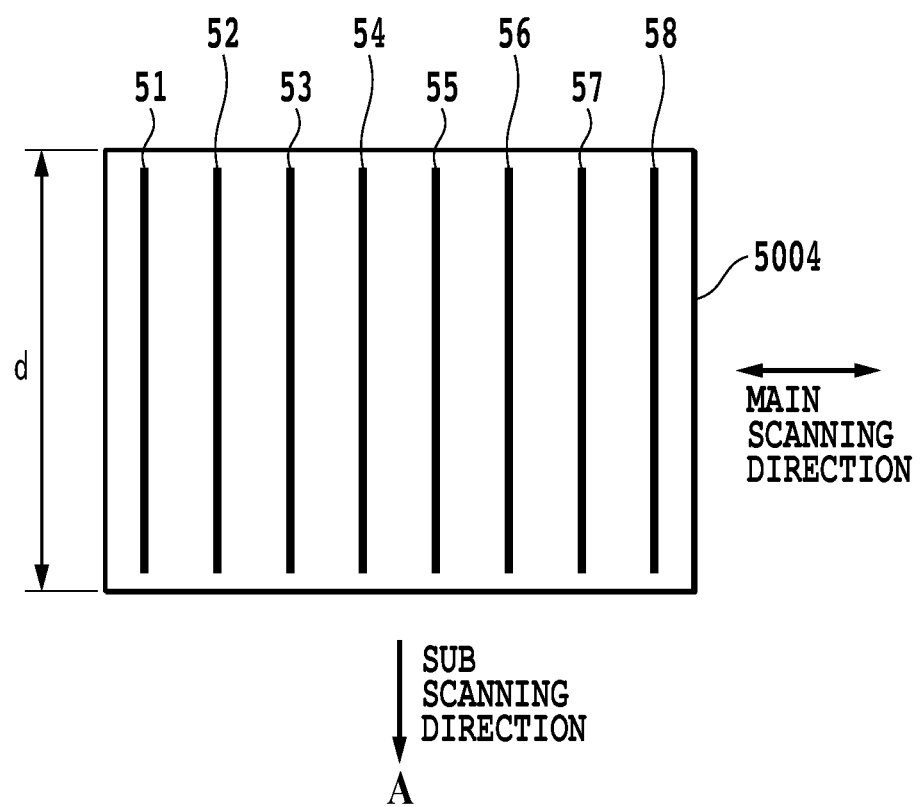
FIG. 20 is a diagram in the case of observing the printing head 5004 from the surface on which the ejection port is formed.

FIG. 20 is a diagram in the case of observing the printing head 5004 from the surface on which the ejection port is formed. In the figure, reference number 51 denotes a first cyan nozzle array (printing element group), and reference number 58 denotes a second cyan nozzle array. Reference number 52 denotes a first magenta nozzle array, and reference number 57 denotes a second magenta nozzle array. Reference number 53 denotes a first yellow nozzle array, and reference number 56 denotes a second yellow nozzle array. Reference number 54 denotes a first black nozzle array, and reference number 55 denotes a second black nozzle array. The width in the sub scanning direction of each nozzle array is 'd', and printing of a width 'd' is possible in one scan.

The printing head 5004 of this embodiment comprises two nozzle arrays that eject ink in near equal amounts for each of the colors cyan (C), magenta (M), yellow (Y) and black (K), and prints an image on a printing medium using both of these nozzle arrays. By doing so, it is possible to reduce density unevenness or stripes caused by variation of each individual nozzle by nearly ½. In addition, by arranging the nozzle arrays for each color as in this embodiment such that they are symmetrical with respect to the main scanning direction, it is possible to keep the order of applying ink to the printing medium fixed when performing printing in the forward direction as well as when performing printing in the backward direction. In other words, regardless of whether the printing direction is the forward or backward direction, the order of applying ink to the printing medium is C→M→Y→K→K→Y→M→C, and even though printing is performed in both directions, there is no color unevenness due to the order of applying ink.

Furthermore, it is possible for the printer of this embodiment to execute multi-pass printing, so the area that the printing head 5004 can print in one printing scan gradually forms an image in steps by performing printing scans a plurality of times. When doing this, by performing the conveying operation for an amount that is less than the width 'd' of the printing head 5004 between each printing scan, it is possible to further reduce density unevenness and stripes caused by variation of individual nozzles. Whether or not to perform multi-pass printing, or the number of multi-passes (number of times printing scanning is performed for the same area) can be suitably set according to information that was inputted by the user from the control panel 1010 or according to image information that was received from the host device.

Next, an example of multi-pass printing that can be executed by the printing apparatus described above will be explained using FIG. 11. Here, 2-pass printing will be explained as an example of multi-pass printing; however, the present invention is not limited to 2-pass printing, and M (M being an integer equal to 2 or greater) pass printing is possible where M could be 3 passes, 4 passes, 8 passes, 16 passes and the like. The 'M (M being an integer equal to 2 or greater) pass mode' that is preferably applied in the present invention, is a mode in which printing is performed over the same area of a printing medium by printing scanning M times by a printing element group, with the printing medium being conveyed an amount that is less than the width of the placement range of print elements between each pass. In this kind of M-pass mode, the amount that the printing medium is conveyed each time is preferably set to an amount that corresponds to 1/Mth the width of the placement range of the print elements, and by performing this kind of setting, the width in the conveying direction of the same area described above becomes equal to the width corresponding to the amount that the printing medium is conveyed each time.

FIG. 11 is a diagram that schematically illustrates the state of 2-pass printing, and illustrates the relative positional relationship between the printing head 5004 and printing area when printing in first to fourth printing areas that correspond to four same areas. In FIG. 11, only one nozzle array (printing element group) 51 of a certain color is shown among those of the printing head 5004 illustrated in FIG. 5. Moreover, hereafter, of the plurality of nozzles (print elements) of a nozzle array (printing element group) 51, the nozzle group that is positioned up-line in the conveying direction is called up-line nozzle group 105A, and the nozzle group that is positioned down-line in the conveying direction is called down-line nozzle group 105B. Also, the width in the sub scanning direction (conveying direction) of each same area (each printing area) is equal to a width (640 nozzle width) that corresponds to approximately half the width (1280 nozzle width) of the placement range of the plurality of print elements of the printing head.

In the first scan, a part of the image to be printed in the first printing area is printed using the up-line nozzle group 105A. In the image data that is printed by this up-line nozzle group 105A, the gradation value of the original image data (multi-valued image data that corresponds to the image to be finally printed in the first printing area) is reduced to approximately ½ for each individual pixel. After printing in this kind of first scan is finished, the printing medium is conveyed in the Y direction a distance equal to the amount of 640 nozzles.

Next, in the second scan, a part of the image to be printed in the second printing area is printed using the up-line nozzle group 105A, and the image that is to be printed in the first printing area is completed using the down-line nozzle group 105B. In the image data that is printed by this down-line nozzle group 105B as well, the gradation value of the original image data (multi-valued image data that corresponds to the image to be finally printed in the first printing area) is reduced to approximately ½. By doing so, image data for which the gradation value has been reduced to approximately ½ is printed in the first printing area two times, so the gradation value of the original image data is saved. After printing in this kind of second scan is finished, the printing medium is conveyed in the I direction just a distance equal to the amount of 640 nozzles.

Next, in a third scan, a part of the image that is to be printed in the third printing area is printed using the up-line nozzle group 105A, and the image that is to be printed in the second printing area is completed using the down-line nozzle group 105B. After this, the printing medium is conveyed in the Y direction just a distance that equals the amount of 640 nozzles. Finally, in the fourth scan, a part of the image to be printed in the fourth printing area is printed using the up-line nozzle group 105A, and the image that is to be printed in the third printing area is completed using the down-line nozzle group 105B. After this, the printing medium is conveyed in the Y direction just a distance equal to the amount of 690 nozzles. The printing operation is similarly performed for other printing areas. By repeating the main printing scan and conveying operation as described above, 2-pass printing is performed for all printing areas.

Incidentally, when performing this kind of multi-pass printing over all areas of the printing medium, the nip state of the conveying roller 5001 and discharging roller 5005 is different at the front edge portion, center portion and rear edge portion of the printing medium. In addition, when printing moves from the front edge portion to the center portion, and when printing moves from the center portion to the rear edge portion, unexpected conveying error of several tens of μm may occur due to impact that occurs when the edge portions of the printing medium enters into the nip section of the discharging roller or separates from the nip section of the conveying roller. In that case, in printing scanning that is before and after this conveying operation, it becomes easy for the dot groups to be printed on the printing medium to shift (shift between planes). That is, in the area where changing from the center portion to the front edge portion or rear edge portion, there is a tendency for adverse effects, such as a change in density compared with other areas, to easily occur.

Embodiments of the present invention that use the printing apparatus described above will be explained below.

<Relationship Between Dot Overlap Rate Control and Density Unevenness and Graininess>

As was described in the section on related art and section on the problems the invention is to solve, when dots to be printed in different scans or different printing element groups shift and overlap, density fluctuation occurs in the image, and this is known as density unevenness. Therefore, in the present invention, some dots that are to overlap and be printed in the same position (same pixel or same sub pixel) are prepared in advance, and when printing position displacement occurs, adjacent dots overlap each other and blank regions increase; however, the overlapping dots separate from each other and reduce blank areas. By doing so, the increase and decrease in blank areas due to printing position displacement, or in other words, the increase or decrease in density balance each other out, so it can be expected that the change in density of the overall image will be suppressed.

However, preparing overlapping dots beforehand is also related to worsening of the graininess. For example, when printing N number of dots while overlapping all of the dots two at a time, the number of locations where dots are printed becomes N/2, and when compared with the case when no dots are overlapped, the spacing between dots increases. Therefore, the spatial frequency in an image in where all of the dots are overlapping moves toward the low frequency side more than an image in which there are no overlapping dots. Generally, the spatial frequency of an image that is printed by an inkjet printing apparatus includes from the low frequency region, in which human visual characteristics respond relatively sensitively, to the high frequency region, in which, visual characteristics become relatively insensitive. Therefore, moving the printing period of dots to the low frequency side is linked to adversely affecting the image by causing a perception of graininess.

In other words, when dispersion of dots is increased in order to suppress graininess (the dot overlap rate is kept low), robustness is lost, and when the dot overlap rate is increased in order to emphasize robustness, graininess becomes a problem, so completely avoiding both at the same time becomes difficult.

However, both the change in density and graininess described above have, to a certain extent, an allowable range (range in which, due to human visual characteristics, visual perception is difficult). Therefore, by adjusting the dot overlap rate such that both are kept within their respective allowable range, it can be expected that an image with no distinguishable adverse effects will be output. However, the allowable ranges described above, the dot diameter and the dot arrangement change depending on various conditions such as the type of ink, the type of printing medium or the density data values, so a suitable dot overlap rate may not always be a fixed value. Therefore, it is preferred that construction be such that the dot overlap rate can be more aggressively controlled, and that the dot overlap rate be adjusted according to various conditions.

Here, the 'dot overlap rate' will be explained. The 'dot overlap rate', as illustrated in FIGS. 7A to 7H and in FIG. 19 that will be described later, is the percentage of dots (overlapping dots) that are printed and overlapped in the same position by different scans or different printing element groups among the total number of dots which are to be printed in a unit area made up of K (K is an integer 1 or greater) number of pixel areas. Here, the same position means the same pixel position in the case of FIGS. 7A to 7H, and is the sub pixel position in the case of FIG. 19.

In the following, the dot overlap rate of a first plane and second plane that correspond to a unit area comprising 4 pixels (main scan direction)×3 pixels (sub scan direction) will be explained using FIGS. 7A to 7H. The 'first plane' indicates a collection of binary data that corresponds to a first scan or first nozzle group, and the 'second plane' is a collection of binary data that corresponds to a second scan or second nozzle group. Also, '1' is data that indicates printing of a dot, and '0' is data that indicates no printing of a dot.

In FIGS. 7A to 7E, the number of 1s in the first plane is '4', and the number of 1s in the second plane is also '4', therefore the total number of dots to be printed in a unit area comprising 4 pixels×3 pixels is '8'. On the other hand, the number of is in the first plane and second plane that correspond to the same pixel position is the number of dots (overlapping dots) that are to overlap and be printed in the same pixel. According to this definition, the number of overlapping dots is '0' in FIG. 7A, is '2' in FIG. 7B, is '4' in FIG. 7C, is '6' in FIG. 7D and is '8' in FIG. 7E. Therefore, as illustrated in FIG. 7H, the dot overlap rates of FIGS. 7A to 7E are 0%, 25%, 50%, 75% and 100%, respectively.

Furthermore, FIG. 7F and FIG. 7G illustrate cases in which the number of printed dots and total number of dots in a plane differ from the cases in FIGS. 7A to 7E. FIG. 7F illustrates the case in which the number of printed dots in the first plane is '4', the number of printed dots in the second plane is '3', the total number of dots is '7', the number of overlapping dots is '6' and the dot overlap rate is 86%. On the other hand, FIG. 7G illustrates the case in which the number of printed dots in the first plane is '4', the number of printed dots in the second plane is '2', the total number of dots is '6', the number of overlapping dots is '2' and the dot overlap rate is 33%.

In this specification, the 'dot overlap rate' is the overlap rate of dot data when dot data that corresponds to different scans or different printing element groups virtually overlap, and does not indicate the area ratio or percentage of overlapping dots on paper.

In the following, examples of embodiments of image processing for controlling the dot overlap rate will be explained.

(Embodiment 1)

Figure 21:
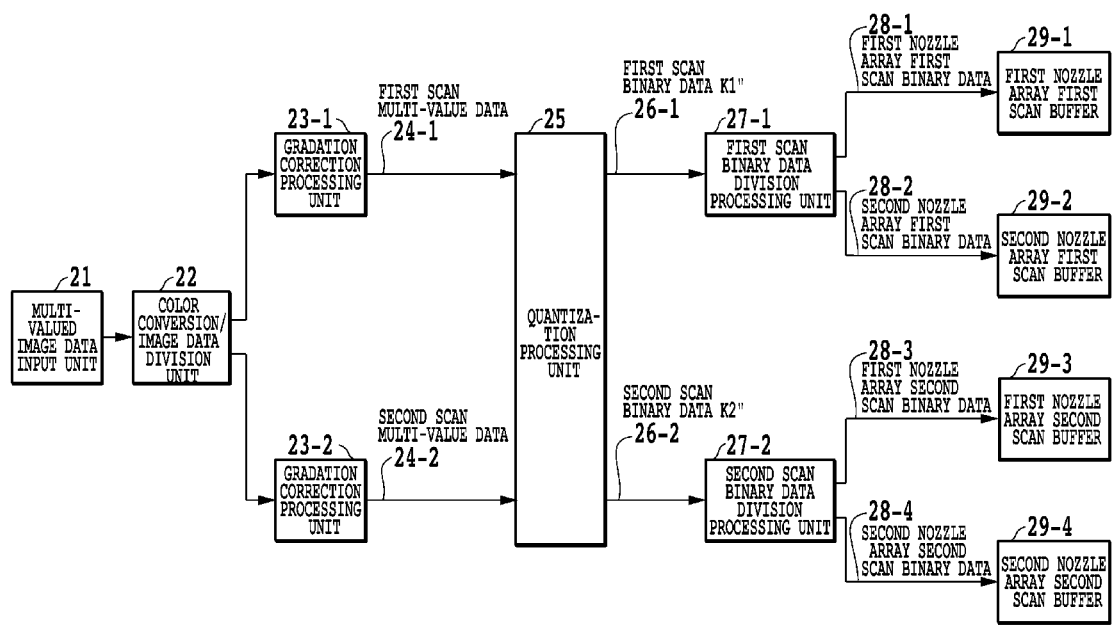
FIG. 21 is a block diagram for explaining image processing when multipass printing is performed to complete an image in the same area using two printing scans.

FIG. 21 is a block diagram for explaining image processing when performing multi-pass printing to complete an image in the same area of the printing medium by two printing scans as illustrated in FIG. 11. Here, the processing of 21 to 25 in the figure is performed on the image data that was input from an image input device such as a digital camera 3012 by the control unit 3000 that was explained in FIG. 3, and the processing of 27-1 and 27-2 and later is performed by the printer engine 3004. The control unit 3000 comprises a multi-valued image data input unit 21, color conversion/image data division unit 22, gradation correction processing units 23-1, 23-2 and quantization processing unit 25 that are illustrated in FIG. 21. On the other hand, the printer engine 3004 comprises binary data division processing units 27-1, 27-2.

A multi-valued image data input unit 21 inputs RGB multi-valued image data (256 values) from an external device. A color conversion/image data division unit 22 converts this input image data (multi-value RGB data) to two sets of multi-valued image data (CMYK data) for a first print scan and for a second print scan for each ink color. More specifically, a three-dimensional lookup table is provided beforehand in the color conversion/image data division unit 22 that correlates RGB values with CMYK values (C1, M1, Y1, K1) for a first scan, and CMYK values (C2, M2, Y2, K2) for a second scan. By using this three-dimensional lookup table (LUT), multi-value RGB data is converted to multi-value data (C1, M1, Y1, K1) for a first scan, and multi-value data (C2, M2, Y2, K2) for a second scan at once. When doing this, it is possible to calculate output values for input values that are separated from the grid values of the table through interpolation from output value of surrounding table grid points. In this way, the color conversion/image data division unit 22 performs the role of a data generation unit for generating multi-value data (C1, M1, Y1, K1) for a first scan and multi-value data (C2, M2, Y2, K2) for a second scan based on input image data corresponding to a pixel.

The construction of the color conversion/image data division unit 22 is not limited to a form of using a three-dimensional lookup table as described above. For example, construction is also possible in which multi-value RGB data is converted to multi-value CMYK data that corresponds to the ink that is used by a printer, and then that multi-value CMYK data is further divided in two.

Next, a gradation correction processing units 23-1 and 23-2 performs gradation correction processing of the multi-value data for the first scan and multi-value data for the second scan each color. Here, signal value conversion of the multi-value data is performed so that there is a linear relationship between the signal values of the multi-value data and the density values that are expressed on the printing medium. As a result, multi-value data 24-1 (C1', M1', Y1', K1') for the first scan, and multi-value data 24-2 (C2', M2', Y2', K2') for the second scan are obtained. The following processing is performed independently at the same time for cyan (C), magenta (M), yellow (Y) and black (K), so only an explanation for the color black (K) will be given below.

The quantization processing unit 25 performs a binarization process (quantization process) on the both the multi-value data 24-1 for the first scan (first multi-value density data K1') and multi-value data 24-2 for the second scan (second multi-value density data K2'). In other words, the multi-value data is converted (quantized) to either '0' or '1', and becomes binary data K1" for the first scan (first quantized data) 26-1 and K2" for the second scan (second quantized data) 26-2. When doing this, dots are overlapped and printed for pixels for which both K1" and K2" are '1', and no dots are printed for pixels for which both K1" and K2" are '0'. In addition, only one dot is printed for pixels for which only one of K1" and K2" is '1'.

The processing that is executed by the quantization processing unit 25 will be explained using the flowchart of FIG. 26. In this flowchart, K1' and K2' are input multi-value data for a target pixel and have a value 0 to 255. In addition, K1*err* and K2*err* are accumulated error values that are generated from surrounding pixels for which quantization processing has already ended, and K1*ttl* and K2*ttl* are total values of the input multi-value data and accumulated error values. Furthermore, K1" and K2" are binary quantized data for the first printing scan and second printing scan.

In this embodiment, the threshold values (quantization parameters) that are used when setting the values K1" and K2", which are binary quantized data, differ according to the values of K1*ttl* and K2*ttl*. Therefore, a table in which threshold values are primarily set according to the values K1*ttl* and K2*ttl* is prepared in advance. Here, the threshold value that is compared with K1*ttl* when setting K1" is taken to be K1table[K2*ttl*], and the threshold value that is compared with K2*ttl* when setting K2" is taken to be K2table[K1*ttl*]. The value K1table[K2*ttl*] is a value that is set according to the value of K2*ttl*, and the value K2table[K1*ttl*] is a value that is set according to the value K1*ttl*.

When this process is started, first, K1*ttl* and K2*ttl* are calculated in step S21. Next, in step S22, by referencing a threshold value table such as Table 1 below, the two threshold values K1table[K2*ttl*] and K2table[K1*ttl*] are acquired from the values K1*ttl* and K2*ttl* that were found in step S21. The threshold value K1table[K2*ttl*] is set by using the value K2*ttl* as the 'reference value' in the threshold value table of Table 1. On the other hand, the threshold value K2table[K1*ttl*] is set by using the value K1*ttl* as the 'reference value' in the threshold value table of Table 1.

Next, the value of K1" is set in steps S23 to S25, and the value of K2" is set in steps S26 to S28. More specifically, in step S23, whether or not the value K1*ttl* that was calculated in step S21 is equal to or greater than the threshold value K1table[K2*ttl*] that was acquired in step S22 is determined. When it is determined that the value K1*ttl* is equal to or greater than the threshold value, the value is taken to be K1"=1, and the accumulated error value K1*err* (=K1*ttl*−255) is calculated and updated according to this output value (K1"=1) (step S25). On the other hand, when it is determined that the value K1*ttl* is less than the threshold value, the value is taken to be K1"=0, and the accumulated error value K1*err* (=K1*ttl*) is calculated and updated according to this output value (K1"=0) (step S24).

Continuing, in step S26, whether or not the value K2*ttl* that was calculated in step S21 is equal to or greater than the threshold value K2table[K1*ttl*] that was acquired in step S22 is determined. When it is determined that the value K2*ttl* is equal to or greater than the threshold value, the value is taken to be K2"=1, and the accumulated error value K2*err* (=K2*ttl*−255) is calculated and updated according to this output value (K2"=1) (step S28). However, when it is determined that the value K2*ttl* is less than the threshold value, K2" is taken to be K2"=0, and the accumulated error value K2*err* (=K2*ttl*) is calculated and updated according to this output value (K2"=0) (step S27).

After that, in step S29, the updated accumulated error values K1*err* and K2*err* are diffused in the surrounding pixels for which quantization has not yet been performed according to the error diffusion matrices illustrated in FIGS. 13A and 13B. In this embodiment, the error diffusion matrix that is illustrated in FIG. 13A is used for diffusing the accumulated error value K1*err* in the surrounding pixels, and the error diffusion matrix illustrated in FIG. 13B is used for diffusing the accumulated error value K2*err* in the surrounding pixels.

In this embodiment, a threshold value (quantization parameter) that is used for performing quantization processing for multi-value data (K1*ttl*) that corresponds to the first scan is set in this way based on multi-value data (K2*ttl*) that corresponds to the second scan. Similarly, a threshold value (quantization parameter) that is used for performing quantization processing for multi-value data (K2*ttl*) that corresponds to the second scan is set based on multi-value data (K1*ttl*) that corresponds to the first scan. In other words, quantization processing of multi-value data that corresponds to one scan, and quantization processing of multi-value data that corresponds to another scan are executed based on both multi-value data that corresponds to one scan of two scans, and multi-value data that corresponds to the other scan of two scans. By doing so, it is possible to perform control so that dots from one scan are not printed as much as possible in pixels in which dots from another scan are printed, so it is possible to suppress worsening of graininess due to dot overlap.

Figure 22A:
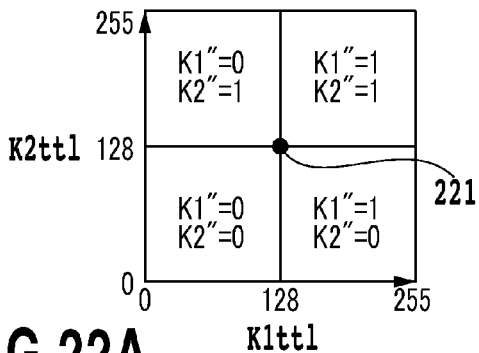
FIGS. 22A to 22G are diagrams illustrating the correlation between binary quantization processing results (K1", K2") and input values (K1$ttl$, K2$ttl$) that use a threshold value that is entered in the threshold value table of Table 1.

FIG. 22A is a diagram for explaining the correlation of the result and the input values (K1$ttl$ and K2$ttl$): the result being obtained by performing quantization processing (binarization processing) according to the flowchart of FIGS. 16A and 16B described above using the threshold values that are entered in the FIG. 22A column of Table 1 below. The values K1$ttl$ and K2$ttl$ both may take on the value 0 to 255, and as illustrated in the FIG. 22A column of the threshold value table, printing (1n) and no printing (0) are set with the threshold value 128 as the borderline. In the figure, point 221 is a border point between the area where no dots are printed (K1"=0 and K2"=0), and areas where two dots overlap (K1"=1 and K2"=1). In this example, the probability (in other words, the dot printing rate) that K1"=1 becomes K1'/255, and the probability that K2"=1 becomes K2'/255.

Figure 22B:
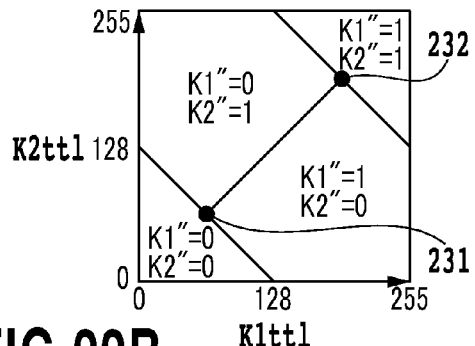

FIG. 22B is a diagram for explaining the correlation of the result and the input values (K1$ttl$ and K2$ttl$) the result being obtained by performing quantization processing (binarization processing) according to flowchart in FIG. 26 using the threshold values entered in the FIG. 22B column of the threshold value table of Table 1 below. Point 231 is the border between the area where no dots are printed (K1"=0 and K2"=0), and areas where there is only one dot (K1"=1 and K2"=0, or K1"=0 and K2"=1). Also, point 232 is the border between an area where two dots overlap and are printed (K1"=1 and K2"=1), and areas where there is only one dot (K1"=1 and K2"=0, or K1"=0 and K2"=1). By separating points 231 and 232 by a certain distance, the areas where one dot is printed increase, and the areas where both dots are printed decrease when compared with the case of FIG. 22A. That is, the case in FIG. 22B is advantageous in that there is a higher probability that the dot overlap rate will decrease, and the graininess will be kept lower than in the case of FIG. 22A. When there is a point where the dot overlap rate changes suddenly as in the case of FIG. 22A, density unevenness may occur due to small changes in gradation; however, in the case shown in FIG. 22B, the dot overlap rate changes smoothly as the gradation changes, so that it becomes difficult for that kind of density unevenness to occur.

In the quantization processing of this embodiment, by providing various conditions for the Kttl value and the relationship between K1' and K2', it is possible to make various adjustments to the K1" and K2" values and the dot overlap rate. A few examples will be explained below using FIG. 22C to FIG. 22G. Similar to FIG. 22A and FIG. 22B described above, FIG. 22C to FIG. 22G are diagrams showing the correlation between the results (K1" and K2") and the input values (K1$ttl$ and K2$ttl$): the results being obtained from performing quantization using the threshold values that are entered in the threshold value table in Table 1.

Figure 22C:
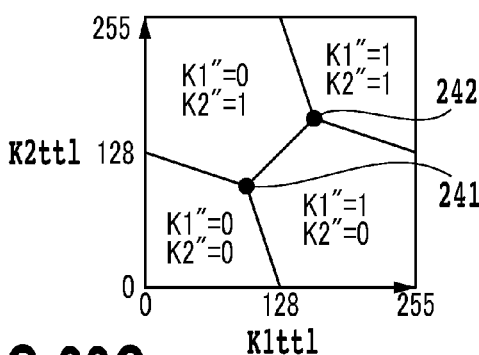

FIG. 22C is a diagram illustrating the case where the dot overlap rate is set to a value between that in the cases illustrated in FIG. 22A and FIG. 22B. Point 241 is set such that it is the middle point between point 221 in FIG. 22A and point 231 in FIG. 22B. In addition, point 242 is set such that it is the middle point between point 221 in FIG. 22A and point 232 in FIG. 22B.

Figure 22D:
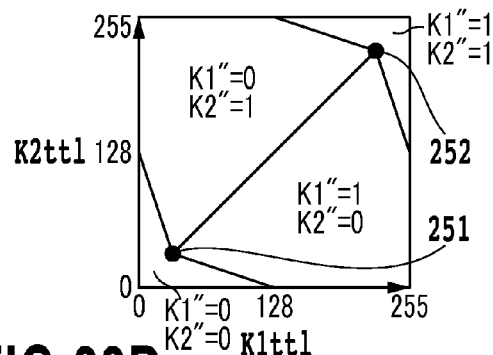

FIG. 22D is a diagram illustrating the case where the dot overlap rate is reduced more than in the case illustrated in FIG. 22B. Point 251 is set to a point that externally divides point 221 in FIG. 22A and point 231 in FIG. 22B by 3:2. In addition, point 252 is set to a point that externally divides point 221 in FIG. 22A and point 232 in FIG. 22B by 3:2.

Figure 22E:
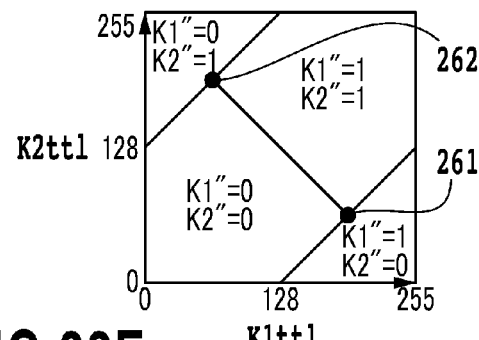

FIG. 22E illustrates the case where the dot overlap rate is increased more than the case illustrated in FIG. 22A. In the figure, point 261 is a boundary point among an area where no dots are printed (K1"=0 and K2"=0), an area where there is only one dot (K1"=1 and K2"=0) and an area where two dots overlap and are printed (K1"=1 and K2"=1). In addition, point 262 is a boundary point among an area where no dots are printed (K1"=0 and K2"=0), an area where there is only one dot (K1"=0 and K2"=1), and an area where two dots overlap and are printed (K1"=1 and K2"=1). According to FIG. 22E, it is easy to make the transition from the area where no dots are printed (K1"=0 and K2"=0) to the area where two dots overlap and are printed (K1"=1 and K2"=1), and it is possible to increase the dot overlap rate.

Figure 22F:
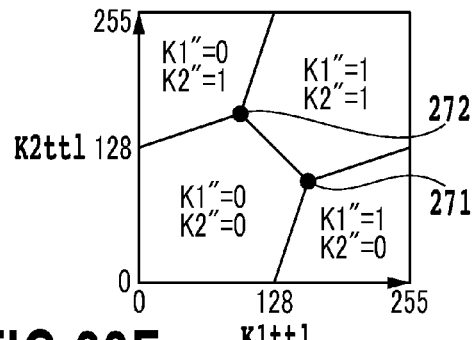

FIG. 22F is a diagram that illustrates the case where the dot overlap rate is a value between that of the cases illustrated in FIG. 22A and FIG. 22E. Point 271 is set such that it is between point 221 in FIG. 22A and point 261 in FIG. 22E. In addition, point 272 is set such that it is between point 221 in FIG. 22A and point 262 in FIG. 22E.

Figure 22G:
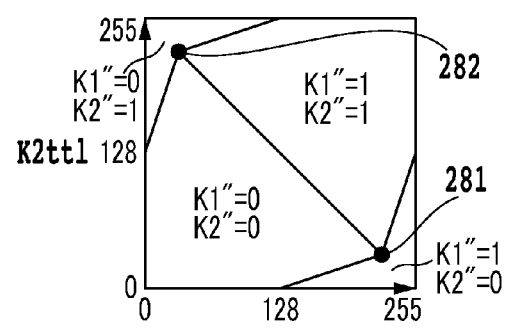

Furthermore, FIG. 22G illustrates the case where the dot overlap rate is increased even more than the case illustrated in FIG. 22E. Point 281 is set to a point that externally divides point 221 in FIG. 22A and point 261 in FIG. 22E by 3:2. In addition, point 282 is set to a point that externally divides point 221 in FIG. 22A and point 262 in FIG. 22E by 3:2.

Next, the method of performing a quantization process that uses the threshold value table illustrated in Table 1 is explained below in more detail. Table 1 is a threshold table for acquiring the threshold values in step S22 of the flowchart explained using FIG. 26 in order to achieve the processing results illustrated in FIG. 22A to FIG. 22G.

Here, the case will be explained in which the input values (K1$ttl$, K2$ttl$) are (100, 120), and threshold values entered in the FIG. 22B column of the threshold table are used. First, in step S22 of FIG. 26, the threshold value K1table[K2$ttl$] is found based on the threshold table illustrated in Table 1 and the value K2$ttl$ (reference value). When the reference value (K2$ttl$) is '120', the threshold value K1table[K2$ttl$] becomes '120'. Similarly, the threshold value K2table[K1$ttl$] is found based on the threshold table and value K1$ttl$ (reference value). When the reference value (K1$ttl$) is '100', the threshold value K2table[K1$ttl$] becomes '101'. Next, in step S23 of FIG. 26, the value K1$ttl$ is compared with the threshold value K1table[K2$ttl$], and in this case, K1$ttl$ (=100) <threshold value K1table[K2$ttl$] (=120), so that K1"=0 (step S24). Similarly, in step S26 of FIG. 26, the value K2$ttl$ is compared with the threshold value K2table[K1$ttl$], and in this case, K2$ttl$ (=120) ≧threshold value K2table[K1$ttl$] (=101), so K2"=1 (step S28). As a result, as illustrated in FIG. 22B, when (K1$ttl$, K2$ttl$)=(100, 120), (K1", K2")=(0, 1).

Moreover, as another example, the case in which the input values (K1$ttl$, K2$ttk$)=(120, 120) and the threshold values that are entered in the FIG. 22C column of the threshold table are used will be explained. In this case, the threshold value K1table[K2$ttl$] becomes '120', and the threshold value K2table[K1$ttl$] becomes '121'. Therefore, K1$ttl$ (=120) ≧threshold value K1table[K2$ttl$] (=120), so that K1"=1, and K2$ttl$ (=120)<threshold value K2table[K1$ttl$] (=121), so that K2"=0. As a result, as illustrated in FIG. 22$c$, when (K1$ttl$, K2$ttl$)=(120, 120), (K1", K2")=(1, 0).

With the quantization processing described above, the dot overlap rate between two scans is controlled by performing quantization of multi-value data that corresponds to each of two scans based on both of the multi-value data that corresponds to two scans. By doing so, it is possible to keep the overlap rate of dots that are printed by one scan, and the dots that are printed by another scan within a suitable range, or in other words, it is possible to keep the overlap rate within a range in which it is possible to keep in balance both high robustness and low graininess.

TABLE 1

| | FIG. 22 (A) | | FIG. 22 (B) | | FIG. 22 (C) | | FIG. 22 (D) | | FIG. 22 (E) | | FIG. 22 (F) | | FIG. >22 (G) | |
|---|---|---|---|---|---|---|---|---|---|---|---|---|---|---|
| | K1 table | K2 table | K1 table | K2 table | K1 table | K2 table | K1 table | K2 table | K1 table | K2 table | K1 table | K2 table | K1 table | K2 table |
| 0 | 128 | 128 | 128 | 128 | 128 | 128 | 128 | 128 | 127 | 127 | 127 | 127 | 127 | 127 |
| 1 | 128 | 128 | 127 | 127 | 127 | 127 | 125 | 125 | 128 | 128 | 128 | 128 | 130 | 130 |
| 2 | 128 | 128 | 126 | 126 | 127 | 127 | 122 | 122 | 129 | 129 | 128 | 128 | 133 | 133 |
| 3 | 128 | 128 | 125 | 125 | 127 | 127 | 119 | 119 | 130 | 130 | 128 | 128 | 136 | 136 |
| 4 | 128 | 128 | 124 | 124 | 126 | 126 | 116 | 116 | 131 | 131 | 129 | 129 | 139 | 139 |
| 5 | 128 | 128 | 123 | 123 | 126 | 126 | 113 | 113 | 132 | 132 | 129 | 129 | 142 | 142 |
| 6 | 128 | 128 | 122 | 122 | 126 | 126 | 110 | 110 | 133 | 133 | 129 | 129 | 145 | 145 |
| 7 | 128 | 128 | 121 | 121 | 125 | 125 | 107 | 107 | 134 | 134 | 130 | 130 | 148 | 148 |
| 8 | 128 | 128 | 120 | 120 | 125 | 125 | 104 | 104 | 135 | 135 | 130 | 130 | 151 | 151 |
| 9 | 128 | 128 | 119 | 119 | 125 | 125 | 101 | 101 | 136 | 136 | 130 | 130 | 154 | 154 |
| 10 | 128 | 128 | 118 | 118 | 124 | 124 | 98 | 98 | 137 | 137 | 131 | 131 | 157 | 157 |
| 11 | 128 | 128 | 117 | 117 | 124 | 124 | 95 | 95 | 138 | 138 | 131 | 131 | 160 | 160 |
| 12 | 128 | 128 | 116 | 116 | 124 | 124 | 92 | 92 | 139 | 139 | 131 | 131 | 163 | 163 |
| 13 | 128 | 128 | 115 | 115 | 123 | 123 | 89 | 89 | 140 | 140 | 132 | 132 | 166 | 166 |
| 14 | 128 | 128 | 114 | 114 | 123 | 123 | 86 | 86 | 141 | 141 | 132 | 132 | 169 | 169 |
| 15 | 128 | 128 | 113 | 113 | 123 | 123 | 83 | 83 | 142 | 142 | 132 | 132 | 172 | 172 |
| 16 | 128 | 128 | 112 | 112 | 122 | 122 | 80 | 80 | 143 | 143 | 133 | 133 | 175 | 175 |
| 17 | 128 | 128 | 111 | 111 | 122 | 122 | 77 | 77 | 144 | 144 | 133 | 133 | 178 | 178 |
| 18 | 128 | 128 | 110 | 110 | 122 | 122 | 74 | 74 | 145 | 145 | 133 | 133 | 181 | 181 |
| 19 | 128 | 128 | 109 | 109 | 121 | 121 | 71 | 71 | 146 | 146 | 134 | 134 | 184 | 184 |
| 20 | 128 | 128 | 108 | 108 | 121 | 121 | 68 | 68 | 147 | 147 | 134 | 134 | 187 | 187 |
| 21 | 128 | 128 | 107 | 107 | 121 | 121 | 65 | 65 | 148 | 148 | 134 | 134 | 190 | 190 |
| 22 | 128 | 128 | 106 | 106 | 120 | 120 | 62 | 62 | 149 | 149 | 135 | 135 | 193 | 193 |
| 23 | 128 | 128 | 105 | 105 | 120 | 120 | 59 | 59 | 150 | 150 | 135 | 135 | 196 | 196 |
| 24 | 128 | 128 | 104 | 104 | 120 | 120 | 56 | 56 | 151 | 151 | 135 | 135 | 199 | 199 |
| 25 | 128 | 128 | 103 | 103 | 119 | 119 | 53 | 53 | 152 | 152 | 136 | 136 | 202 | 202 |
| 26 | 128 | 128 | 102 | 102 | 119 | 119 | 50 | 50 | 153 | 153 | 136 | 136 | 205 | 205 |
| 27 | 128 | 128 | 101 | 101 | 119 | 119 | 47 | 47 | 154 | 154 | 136 | 136 | 208 | 208 |
| 28 | 128 | 128 | 100 | 100 | 118 | 118 | 44 | 44 | 155 | 155 | 137 | 137 | 211 | 211 |
| 29 | 128 | 128 | 99 | 99 | 118 | 118 | 41 | 41 | 156 | 156 | 137 | 137 | 214 | 214 |
| 30 | 128 | 128 | 98 | 98 | 118 | 118 | 38 | 38 | 157 | 157 | 137 | 137 | 217 | 217 |
| 31 | 128 | 128 | 97 | 97 | 117 | 117 | 35 | 35 | 158 | 158 | 138 | 138 | 220 | 220 |
| 32 | 128 | 128 | 96 | 96 | 117 | 117 | 32 | 33 | 159 | 159 | 138 | 138 | 223 | 222 |
| 33 | 128 | 128 | 95 | 95 | 117 | 117 | 33 | 34 | 160 | 160 | 138 | 138 | 222 | 221 |
| 34 | 128 | 128 | 94 | 94 | 116 | 116 | 34 | 35 | 161 | 161 | 139 | 139 | 221 | 220 |
| 35 | 128 | 128 | 93 | 93 | 116 | 116 | 35 | 36 | 162 | 162 | 139 | 139 | 220 | 219 |
| 36 | 128 | 128 | 92 | 92 | 116 | 116 | 36 | 37 | 163 | 163 | 139 | 139 | 219 | 218 |
| 37 | 128 | 128 | 91 | 91 | 115 | 115 | 37 | 38 | 164 | 164 | 140 | 140 | 218 | 217 |
| 38 | 128 | 128 | 90 | 90 | 115 | 115 | 38 | 39 | 165 | 165 | 140 | 140 | 217 | 216 |
| 39 | 128 | 128 | 89 | 89 | 115 | 115 | 39 | 40 | 166 | 166 | 140 | 140 | 216 | 215 |
| 40 | 128 | 128 | 88 | 88 | 114 | 114 | 40 | 41 | 167 | 167 | 141 | 141 | 215 | 214 |
| 41 | 128 | 128 | 87 | 87 | 114 | 114 | 41 | 42 | 168 | 168 | 141 | 141 | 214 | 213 |
| 42 | 128 | 128 | 86 | 86 | 114 | 114 | 42 | 43 | 169 | 169 | 141 | 141 | 213 | 212 |
| 43 | 128 | 128 | 85 | 85 | 113 | 113 | 43 | 44 | 170 | 170 | 142 | 142 | 212 | 211 |
| 44 | 128 | 128 | 84 | 84 | 113 | 113 | 44 | 45 | 171 | 171 | 142 | 142 | 211 | 210 |
| 45 | 128 | 128 | 83 | 83 | 113 | 113 | 45 | 46 | 172 | 172 | 142 | 142 | 210 | 209 |
| 46 | 128 | 128 | 82 | 82 | 112 | 112 | 46 | 47 | 173 | 173 | 143 | 143 | 209 | 208 |
| 47 | 128 | 128 | 81 | 81 | 112 | 112 | 47 | 48 | 174 | 174 | 143 | 143 | 208 | 207 |
| 48 | 128 | 128 | 80 | 80 | 112 | 112 | 48 | 49 | 175 | 175 | 143 | 143 | 207 | 206 |
| 49 | 128 | 128 | 79 | 79 | 111 | 111 | 49 | 50 | 176 | 176 | 144 | 144 | 206 | 205 |
| 50 | 128 | 128 | 78 | 78 | 111 | 111 | 50 | 51 | 177 | 177 | 144 | 144 | 205 | 204 |
| 51 | 128 | 128 | 77 | 77 | 111 | 111 | 51 | 52 | 178 | 178 | 144 | 144 | 204 | 203 |
| 52 | 128 | 128 | 76 | 76 | 110 | 110 | 52 | 53 | 179 | 179 | 145 | 145 | 203 | 202 |
| 53 | 128 | 128 | 75 | 75 | 110 | 110 | 53 | 54 | 180 | 180 | 145 | 145 | 202 | 201 |
| 54 | 128 | 128 | 74 | 74 | 110 | 110 | 54 | 55 | 181 | 181 | 145 | 145 | 201 | 200 |
| 55 | 128 | 128 | 73 | 73 | 109 | 109 | 55 | 56 | 182 | 182 | 146 | 146 | 200 | 199 |
| 56 | 128 | 128 | 72 | 72 | 109 | 109 | 56 | 57 | 183 | 183 | 146 | 146 | 199 | 198 |
| 57 | 128 | 128 | 71 | 71 | 109 | 109 | 57 | 58 | 184 | 184 | 146 | 146 | 198 | 197 |
| 58 | 128 | 128 | 70 | 70 | 108 | 108 | 58 | 59 | 185 | 185 | 147 | 147 | 197 | 196 |
| 59 | 128 | 128 | 69 | 69 | 108 | 108 | 59 | 60 | 186 | 186 | 147 | 147 | 196 | 195 |
| 60 | 128 | 128 | 68 | 68 | 108 | 108 | 60 | 61 | 187 | 187 | 147 | 147 | 195 | 194 |
| 61 | 128 | 128 | 67 | 67 | 107 | 107 | 61 | 62 | 188 | 188 | 148 | 148 | 194 | 193 |
| 62 | 128 | 128 | 66 | 66 | 107 | 107 | 62 | 63 | 189 | 189 | 148 | 148 | 193 | 192 |
| 63 | 128 | 128 | 65 | 65 | 107 | 107 | 63 | 64 | 190 | 190 | 148 | 148 | 192 | 191 |
| 64 | 128 | 128 | 64 | 65 | 106 | 106 | 64 | 65 | 191 | 190 | 149 | 149 | 191 | 190 |
| 65 | 128 | 128 | 65 | 66 | 106 | 106 | 65 | 66 | 190 | 189 | 149 | 149 | 190 | 189 |
| 66 | 128 | 128 | 66 | 67 | 106 | 106 | 66 | 67 | 189 | 188 | 149 | 149 | 189 | 188 |
| 67 | 128 | 128 | 67 | 68 | 105 | 105 | 67 | 68 | 188 | 187 | 150 | 150 | 188 | 187 |
| 68 | 128 | 128 | 68 | 69 | 105 | 105 | 68 | 69 | 187 | 186 | 150 | 150 | 187 | 186 |
| 69 | 128 | 128 | 69 | 70 | 105 | 105 | 69 | 70 | 186 | 185 | 150 | 150 | 186 | 185 |
| 70 | 128 | 128 | 70 | 71 | 104 | 104 | 70 | 71 | 185 | 184 | 151 | 151 | 185 | 184 |
| 71 | 128 | 128 | 71 | 72 | 104 | 104 | 71 | 72 | 184 | 183 | 151 | 151 | 184 | 183 |
| 72 | 128 | 128 | 72 | 73 | 104 | 104 | 72 | 73 | 183 | 182 | 151 | 151 | 183 | 182 |
| 73 | 128 | 128 | 73 | 74 | 103 | 103 | 73 | 74 | 182 | 181 | 152 | 152 | 182 | 181 |
| 74 | 128 | 128 | 74 | 75 | 103 | 103 | 74 | 75 | 181 | 180 | 152 | 152 | 181 | 180 |

TABLE 1-continued

|  | FIG. 22 (A) | | FIG. 22 (B) | | FIG. 22 (C) | | FIG. 22 (D) | | FIG. 22 (E) | | FIG. 22 (F) | | FIG. >22 (G) | |
|---|---|---|---|---|---|---|---|---|---|---|---|---|---|---|
|  | K1 table | K2 table | K1 table | K2 table | K1 table | K2 table | K1 table | K2 table | K1 table | K2 table | K1 table | K2 table | K1 table | K2 table |
| 75 | 128 | 128 | 75 | 76 | 103 | 103 | 75 | 76 | 180 | 179 | 152 | 152 | 180 | 179 |
| 76 | 128 | 128 | 76 | 77 | 102 | 102 | 76 | 77 | 179 | 178 | 153 | 153 | 179 | 178 |
| 77 | 128 | 128 | 77 | 78 | 102 | 102 | 77 | 78 | 178 | 177 | 153 | 153 | 178 | 177 |
| 78 | 128 | 128 | 78 | 79 | 102 | 102 | 78 | 79 | 177 | 176 | 153 | 153 | 177 | 176 |
| 79 | 128 | 128 | 79 | 80 | 101 | 101 | 79 | 80 | 176 | 175 | 154 | 154 | 176 | 175 |
| 80 | 128 | 128 | 80 | 81 | 101 | 101 | 80 | 81 | 175 | 174 | 154 | 154 | 175 | 174 |
| 81 | 128 | 128 | 81 | 82 | 101 | 101 | 81 | 82 | 174 | 173 | 154 | 154 | 174 | 173 |
| 82 | 128 | 128 | 82 | 83 | 100 | 100 | 82 | 83 | 173 | 172 | 155 | 155 | 173 | 172 |
| 83 | 128 | 128 | 83 | 84 | 100 | 100 | 83 | 84 | 172 | 171 | 155 | 155 | 172 | 171 |
| 84 | 128 | 128 | 84 | 85 | 100 | 100 | 84 | 85 | 171 | 170 | 155 | 155 | 171 | 170 |
| 85 | 128 | 128 | 85 | 86 | 99 | 99 | 85 | 86 | 170 | 169 | 156 | 156 | 170 | 169 |
| 86 | 128 | 128 | 86 | 87 | 99 | 99 | 86 | 87 | 169 | 168 | 156 | 156 | 169 | 168 |
| 87 | 128 | 128 | 87 | 88 | 99 | 99 | 87 | 88 | 168 | 167 | 156 | 156 | 168 | 167 |
| 88 | 128 | 128 | 88 | 89 | 98 | 98 | 88 | 89 | 167 | 166 | 157 | 157 | 167 | 166 |
| 89 | 128 | 128 | 89 | 90 | 98 | 98 | 89 | 90 | 166 | 165 | 157 | 157 | 166 | 165 |
| 90 | 128 | 128 | 90 | 91 | 98 | 98 | 90 | 91 | 165 | 164 | 157 | 157 | 165 | 164 |
| 91 | 128 | 128 | 91 | 92 | 97 | 97 | 91 | 92 | 164 | 163 | 158 | 158 | 164 | 163 |
| 92 | 128 | 128 | 92 | 93 | 97 | 97 | 92 | 93 | 163 | 162 | 158 | 158 | 163 | 162 |
| 93 | 128 | 128 | 93 | 94 | 97 | 97 | 93 | 94 | 162 | 161 | 158 | 158 | 162 | 161 |
| 94 | 128 | 128 | 94 | 95 | 96 | 96 | 94 | 95 | 161 | 160 | 159 | 159 | 161 | 160 |
| 95 | 128 | 128 | 95 | 96 | 96 | 96 | 95 | 96 | 160 | 159 | 159 | 159 | 160 | 159 |
| 96 | 128 | 128 | 96 | 97 | 96 | 97 | 96 | 97 | 159 | 158 | 159 | 158 | 159 | 158 |
| 97 | 128 | 128 | 97 | 98 | 97 | 98 | 97 | 98 | 158 | 157 | 158 | 157 | 158 | 157 |
| 98 | 128 | 128 | 98 | 99 | 98 | 99 | 98 | 99 | 157 | 156 | 157 | 156 | 157 | 156 |
| 99 | 128 | 128 | 99 | 100 | 99 | 100 | 99 | 100 | 156 | 155 | 156 | 155 | 156 | 155 |
| 100 | 128 | 128 | 100 | 101 | 100 | 101 | 100 | 101 | 155 | 154 | 155 | 154 | 155 | 154 |
| 101 | 128 | 128 | 101 | 102 | 101 | 102 | 101 | 102 | 154 | 153 | 154 | 153 | 154 | 153 |
| 102 | 128 | 128 | 102 | 103 | 102 | 103 | 102 | 103 | 153 | 152 | 153 | 152 | 153 | 152 |
| 103 | 128 | 128 | 103 | 104 | 103 | 104 | 103 | 104 | 152 | 151 | 152 | 151 | 152 | 151 |
| 104 | 128 | 128 | 104 | 105 | 104 | 105 | 104 | 105 | 151 | 150 | 151 | 150 | 151 | 150 |
| 105 | 128 | 128 | 105 | 106 | 105 | 106 | 105 | 106 | 150 | 149 | 150 | 149 | 150 | 149 |
| 106 | 128 | 128 | 106 | 107 | 106 | 107 | 106 | 107 | 149 | 148 | 149 | 148 | 149 | 148 |
| 107 | 128 | 128 | 107 | 108 | 107 | 108 | 107 | 108 | 148 | 147 | 148 | 147 | 148 | 147 |
| 108 | 128 | 128 | 108 | 109 | 108 | 109 | 108 | 109 | 147 | 146 | 147 | 146 | 147 | 146 |
| 109 | 128 | 128 | 109 | 110 | 109 | 110 | 109 | 110 | 146 | 145 | 146 | 145 | 146 | 145 |
| 110 | 128 | 128 | 110 | 111 | 110 | 111 | 110 | 111 | 145 | 144 | 145 | 144 | 145 | 144 |
| 111 | 128 | 128 | 111 | 112 | 111 | 112 | 111 | 112 | 144 | 143 | 144 | 143 | 144 | 143 |
| 112 | 128 | 128 | 112 | 113 | 112 | 113 | 112 | 113 | 143 | 142 | 143 | 142 | 143 | 142 |
| 113 | 128 | 128 | 113 | 114 | 113 | 114 | 113 | 114 | 142 | 141 | 142 | 141 | 142 | 141 |
| 114 | 128 | 128 | 114 | 115 | 114 | 115 | 114 | 115 | 141 | 140 | 141 | 140 | 141 | 140 |
| 115 | 128 | 128 | 115 | 116 | 115 | 116 | 115 | 116 | 140 | 139 | 140 | 139 | 140 | 139 |
| 116 | 128 | 128 | 116 | 117 | 116 | 117 | 116 | 117 | 139 | 138 | 139 | 138 | 139 | 138 |
| 117 | 128 | 128 | 117 | 118 | 117 | 118 | 117 | 118 | 138 | 137 | 138 | 137 | 138 | 137 |
| 118 | 128 | 128 | 118 | 119 | 118 | 119 | 118 | 119 | 137 | 136 | 137 | 136 | 137 | 136 |
| 119 | 128 | 128 | 119 | 120 | 119 | 120 | 119 | 120 | 136 | 135 | 136 | 135 | 136 | 135 |
| 120 | 128 | 128 | 120 | 121 | 120 | 121 | 120 | 121 | 135 | 134 | 135 | 134 | 135 | 134 |
| 121 | 128 | 128 | 121 | 122 | 121 | 122 | 121 | 122 | 134 | 133 | 134 | 133 | 134 | 133 |
| 122 | 128 | 128 | 122 | 123 | 122 | 123 | 122 | 123 | 133 | 132 | 133 | 132 | 133 | 132 |
| 123 | 128 | 128 | 123 | 124 | 123 | 124 | 123 | 124 | 132 | 131 | 132 | 131 | 132 | 131 |
| 124 | 128 | 128 | 124 | 125 | 124 | 125 | 124 | 125 | 131 | 130 | 131 | 130 | 131 | 130 |
| 125 | 128 | 128 | 125 | 126 | 125 | 126 | 125 | 126 | 130 | 129 | 130 | 129 | 130 | 129 |
| 126 | 128 | 128 | 126 | 127 | 126 | 127 | 126 | 127 | 129 | 128 | 129 | 128 | 129 | 128 |
| 127 | 128 | 128 | 127 | 128 | 127 | 128 | 127 | 128 | 128 | 127 | 128 | 127 | 128 | 127 |
| 128 | 128 | 128 | 128 | 129 | 128 | 129 | 128 | 129 | 127 | 126 | 127 | 126 | 127 | 126 |
| 129 | 128 | 128 | 129 | 130 | 129 | 130 | 129 | 130 | 126 | 125 | 126 | 125 | 126 | 125 |
| 130 | 128 | 128 | 130 | 131 | 130 | 131 | 130 | 131 | 125 | 124 | 125 | 124 | 125 | 124 |
| 131 | 128 | 128 | 131 | 132 | 131 | 132 | 131 | 132 | 124 | 123 | 124 | 123 | 124 | 123 |
| 132 | 128 | 128 | 132 | 133 | 132 | 133 | 132 | 133 | 123 | 122 | 123 | 122 | 123 | 122 |
| 133 | 128 | 128 | 133 | 134 | 133 | 134 | 133 | 134 | 122 | 121 | 122 | 121 | 122 | 121 |
| 134 | 128 | 128 | 134 | 135 | 134 | 135 | 134 | 135 | 121 | 120 | 121 | 120 | 121 | 120 |
| 135 | 128 | 128 | 135 | 136 | 135 | 136 | 135 | 136 | 120 | 119 | 120 | 119 | 120 | 119 |
| 136 | 128 | 128 | 136 | 137 | 136 | 137 | 136 | 137 | 119 | 118 | 119 | 118 | 119 | 118 |
| 137 | 128 | 128 | 137 | 138 | 137 | 138 | 137 | 138 | 118 | 117 | 118 | 117 | 118 | 117 |
| 138 | 128 | 128 | 138 | 139 | 138 | 139 | 138 | 139 | 117 | 116 | 117 | 116 | 117 | 116 |
| 139 | 128 | 128 | 139 | 140 | 139 | 140 | 139 | 140 | 116 | 115 | 116 | 115 | 116 | 115 |
| 140 | 128 | 128 | 140 | 141 | 140 | 141 | 140 | 141 | 115 | 114 | 115 | 114 | 115 | 114 |
| 141 | 128 | 128 | 141 | 142 | 141 | 142 | 141 | 142 | 114 | 113 | 114 | 113 | 114 | 113 |
| 142 | 128 | 128 | 142 | 143 | 142 | 143 | 142 | 143 | 113 | 112 | 113 | 112 | 113 | 112 |
| 143 | 128 | 128 | 143 | 144 | 143 | 144 | 143 | 144 | 112 | 111 | 112 | 111 | 112 | 111 |
| 144 | 128 | 128 | 144 | 145 | 144 | 145 | 144 | 145 | 111 | 110 | 111 | 110 | 111 | 110 |
| 145 | 128 | 128 | 145 | 146 | 145 | 146 | 145 | 146 | 110 | 109 | 110 | 109 | 110 | 109 |
| 146 | 128 | 128 | 146 | 147 | 146 | 147 | 146 | 147 | 109 | 108 | 109 | 108 | 109 | 108 |
| 147 | 128 | 128 | 147 | 148 | 147 | 148 | 147 | 148 | 108 | 107 | 108 | 107 | 108 | 107 |
| 148 | 128 | 128 | 148 | 149 | 148 | 149 | 148 | 149 | 107 | 106 | 107 | 106 | 107 | 106 |
| 149 | 128 | 128 | 149 | 150 | 149 | 150 | 149 | 150 | 106 | 105 | 106 | 105 | 106 | 105 |

TABLE 1-continued

| | FIG. 22 (A) | | FIG. 22 (B) | | FIG. 22 (C) | | FIG. 22 (D) | | FIG. 22 (E) | | FIG. 22 (F) | | FIG. >22 (G) | |
|---|---|---|---|---|---|---|---|---|---|---|---|---|---|---|
| | K1 table | K2 table | K1 table | K2 table | K1 table | K2 table | K1 table | K2 table | K1 table | K2 table | K1 table | K2 table | K1 table | K2 table |
| 150 | 128 | 128 | 150 | 151 | 150 | 151 | 150 | 151 | 105 | 104 | 105 | 104 | 105 | 104 |
| 151 | 128 | 128 | 151 | 152 | 151 | 152 | 151 | 152 | 104 | 103 | 104 | 103 | 104 | 103 |
| 152 | 128 | 128 | 152 | 153 | 152 | 153 | 152 | 153 | 103 | 102 | 103 | 102 | 103 | 102 |
| 153 | 128 | 128 | 153 | 154 | 153 | 154 | 153 | 154 | 102 | 101 | 102 | 101 | 102 | 101 |
| 154 | 128 | 128 | 154 | 155 | 154 | 155 | 154 | 155 | 101 | 100 | 101 | 100 | 101 | 100 |
| 155 | 128 | 128 | 155 | 156 | 155 | 156 | 155 | 156 | 100 | 99 | 100 | 99 | 100 | 99 |
| 156 | 128 | 128 | 156 | 157 | 156 | 157 | 156 | 157 | 99 | 98 | 99 | 98 | 99 | 98 |
| 157 | 128 | 128 | 157 | 158 | 157 | 158 | 157 | 158 | 98 | 97 | 98 | 97 | 98 | 97 |
| 158 | 128 | 128 | 158 | 159 | 158 | 159 | 158 | 159 | 97 | 96 | 97 | 96 | 97 | 96 |
| 159 | 128 | 128 | 159 | 160 | 159 | 160 | 159 | 160 | 96 | 95 | 96 | 95 | 96 | 95 |
| 160 | 128 | 128 | 160 | 161 | 160 | 160 | 160 | 161 | 95 | 94 | 95 | 95 | 95 | 94 |
| 161 | 128 | 128 | 161 | 162 | 160 | 160 | 161 | 162 | 94 | 93 | 95 | 95 | 94 | 93 |
| 162 | 128 | 128 | 162 | 163 | 159 | 159 | 162 | 163 | 93 | 92 | 96 | 96 | 93 | 92 |
| 163 | 128 | 128 | 163 | 164 | 159 | 159 | 163 | 164 | 92 | 91 | 96 | 96 | 92 | 91 |
| 164 | 128 | 128 | 164 | 165 | 159 | 159 | 164 | 165 | 91 | 90 | 96 | 96 | 91 | 90 |
| 165 | 128 | 128 | 165 | 166 | 158 | 158 | 165 | 166 | 90 | 89 | 97 | 97 | 90 | 89 |
| 166 | 128 | 128 | 166 | 167 | 158 | 158 | 166 | 167 | 89 | 88 | 97 | 97 | 89 | 88 |
| 167 | 128 | 128 | 167 | 168 | 158 | 158 | 167 | 168 | 88 | 87 | 97 | 97 | 88 | 87 |
| 168 | 128 | 128 | 168 | 169 | 157 | 157 | 168 | 169 | 87 | 86 | 98 | 98 | 87 | 86 |
| 169 | 128 | 128 | 169 | 170 | 157 | 157 | 169 | 170 | 86 | 85 | 98 | 98 | 86 | 85 |
| 170 | 128 | 128 | 170 | 171 | 157 | 157 | 170 | 171 | 85 | 84 | 98 | 98 | 85 | 84 |
| 171 | 128 | 128 | 171 | 172 | 156 | 156 | 171 | 172 | 84 | 83 | 99 | 99 | 84 | 83 |
| 172 | 128 | 128 | 172 | 173 | 156 | 156 | 172 | 173 | 83 | 82 | 99 | 99 | 83 | 82 |
| 173 | 128 | 128 | 173 | 174 | 156 | 156 | 173 | 174 | 82 | 81 | 99 | 99 | 82 | 81 |
| 174 | 128 | 128 | 174 | 175 | 155 | 155 | 174 | 175 | 81 | 80 | 100 | 100 | 81 | 80 |
| 175 | 128 | 128 | 175 | 176 | 155 | 155 | 175 | 176 | 80 | 79 | 100 | 100 | 80 | 79 |
| 176 | 128 | 128 | 176 | 177 | 155 | 155 | 176 | 177 | 79 | 78 | 100 | 100 | 79 | 78 |
| 177 | 128 | 128 | 177 | 178 | 154 | 154 | 177 | 178 | 78 | 77 | 101 | 101 | 78 | 77 |
| 178 | 128 | 128 | 178 | 179 | 154 | 154 | 178 | 179 | 77 | 76 | 101 | 101 | 77 | 76 |
| 179 | 128 | 128 | 179 | 180 | 154 | 154 | 179 | 180 | 76 | 75 | 101 | 101 | 76 | 75 |
| 180 | 128 | 128 | 180 | 181 | 153 | 153 | 180 | 181 | 75 | 74 | 102 | 102 | 75 | 74 |
| 181 | 128 | 128 | 181 | 182 | 153 | 153 | 181 | 182 | 74 | 73 | 102 | 102 | 74 | 73 |
| 182 | 128 | 128 | 182 | 183 | 153 | 153 | 182 | 183 | 73 | 72 | 102 | 102 | 73 | 72 |
| 183 | 128 | 128 | 183 | 184 | 152 | 152 | 183 | 184 | 72 | 71 | 103 | 103 | 72 | 71 |
| 184 | 128 | 128 | 184 | 185 | 152 | 152 | 184 | 185 | 71 | 70 | 103 | 103 | 71 | 70 |
| 185 | 128 | 128 | 185 | 186 | 152 | 152 | 185 | 186 | 70 | 69 | 103 | 103 | 70 | 69 |
| 186 | 128 | 128 | 186 | 187 | 151 | 151 | 186 | 187 | 69 | 68 | 104 | 104 | 69 | 68 |
| 187 | 128 | 128 | 187 | 188 | 151 | 151 | 187 | 188 | 68 | 67 | 104 | 104 | 68 | 67 |
| 188 | 128 | 128 | 188 | 189 | 151 | 151 | 188 | 189 | 67 | 66 | 104 | 104 | 67 | 66 |
| 189 | 128 | 128 | 189 | 190 | 150 | 150 | 189 | 190 | 66 | 65 | 105 | 105 | 66 | 65 |
| 190 | 128 | 128 | 190 | 191 | 150 | 150 | 190 | 191 | 65 | 64 | 105 | 105 | 65 | 64 |
| 191 | 128 | 128 | 191 | 192 | 150 | 150 | 191 | 192 | 64 | 63 | 105 | 105 | 64 | 63 |
| 192 | 128 | 128 | 191 | 191 | 149 | 149 | 192 | 193 | 64 | 64 | 106 | 106 | 63 | 62 |
| 193 | 128 | 128 | 190 | 190 | 149 | 149 | 193 | 194 | 65 | 65 | 106 | 106 | 62 | 61 |
| 194 | 128 | 128 | 189 | 189 | 149 | 149 | 194 | 195 | 66 | 66 | 106 | 106 | 61 | 60 |
| 195 | 128 | 128 | 188 | 188 | 148 | 148 | 195 | 196 | 67 | 67 | 107 | 107 | 60 | 59 |
| 196 | 128 | 128 | 187 | 187 | 148 | 148 | 196 | 197 | 68 | 68 | 107 | 107 | 59 | 58 |
| 197 | 128 | 128 | 186 | 186 | 148 | 148 | 197 | 198 | 69 | 69 | 107 | 107 | 58 | 57 |
| 198 | 128 | 128 | 185 | 185 | 147 | 147 | 198 | 199 | 70 | 70 | 108 | 108 | 57 | 56 |
| 199 | 128 | 128 | 184 | 184 | 147 | 147 | 199 | 200 | 71 | 71 | 108 | 108 | 56 | 55 |
| 200 | 128 | 128 | 183 | 183 | 147 | 147 | 200 | 201 | 72 | 72 | 108 | 108 | 55 | 54 |
| 201 | 128 | 128 | 182 | 182 | 146 | 146 | 201 | 202 | 73 | 73 | 109 | 109 | 54 | 53 |
| 202 | 128 | 128 | 181 | 181 | 146 | 146 | 202 | 203 | 74 | 74 | 109 | 109 | 53 | 52 |
| 203 | 128 | 128 | 180 | 180 | 146 | 146 | 203 | 204 | 75 | 75 | 109 | 109 | 52 | 51 |
| 204 | 128 | 128 | 179 | 179 | 145 | 145 | 204 | 205 | 76 | 76 | 110 | 110 | 51 | 50 |
| 205 | 128 | 128 | 178 | 178 | 145 | 145 | 205 | 206 | 77 | 77 | 110 | 110 | 50 | 49 |
| 206 | 128 | 128 | 177 | 177 | 145 | 145 | 206 | 207 | 78 | 78 | 110 | 110 | 49 | 48 |
| 207 | 128 | 128 | 176 | 176 | 144 | 144 | 207 | 208 | 79 | 79 | 111 | 111 | 48 | 47 |
| 208 | 128 | 128 | 175 | 175 | 144 | 144 | 208 | 209 | 80 | 80 | 111 | 111 | 47 | 46 |
| 209 | 128 | 128 | 174 | 174 | 144 | 144 | 209 | 210 | 81 | 81 | 111 | 111 | 46 | 45 |
| 210 | 128 | 128 | 173 | 173 | 143 | 143 | 210 | 211 | 82 | 82 | 112 | 112 | 45 | 44 |
| 211 | 128 | 128 | 172 | 172 | 143 | 143 | 211 | 212 | 83 | 83 | 112 | 112 | 44 | 43 |
| 212 | 128 | 128 | 171 | 171 | 143 | 143 | 212 | 213 | 84 | 84 | 112 | 112 | 43 | 42 |
| 213 | 128 | 128 | 170 | 170 | 142 | 142 | 213 | 214 | 85 | 85 | 113 | 113 | 42 | 41 |
| 214 | 128 | 128 | 169 | 169 | 142 | 142 | 214 | 215 | 86 | 86 | 113 | 113 | 41 | 40 |
| 215 | 128 | 128 | 168 | 168 | 142 | 142 | 215 | 216 | 87 | 87 | 113 | 113 | 40 | 39 |
| 216 | 128 | 128 | 167 | 167 | 141 | 141 | 216 | 217 | 88 | 88 | 114 | 114 | 39 | 38 |
| 217 | 128 | 128 | 166 | 166 | 141 | 141 | 217 | 218 | 89 | 89 | 114 | 114 | 38 | 37 |
| 218 | 128 | 128 | 165 | 165 | 141 | 141 | 218 | 219 | 90 | 90 | 114 | 114 | 37 | 36 |
| 219 | 128 | 128 | 164 | 164 | 140 | 140 | 219 | 220 | 91 | 91 | 115 | 115 | 36 | 35 |
| 220 | 128 | 128 | 163 | 163 | 140 | 140 | 220 | 221 | 92 | 92 | 115 | 115 | 35 | 34 |
| 221 | 128 | 128 | 162 | 162 | 140 | 140 | 221 | 222 | 93 | 93 | 115 | 115 | 34 | 33 |
| 222 | 128 | 128 | 161 | 161 | 139 | 139 | 222 | 223 | 94 | 94 | 116 | 116 | 33 | 32 |
| 223 | 128 | 128 | 160 | 160 | 139 | 139 | 223 | 224 | 95 | 95 | 116 | 116 | 32 | 31 |
| 224 | 128 | 128 | 159 | 159 | 139 | 139 | 222 | 222 | 96 | 96 | 116 | 116 | 33 | 33 |

TABLE 1-continued

| | FIG. 22 (A) | | FIG. 22 (B) | | FIG. 22 (C) | | FIG. 22 (D) | | FIG. 22 (E) | | FIG. 22 (F) | | FIG. >22 (G) | |
|---|---|---|---|---|---|---|---|---|---|---|---|---|---|---|
| | K1 table | K2 table | K1 table | K2 table | K1 table | K2 table | K1 table | K2 table | K1 table | K2 table | K1 table | K2 table | K1 table | K2 table |
| 225 | 128 | 128 | 158 | 158 | 138 | 138 | 219 | 219 | 97 | 97 | 117 | 117 | 36 | 36 |
| 226 | 128 | 128 | 157 | 157 | 138 | 138 | 216 | 216 | 98 | 98 | 117 | 117 | 39 | 39 |
| 227 | 128 | 128 | 156 | 156 | 138 | 138 | 213 | 213 | 99 | 99 | 117 | 117 | 42 | 42 |
| 228 | 128 | 128 | 155 | 155 | 137 | 137 | 210 | 210 | 100 | 100 | 118 | 118 | 45 | 45 |
| 229 | 128 | 128 | 154 | 154 | 137 | 137 | 207 | 207 | 101 | 101 | 118 | 118 | 48 | 48 |
| 230 | 128 | 128 | 153 | 153 | 137 | 137 | 204 | 204 | 102 | 102 | 118 | 118 | 51 | 51 |
| 231 | 128 | 128 | 152 | 152 | 136 | 136 | 201 | 201 | 103 | 103 | 119 | 119 | 54 | 54 |
| 232 | 128 | 128 | 151 | 151 | 136 | 136 | 198 | 198 | 104 | 104 | 119 | 119 | 57 | 57 |
| 233 | 128 | 128 | 150 | 150 | 136 | 136 | 195 | 195 | 105 | 105 | 119 | 119 | 60 | 60 |
| 234 | 128 | 128 | 149 | 149 | 135 | 135 | 192 | 192 | 106 | 106 | 120 | 120 | 63 | 63 |
| 235 | 128 | 128 | 148 | 148 | 135 | 135 | 189 | 189 | 107 | 107 | 120 | 120 | 66 | 66 |
| 236 | 128 | 128 | 147 | 147 | 135 | 135 | 186 | 186 | 108 | 108 | 120 | 120 | 69 | 69 |
| 237 | 128 | 128 | 146 | 146 | 134 | 134 | 183 | 183 | 109 | 109 | 121 | 121 | 72 | 72 |
| 238 | 128 | 128 | 145 | 145 | 134 | 134 | 180 | 180 | 110 | 110 | 121 | 121 | 75 | 75 |
| 239 | 128 | 128 | 144 | 144 | 134 | 134 | 177 | 177 | 111 | 111 | 121 | 121 | 78 | 78 |
| 240 | 128 | 128 | 143 | 143 | 133 | 133 | 174 | 174 | 112 | 112 | 122 | 122 | 81 | 81 |
| 241 | 128 | 128 | 142 | 142 | 133 | 133 | 171 | 171 | 113 | 113 | 122 | 122 | 84 | 84 |
| 242 | 128 | 128 | 141 | 141 | 133 | 133 | 168 | 168 | 114 | 114 | 122 | 122 | 87 | 87 |
| 243 | 128 | 128 | 140 | 140 | 132 | 132 | 165 | 165 | 115 | 115 | 123 | 123 | 90 | 90 |
| 244 | 128 | 128 | 139 | 139 | 132 | 132 | 162 | 162 | 116 | 116 | 123 | 123 | 93 | 93 |
| 245 | 128 | 128 | 138 | 138 | 132 | 132 | 159 | 159 | 117 | 117 | 123 | 123 | 96 | 96 |
| 246 | 128 | 128 | 137 | 137 | 131 | 131 | 156 | 156 | 118 | 118 | 124 | 124 | 99 | 99 |
| 247 | 128 | 128 | 136 | 136 | 131 | 131 | 153 | 153 | 119 | 119 | 124 | 124 | 102 | 102 |
| 248 | 128 | 128 | 135 | 135 | 131 | 131 | 150 | 150 | 120 | 120 | 124 | 124 | 105 | 105 |
| 249 | 128 | 128 | 134 | 134 | 130 | 130 | 147 | 147 | 121 | 121 | 125 | 125 | 108 | 108 |
| 250 | 128 | 128 | 133 | 133 | 130 | 130 | 144 | 144 | 122 | 122 | 125 | 125 | 111 | 111 |
| 251 | 128 | 128 | 132 | 132 | 130 | 130 | 141 | 141 | 123 | 123 | 125 | 125 | 114 | 114 |
| 252 | 128 | 128 | 131 | 131 | 129 | 129 | 138 | 138 | 124 | 124 | 126 | 126 | 117 | 117 |
| 253 | 128 | 128 | 130 | 130 | 129 | 129 | 135 | 135 | 125 | 125 | 126 | 126 | 120 | 120 |
| 254 | 128 | 128 | 129 | 129 | 129 | 129 | 132 | 132 | 126 | 126 | 126 | 126 | 123 | 123 |
| 255 | 128 | 128 | 128 | 128 | 129 | 129 | 129 | 129 | 127 | 127 | 126 | 126 | 126 | 126 |

Returning again to FIG. 21, when binary image data K1" and K2" for achieving the desired dot overlap rate explained above is obtained by the quantization processing unit 25, these data are sent to the printer engine 3004 in FIG. 3 by way of an IEEE1284 bus 3022. The printer engine 3004 executes the processing after that.

The printer engine 3004 divides the binary image data K1" (26-1) and K2" (26-2) into binary data that corresponds to the two nozzle arrays 54 and 55 illustrated in FIG. 20. That is, a first scan binary data division processing unit 27-1 divides the binary image data K1" (26-1) for the first scan into binary data 28-1 for the first scan by the first nozzle array, and binary data 68-2 for the first scan by the second nozzle array. Moreover, a second scan binary data division processing unit 27-2 divides the binary image data K2" (26-2) for the second scan into binary data 28-3 for the second scan by the first nozzle array, and binary data 28-4 for the second scan by the second nozzle array.

Here, the first scan binary data division processing unit and second scan binary data division processing unit will be explained in detail. In this embodiment, the first scan binary data division processing unit 27-1 and second scan binary data division processing unit 27-2 execute division processing by using a mask that is stored in advance in memory (ROM E1004). The mask is preset aggregation of data that indicates for each individual pixel whether printing binary image data is allowed (1) or not allowed (0), and divides the binary image data described above by performing a logical AND operation with each binary image data and pixel.

Figure 8:
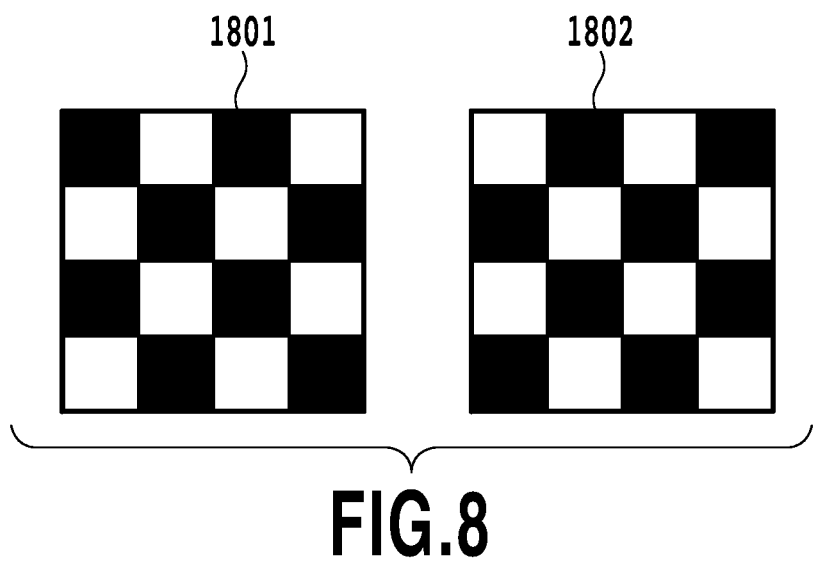
FIG. 8 is a diagram that illustrates one example of a mask pattern that can be applied in the present invention.
Figure 9A:
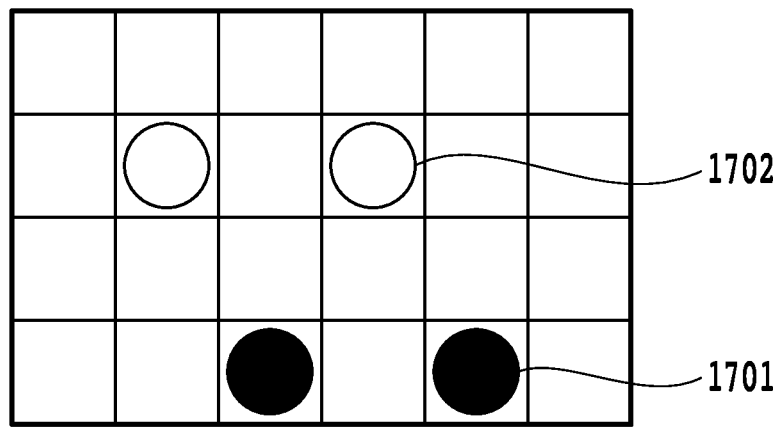
FIG. 9A is a diagram illustrating a state in which dots are dispersed.
Figure 9B:
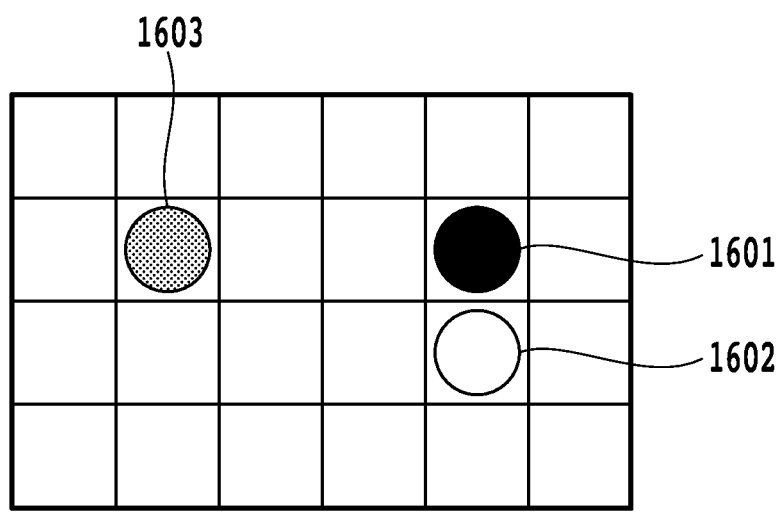
FIG. 9B is a diagram illustrating a state in which locations of overlapping dots and touching dots are arranged irregularly.
Figure 10:
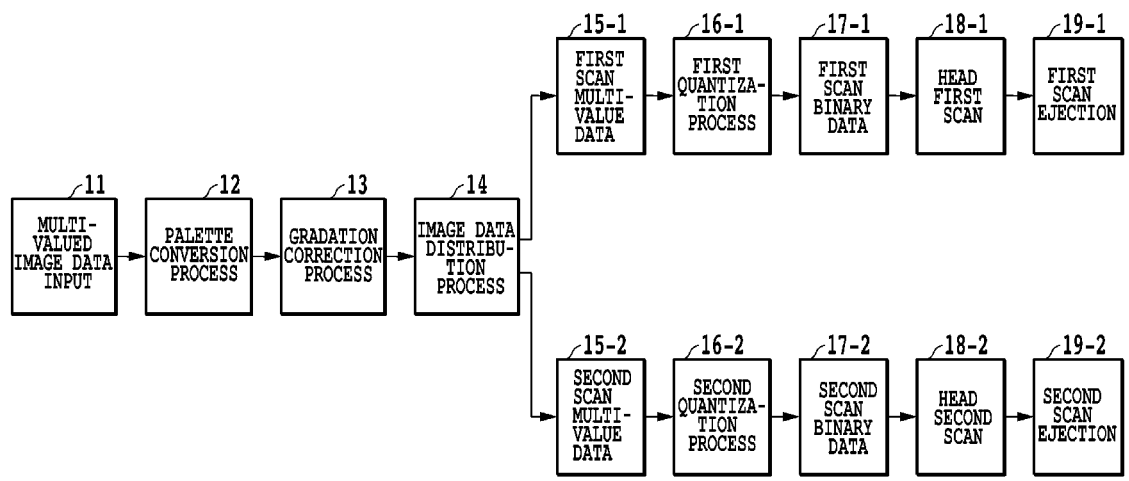
FIG. 10 is a block diagram for explaining the image data dividing method that is disclosed in Japanese Patent Laid-Open No. 2000-103088 or Japanese Patent Laid-Open no. 2001-150700.

In the case of dividing the binary image data into N divisions, generally N number of masks are used, and in this embodiment where the binary image data is divided into two divisions, two masks 1801, 1802 as illustrated in FIG. 8 are used. These two masks have a complementary relationship with each other, so the binary data that are divided by these masks do not overlap each other. Therefore, the probability that dots that are printed by different nozzle arrays will overlap each other on paper is kept low, so when compared with controlling the rate of overlap of dots that is performed between printing scans described above, it is more difficult for graininess to occur. In FIG. 8, portions indicated in black are data for which printing of image data is allowed (1: data that does not mask image data), and portions indicated in white are data for which print image data is not allowed (0: data that masks image data).

The first scan binary data division processing unit and second scan binary data division processing unit perform division processing using this kind of mask 1801, 1802. More specifically, the first scan binary data division processing unit 27-1 generates binary data 28-1 for the first nozzle array by performing a logical AND operation for the binary data K1" (26-1) and the mask 1801 for each pixel. Similarly, the first scan binary data division processing unit 27-1 generates binary data 28-2 for the second nozzle array by performing a logical AND operation for the binary data K1" (26-1) and the mask 1802 for each pixel. On the other hand, the second scan binary data division processing unit 27-2 generates binary data 28-3 for the first nozzle array by performing a logical AND operation for the binary data K2" (26-2) and the mask 1801 for each pixel. Similarly, the second scan binary data division processing unit 27-2 generates binary data 28-4 for the second nozzle array by performing a logical AND operation for the binary data K2" (26-2) and the mask 1802 for each pixel. Here, the first scan binary data division processing unit 27-1 and second scan binary data division processing unit 27-2 use a set of the same mask patterns 1801 and 1802; however they can also use a set of different mask patterns.

After that, all of the binary image data (28-1 to 28-4) is stored in buffers (29-1 to 29-4) that are prepared for each corresponding scan of the corresponding nozzle array. In addition, after the necessary amount of binary image data is stored in each of the buffers, the printing operation is executed according to the data stored in the corresponding buffer.

Figure 12:
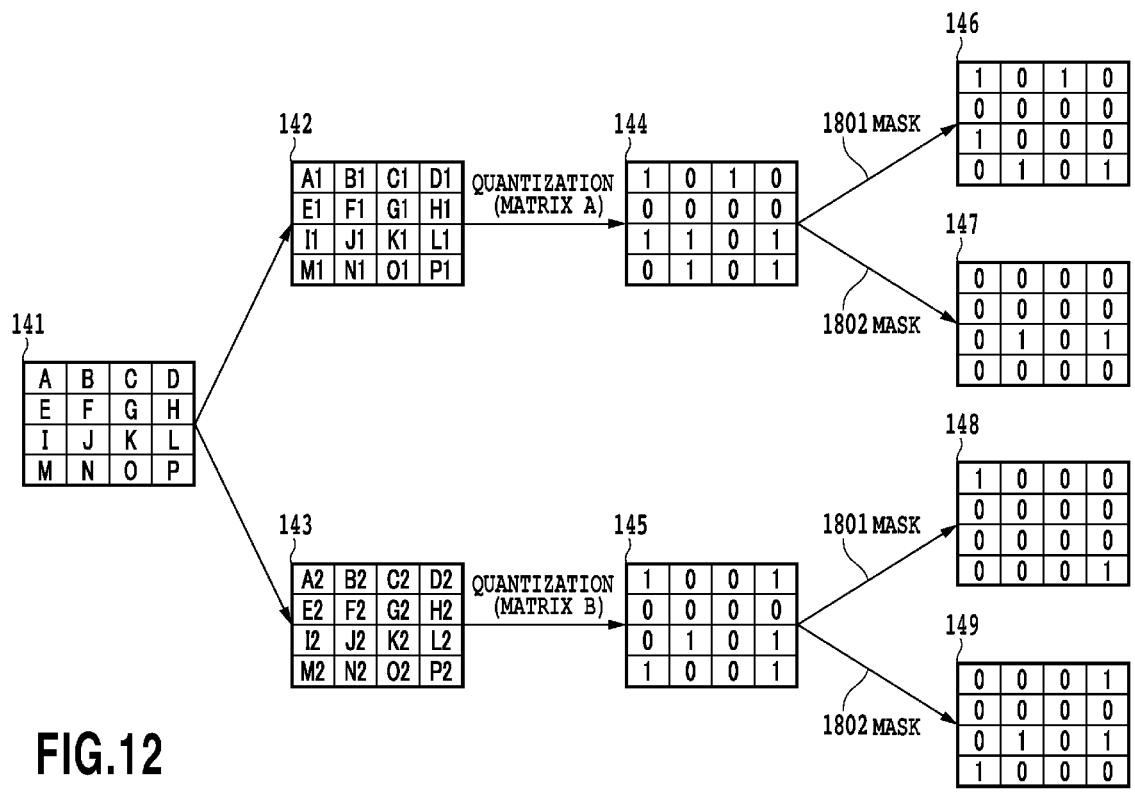
FIG. 12 is a schematic diagram for explaining a detailed example of the image process illustrated in FIG. 21.

In the following, the image processing explained using FIG. 21 will be explained in more detail using FIG. 12. FIG. 12 is a diagram of a detailed example of the image processing illustrated in FIG. 21. Here, the case is explained in which processing is performed for input image data 141 that corresponds to 4 pixels×4 pixels for a total of 16 pixels. Reference codes A to P indicate combinations of RGB values corresponding to each pixel of input image data 141. Reference codes A1 to P1 indicate combinations of CMYK values corresponding to each pixel of multi-valued image data 142 for the first scan. Reference codes A2 to P2 indicate combinations of CMYK values corresponding to each pixel of multi-valued image data 143 for the second scan.

In the figure, the multi-valued image data 142 for the first scan corresponds to the multi-value data 24-1 for the first scan in FIG. 21, and the multi-valued image data 143 for the second scan corresponds to the multi-value data 24-2 for the second scan in FIG. 21. Moreover, the quantized data 144 for the first scan corresponds to the binary data 26-1 for the first scan in FIG. 21, and the quantized data 145 for the second scan corresponds to the binary data 26-2 for the second scan in FIG. 21. Furthermore, the quantized data 146 for the first scan that corresponds to the first nozzle array corresponds to the binary data 28-1 in FIG. 21, and the quantized data 147 for the first scan that corresponds to the second nozzle array corresponds to the binary data 28-2 in FIG. 21. In addition, the quantized data 148 for the second scan that corresponds to the first nozzle array corresponds to the binary data 28-3 in FIG. 21, and the quantized data 149 for the second scan that corresponds to the second nozzle array corresponds to the binary data 28-4 in FIG. 21.

First, the input image data 141 (RGB data) is input to the color conversion/image data division unit 22 in FIG. 21. After that, the color conversion/image data division unit 22 uses the three-dimensional LUT to convert the input image data 141 (RGB data) to multi-valued image data 142 (CMYK data) for the first scan, and to multi-valued image data 143 (CMYK data) for the second scan for each pixel. For example, when the RGB values for the input image data indicated by the reference code A is (R, G, B)=(0, 0, 0), the CMYK values of the multi-valued image data 142 that is indicated by reference code A1 is (C1, M1, Y1, K1)=(0, 0, 0, 128). Moreover, the CMYK values for the multi-valued image data 143 that is indicated by the reference code A2 is (C2, M2, Y2, K2)=(0, 0, 0, 127). In this way, the color conversion/image data division unit 62 generates two multi-valued image data (142 and 143) corresponding to two scans based on the input image data 141. The processing after this (gradation correction processing, quantization processing, mask processing) is performed in parallel and independently for each CMYK color, so in the following, for convenience of the explanation, only an explanation for the color black (K) will be presented, and an explanation for the other colors will be omitted.

The multi-value data (142, 143) for the first scan and second scan that was obtained as described above is input to the quantization unit 25 in FIG. 21. The quantization unit 25 performs error diffusion processing of multi-value data (142, 143) for the first scan and second scan to generate quantized data (144, 145) for the first scan and second scan. More specifically, when performing error diffusion processing of the multi-value data 142 for the first scan, as illustrated in FIG. 26 and Table 1, threshold values that are used in the error diffusion processing are set based on the multi-value data 143 for the second scan. After that, the set threshold values and the error diffusion matrix A illustrated in FIG. 13A are used to perform error diffusion process for binarizing the multi-value data 142 for the first scan. By doing so, binary quantized data 144 for the first scan is generated. Similarly, when performing error diffusion processing of the multi-value data 143 for the second scan, as illustrated in FIG. 26 and Table 1, threshold values that are used in the error diffusion processing are set based on the multi-value data 142 for the first scan. After that, the set threshold values and the error diffusion matrix B illustrated in FIG. 13B are used to perform error diffusion process for binarizing the multi-value data 193 for the second scan. By doing so, binary quantized data 145 for the second scan is generated. Of the quantized data (149, 145) for the first scan and second scan, data that is '1' indicates that a dot is printed (ink is discharged), and data that is '0' indicates that not dot is printed (ink is not discharged).

Next, the first scan binary data division processing unit 27-1 divides the quantized data 199 for the first scan using a mask, and generates quantized data 146 for the first scan that corresponds to the first nozzle array, and quantized data 147 for the first scan that corresponds to the second nozzle array. More specifically, by thinning out the quantized data 144 for the first scan by using the mask 1801 in FIG. 8, quantized data 146 for the first scan that corresponds to the first nozzle array is obtained. Also, by thinning out the quantized data 199 for the first scan by using the mask 1802 in FIG. 8, quantized data 197 for the first scan that corresponds to the second nozzle array is obtained. On the other hand, the second scan binary data division processing unit 27-2 divides the quantized data 195 for the second scan using a mask, and generates quantized data 198 for the second scan that corresponds to the first nozzle array, and quantized data 149 for the second scan that corresponds to the second nozzle array. More specifically, by thinning out the quantized data 145 for the second scan by using the mask 1801 in FIG. 8, quantized data 148 for the second scan that corresponds to the first nozzle array is obtained. Also, by thinning out the quantized data 145 for the second scan by using the mask 1802 in FIG. 8, quantized data 149 for the second scan that corresponds to the second nozzle array is obtained. In this way, four kinds of binary data 146 to 149 to be printed by two arrays of nozzles in two printing scans are generated.

Incidentally, in this embodiment, binary data for the same scan that corresponds to the two nozzle arrays is generated using two mask patterns that are in a complementary relationship with each other, the dot overlap rate control described above is not applied between nozzle arrays. Of course, it is possible to apply dot overlap rate control between nozzle arrays as well as between scans, however, when dot overlap rate control is applied between nozzle arrays, the amount of data to be quantized increases, so the data processing load increases. Moreover, in many printers, shift in the printing position between nozzles tends to be less than the shift in the printing position between scans, so dot overlap rate control between nozzle arrays is not applied between nozzle arrays, and it is difficult for density unevenness due to density fluctuation to occur. For this reason, in this embodiment, dot overlap rate control is applied only between scans and not applied between nozzle arrays.

By performing the processing illustrated in FIG. 12 in this way, when binary image data (144, 145) that corresponds to different scans is overlapped, there is to a certain extent locations where dots overlap (pixels for which there is a '1' in both planes), so it is possible to obtain an image that is resistant to density fluctuation. On the other hand, there are not such a large number of locations where there is dot overlap, so there is not a worsening of graininess due to the overlap of dots. Furthermore, dot overlap rate control is applied one between scans and is not applied between nozzle arrays, so it is possible to suppress an increase in processing load due to dot overlap rate control, while it is possible obtain a good balance between a reduction in density unevenness and reduction in graininess.

As was explained above, with the present embodiment, quantization processing of multi-valued image data for a first scan and quantization processing of multi-valued image data for a second scan are executed based on both the multi-valued image data for the first scan and second scan. By doing so, in the two printing scans it is possible to output an image having the desired dot overlap rate, and a high-quality image having excellent robustness and reduced graininess can be obtained.

(Variation 1 of Embodiment 1)

Figure 25:
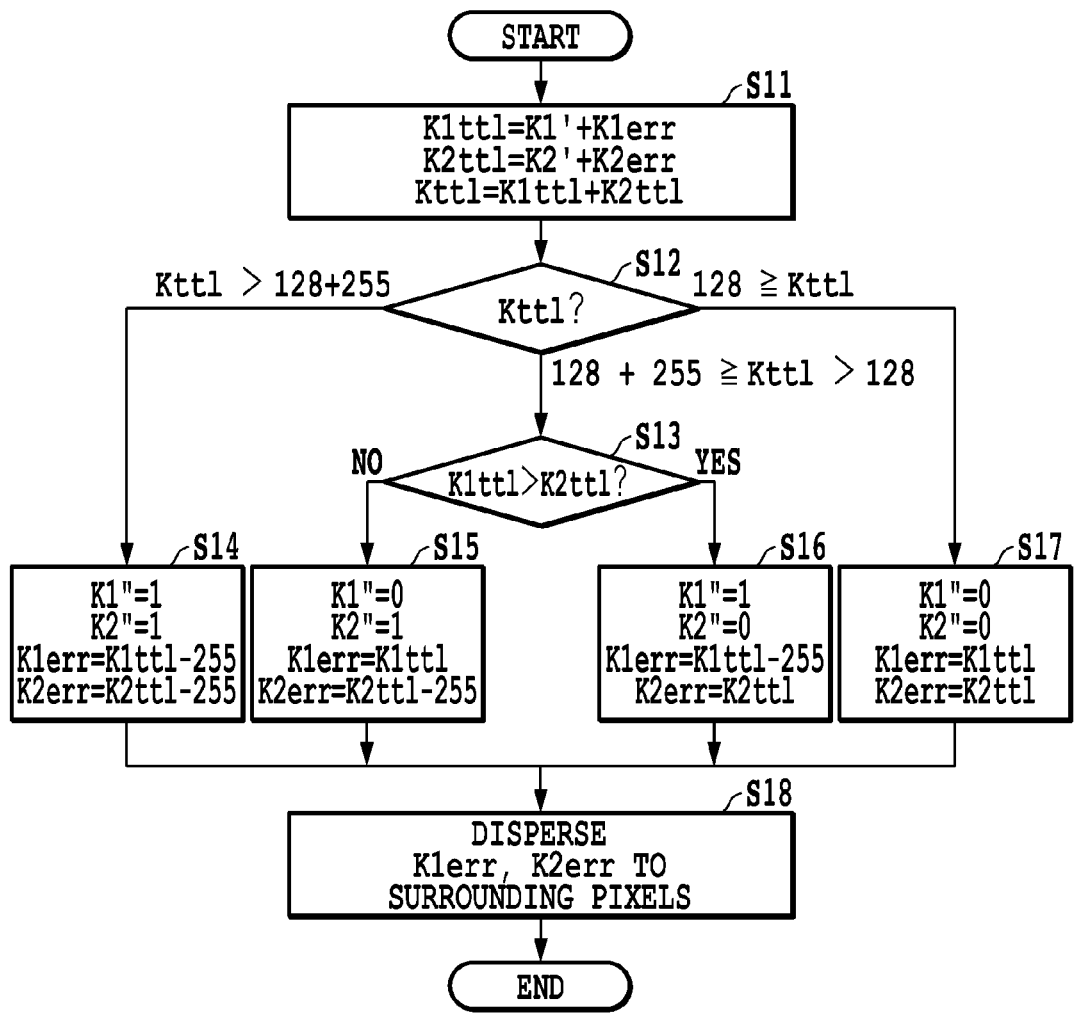
FIG. 25 is a flowchart for explaining one example of the quantization method that can be executed by the control unit 3000 of a variation of the first embodiment.
Figure 26:
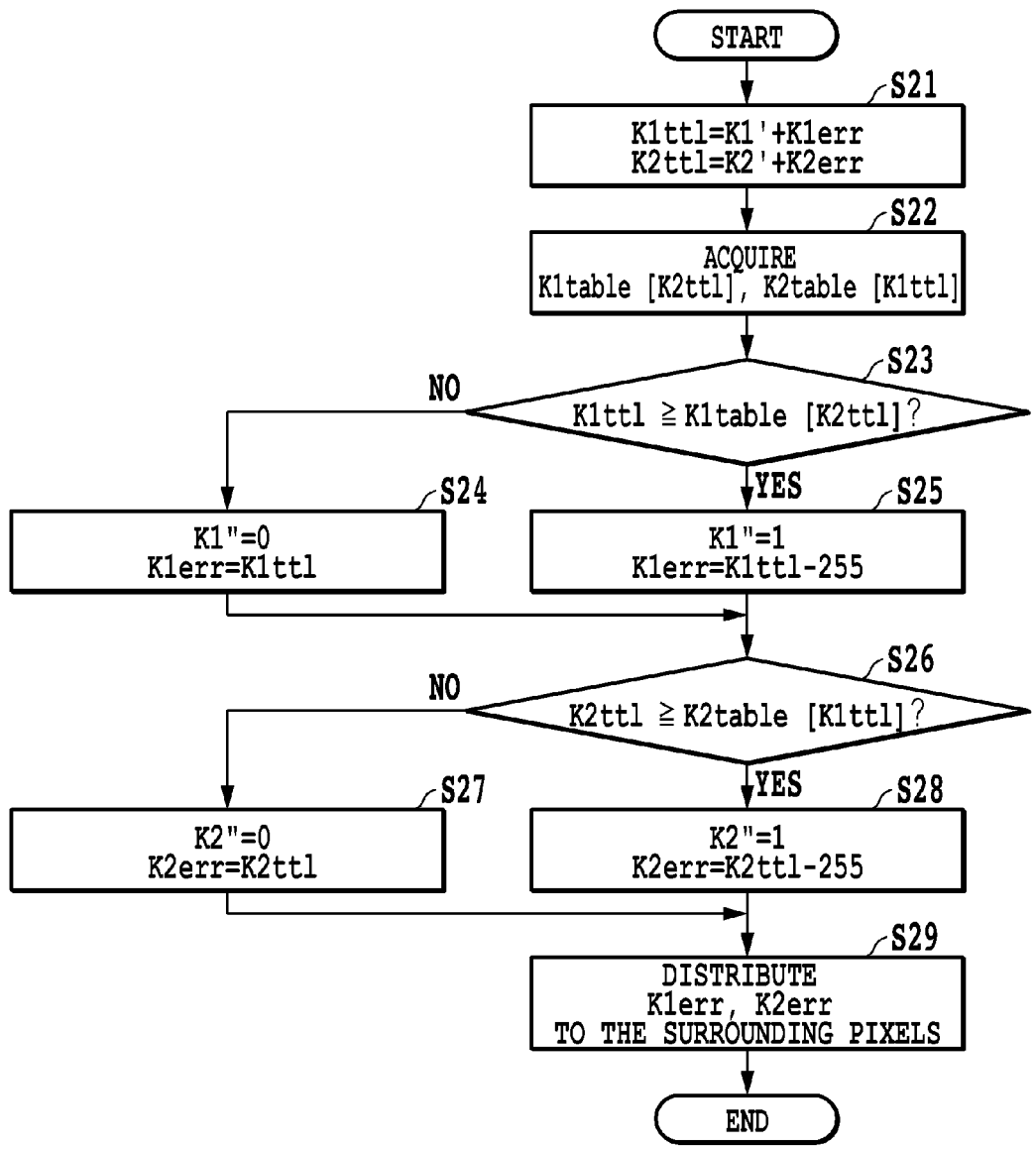
FIG. 26 is a flowchart for explaining one example of the quantization method that can be executed by the control unit 3000 the first embodiment.

As described above, the quantization processing that is suitably executed in this embodiment, is error diffusion processing that can control the dot overlap rate as was explained using FIG. 26; however, the quantization processing that can be applied in this embodiment is not limited to this. In the following, another example of quantization processing that can be applied in this embodiment is explained using FIG. 25.

FIG. 25 is a flowchart for explaining one example of an error diffusion method that the control unit 3000 of this embodiment can execute for reducing the dot overlap rate. In this flowchart, all of the parameters are the same as those explained in FIG. 26.

After starting the quantization process for the target pixel, first, in step S11, the values K1$ttl$ and K2$ttl$ are calculated, and further the value Kttl is calculated. When doing this, Kttl has a value 0 to 510. Continuing, in steps S12 to S17, values for K1" and K2" that correspond to binary quantized data are set according to the size relationship of the value of Kttl and K1$ttl$ and K2$ttl$.

When Kttl>128+255, processing advances to step S14, and both K1" and K2" are taken to be '1'. In addition, when Kttl≦128, processing advances to step S17, and both K1" and K2" are taken to be '0'. On the other hand, when 128+255≧Kttl>128, processing advances to step S13, and the size relationship of K1$ttl$ and K2$ttl$ is further investigated. In step S13, when K1$ttl$>K2$ttl$, processing advances to S16, and K1"=1 and K2"=0. When K1$ttl$≦K2$ttl$, processing advances to step S15, and K1"=0 and K2"=1.

In steps S14 to S17, the accumulated error values K1$err$ and K2$err$ are newly calculated and updated according to respectively set output values. In other words, when K1"=1, K1$err$=K1$ttl$−255, and when K1"=0, K1$err$=K1$ttl$. Similarly, when K2"=1, K2$err$ =K2$ttl$−255, and when K2"=0, K2$err$=K2$ttl$. Continuing further, in step S18, the updated accumulated error values K1$err$ and K2$err$ are diffused in to the surrounding pixels for which quantization processing has not yet been completed according to the specified diffusion matrices (for example, the diffusion matrices illustrated in FIGS. 13A and 13B). Here, the error diffusion matrix illustrated in FIG. 13A is used for diffusing the accumulated error value K1$err$ in surrounding pixels, and the error diffusion matrix illustrated in FIG. 13B is used for diffusing the accumulated error value K2$err$ in surrounding pixels.

With this variation 1 explained above, quantization processing of multi-valued image data for a first scan and quantization processing of multi-value imaged data for a second scan are executed based on multi-valued image data for both the first scan and the second scan. By doing so, it becomes possible to output an image having a desired dot overlap rate for the two scans, and a high-quality image having excellent robustness and low graininess is obtained.

(Variation 2 of Embodiment 1)

In the embodiment described above, an example of so-called 2-pass printing was explained in which printing is completed for the same area (for example pixel area) using two printing scans; however, this embodiment is not limited to 2-pass printing. This embodiment can also be applied to M-pass printing (M is an integer 2 or greater) such as 3-pass, 4-pass and 8-pass printing. In the following, image processing in the case of performing 3-pass printing will be explained.

In this second variation, the number of scans for the same area, or in other words, the number of multi-passes is set to three, and the dot overlap rate is controlled for three planes. In this case, the number of multi-value density data that is generated by the color conversion/image data division unit 22 in FIG. 21 is three. That is, by referencing a three-dimensional LUT that correlates the input image data (RGB) with the multi-value density data (C1M1Y1K1, C2M2Y2K2, C3M3Y3K3) that corresponds to three passes, the input image data is converted to multi-value density data at once. Along with that, the quantization processing unit 25 performs quantization processing of the three sets of multi-value data, or in other words, first multi-value data to third multi-value data, using threshold values that are obtained by referencing a prepared threshold value table, and outputs three sets of binary data.

Figure 14:
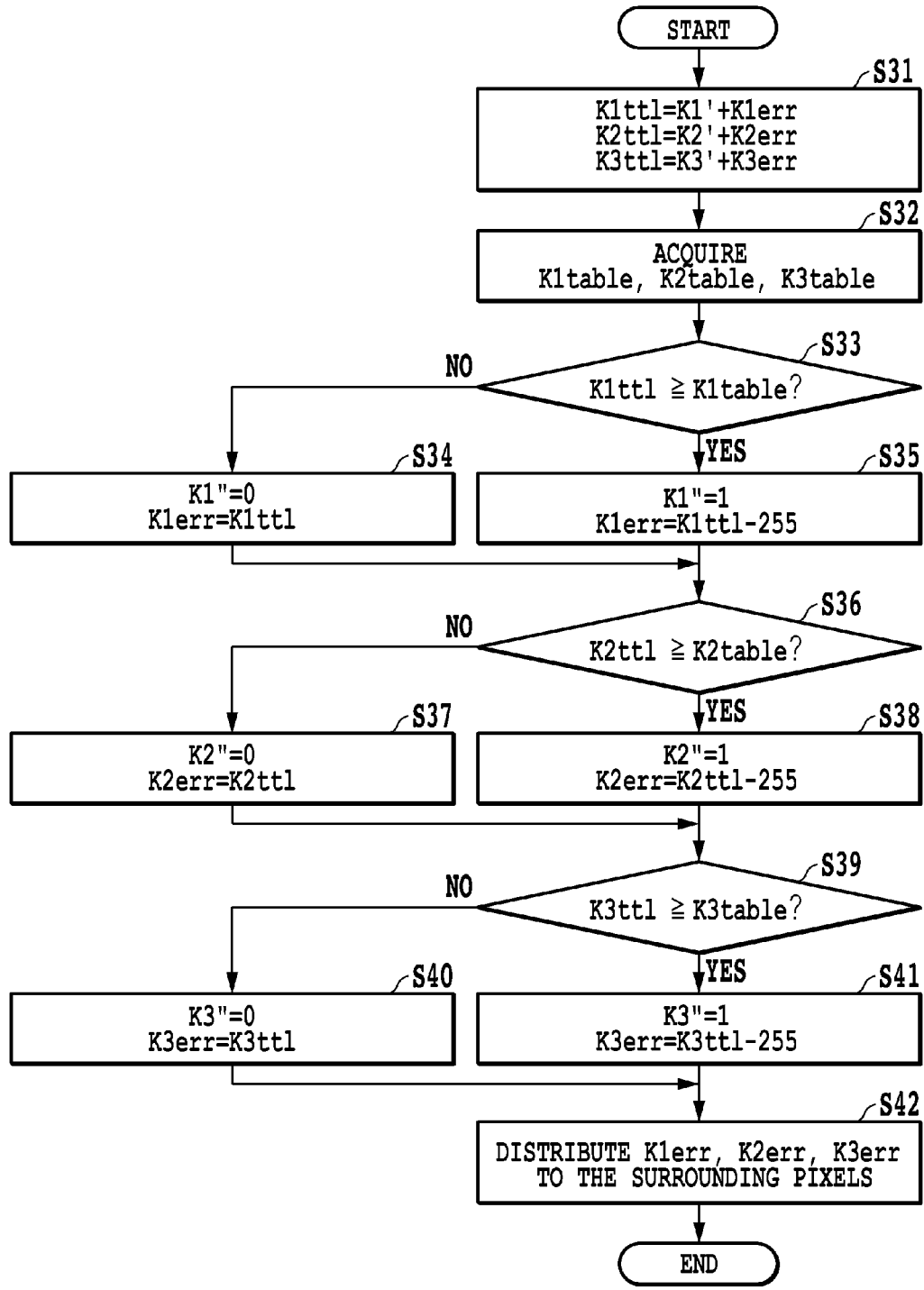
FIG. 14 is a flowchart for explaining the processing when the control unit 3000 executes 3-plane quantization.

FIG. 14 is a flowchart for explaining the processing when the control unit 3000 of this embodiment performs quantization of three planes of multi-value data that correspond to three scans. In the flowchart, the various parameters are the same as those explained in FIGS. 16A and 16B. However, for the third scan, the input multi-value data K3', accumulated error value K3$err$, total value of the input multi-value data and accumulated error value K3$ttl$ and the binary output data K3" are added. In addition, a threshold value for comparing with K3$ttl$ in order to set K3" is taken to be K3table, where this value K3table is a value that is set by referencing the threshold value table and by taking the maximum value from among the values for K1$ttl$ and K2$ttl$.

When this processing is started, first, in step S31, the values K1$ttl$, K2$ttl$ and K3$ttl$ are calculated, and further, in step S32, by referencing the threshold value table, the values K1table, K2table and K3table are acquired. In this example, the threshold value table that is referenced is the threshold value table illustrated by Table 1 that is increased by one row for K3table. In addition, for the value K1table, the larger value MAX [K2$ttl$, K3$ttl$] from between K2$ttl$ and K3$ttl$ becomes a reference value for selecting the threshold value. Moreover, for K2table, MAX[K1$ttl$, K3$ttl$] is a reference value for selecting the threshold value, and furthermore for K3table, MAX [K1$ttl$, K2$ttl$] is a reference value for selecting the threshold value.

Continuing, in steps S33 to S35, the value K1" is set, in steps S36 to S38, the value K2" is set, and in steps S39 to S41, the value K3" is set. When the value K1$ttl$, K2$ttl$ or K3$ttl$ is equal to or greater than the threshold value acquired in step S32, K1"=1 (step S35), K2"=1 (step S38) or K3"=1 (step S41). However, when the value K1$ttl$, K2$ttl$ or K3$ttl$ is less than the threshold value acquired in step S32, K1"=0 (step S34), K2"=0 (step S37) or K3"=0 (step S40). Moreover, the accumulated error values K1$err$, K2$err$ and K3$err$ are calculated and updated according to the respective output values. Furthermore, in step S42, the updated accumulated error values K1$err$, K2$err$ and K3$err$ are diffused into the surrounding pixels for which quantization processing has not yet been completed according to specified diffusion matrices. This completes this processing. Here as well, the error diffusion matrix illustrated in FIG. 13A is used for diffusing the accumulated error value K1*err* in surrounding pixels, and the error diffusion matrix illustrated in FIG. 13B is used for diffusing the accumulated error value K2*err* in surrounding pixels.

In the explanation above, the reference value for setting a threshold value (for example K1table) that is used when performing quantization of multi-value data that corresponds to the printing scan in question, is taken to be the maximum value (MAX[K2*ttl*, K3*ttl*]) of multi-value data that corresponds to another printing scan. However, in this embodiment, the reference values are not limited to this. For example, it is possible to take the sum of multi-value data that corresponds to a plurality of other printing scans (K2*ttl*+ K3*ttl*) as the reference value. Regardless of the method for setting the reference value, this method is effective as long as a threshold value table is prepared from which suitable threshold values are obtained for performing quantization of multi-value data of each individual printing scan.

By using the method explained above, it is possible to generate 3-pass data so that the desired dot overlap rates are achieved. In addition, by applying the method described above, it is possible to generate M-pass data even in the case of multi-pass printing in which the printing head scans the same area (for example, pixel area) of the printing medium M times (M is an integer 2 or greater) so that the desired dot overlap rates are achieved. In this case, in the quantization process for each of respective M-pass data, construction is such that threshold values are selected based on M number of sets of multi-value data.

(Variation 3 of Embodiment 1)

In the first embodiment described above, dot overlap rate control is applied only between scans and dot overlap rate control is not applied between nozzle arrays. However, it is possible to apply dot overlap rate control not only between scans but also between nozzle arrays. In the following, the respective advantages of applying dot overlap rate control between scans, and of applying dot overlap rate control between both scans and nozzle array are explained.

Printing position displacement between printing scans (cause A), and printing position displacement between nozzle arrays (cause B) are feasible causes of the density fluctuation described above. When dot overlap rate control is applied both between scans and between nozzle arrays in order to reduce density fluctuation caused by both of these causes, it is necessary to adjust the dot overlap rates for four planes based on the four planes of data described below. Here, the four planes are: a plane for the first scan by the first nozzle array, a plane for the second scan by the first nozzle array, a plane for the first scan by the second nozzle array and a plane for the second scan by the second nozzle array. The dot overlap rate control described above has a larger data processing load than divided processing using a mask pattern. Therefore, when controlling the dot overlap rate between all of the planes in order to handle printing position displacement due to both causes described above, there is a possibility that a lot of processing time are needed and the printing speed may decrease due to this processing.

Therefore, in the first embodiment described above, in order to reduce the data processing load and suppress density fluctuation due to printing position displacement, dot overlap rate control is applied only between scans in which there is a relatively large tendency for printing position displacement to occur. Also, dot overlap rate control is not applied between nozzle arrays in which there is a relatively small tendency for printing position displacement to occur. To explain this in more detail, in many printers, there is a smaller tendency for printing position displacement to occur between nozzle arrays than printing position displacement between scans. Particularly, in the case of using a printing head such as in FIG. 20 in which the nozzle arrays of each color are integrally arranged, it is difficult for density unevenness due to density fluctuation to appear even though dot overlap rate control is not applied between nozzle arrays. Therefore, precedence is placed more on reducing the data processing load than on reducing density unevenness, and dot overlap rate control is not applied between nozzle arrays. Moreover, dividing processing using masks is applied between nozzle arrays; however, these masks have a complementary relationship, so that binary data pairs that are divided by these masks do not overlap each other. Therefore, the probability that dot pairs that are printed by different nozzle arrays will overlap on paper becomes low, so that it is possible to reduce graininess more than when dot overlap rate control is applied between nozzle arrays.

For the reasons explained above, in the first embodiment, dot overlap rate control is applied only between scans and is not applied between nozzle arrays. However, this does not mean that there is absolutely no density unevenness due to density fluctuation caused by printing position displacement between nozzle arrays. For example, shifting of the printing position may occur between nozzle arrays due to manufacturing error of the printing head, or error that occurred when mounting the printing head into the printer, and there may be cases in which problems of density unevenness due to this cause may appear. In addition, when a head having nozzle arrays that are separate and independent is provided instead of a head having nozzle arrays that are integrated as in FIG. 20, it becomes easy for printing position displacement to occur between nozzle arrays. Therefore, when suppressing density unevenness takes precedence over reducing processing load, it is preferred that dot overlap rate control is applied between both scans and nozzle arrays. With this form, it is possible to reduce density unevenness due to printing position displacement that is caused by both causes described above.

Moreover, depending on the case, there is also a possibility that there will be a reversal in the size relationship between the amount of displacement of the printing position between nozzle arrays and the amount of displacement of the printing position between printing scans. For example, when the guide rails 5009 and 5010 illustrated in FIG. 5 are curved and the direction of the carriage 5008 varies during scanning, the displacement of the printing position between nozzle arrays may become larger than the displacement of the printing position between printing scans. In such a case, it is preferred that dot overlap rate control is applied just between nozzle arrays and mask division processing is applied between scans, or that dot overlap rate control is applied between nozzle arrays and between scans. In the case of the former, the data 24-1 in FIG. 21 becomes multi-value data for the first nozzle array and data 26-1 becomes binary data for the first nozzle array. In addition data 28-1 and data 28-2 become first nozzle array first scan binary data and first nozzle array second scan binary data, respectively. On the other hand, data 24-2 becomes multi-value data for the second nozzle array, and data 26-2 becomes binary data for the second nozzle array, and data 28-1 and data 28-2 become second nozzle array first scan binary data and second nozzle array second scan binary data.

(Other)

The explanation above was for the case in which in order to achieve desired dot overlap rates, a table is prepared that makes it possible to select threshold values for performing binarization (quantization) from reference values; however, the quantization method is not limited to the methods described above. It is not absolutely necessary to have construction in which printing (1) and no printing (0) are set through comparison with threshold values. For example, in the case of two planes, it is possible to prepare a two-dimensional table for which printing (1) or no printing (0) of K1" and K2" are set by taking both K1*ttl* and K2*ttl* as reference values. In addition, in the case of three planes, it is possible to prepare a three-dimensional table in which K1", K2" and K3" are set by taking the three values K1*ttl*, K2*ttl* and K3*ttl* as reference values.

The details of the table are omitted; however, using a multi-dimensional table such as this has merits in that it is possible to perform control more simply, and the dot overlap rate can be controlled more freely. On the other hand, using a one-dimensional threshold table such as that of Table 1 has merits in that the table using less memory capacity can be created.

Furthermore, it is also possible to perform binarization (quantization) processing using just branches and operations and not use a table at all. In that case, it is possible to obtain the effect of this embodiment by setting the various coefficients that are used for the operations to values that will achieve desired dot overlap rates. In such a case, it is possible to further reduce the memory capacity (consumed ROM size and RAM size) when compared with the case of preparing the tables described above.

(Embodiment 2)

In the first embodiment, quantization processing for controlling the dot overlap rate in a plurality of printing scans using the same color of ink, for example, black ink was explained. However, in this embodiment, in quantization processing that is capable of controlling the dot overlap rate for different colors in addition to dot overlap rate between printing scans will be explained.

In the case of cyan (C), magenta (M), yellow (Y) and black (K) that are typically used in an inkjet printer, the brilliance differ greatly among colors, as well as the amount that graininess and density unevenness stand out differs among colors. For example, when compared with yellow, the brilliance of cyan and magenta is low and can be visually recognized easily. Furthermore, when cyan and magenta overlap to form a blue color dot on the printing medium, a dot is formed that can be recognized even more easily. Therefore, it is preferred that the amount of overlapping of cyan and magenta is reduced to reduce graininess.

Therefore, in this embodiment, in addition to controlling the dot overlap rate between two printing scans as explained in the first embodiment, the dot overlap rate between different colors of ink such as cyan and magenta is controlled. In this case, for example, it becomes necessary to take into consideration the dot overlap state between the following four planes. That is, a plane for the first scan using cyan ink (first ink color), a plane for the second scan using cyan ink, a plane for the first scan using magenta ink (second ink color) and a plane for the second scan using magenta ink.

Figure 24:
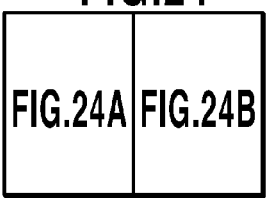
FIG. 24 is a diagram showing the relationship of FIGS. 24A and 24B.
Figure 24A:
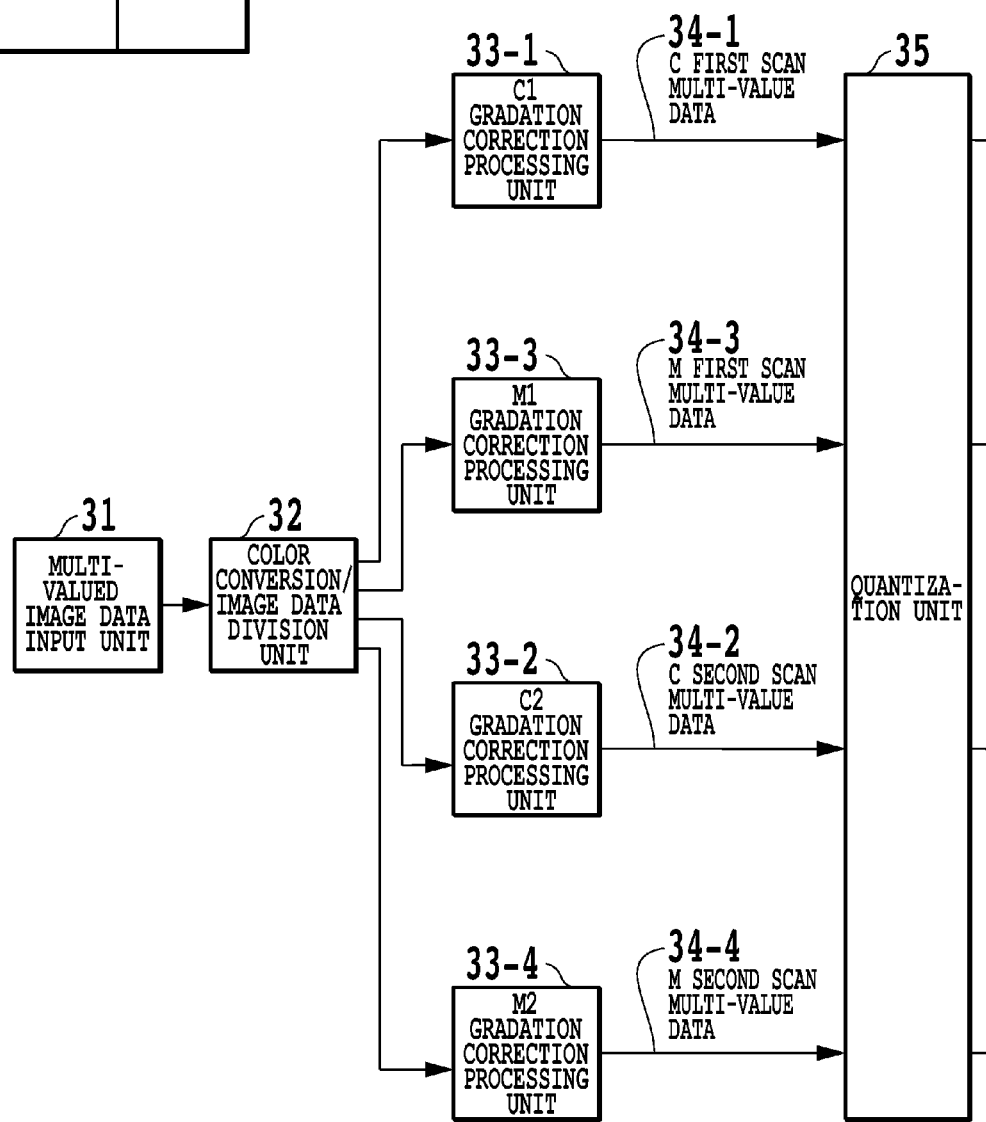
FIG. 24A is a block diagram for explaining image processing for the colors cyan and magenta when performing multi-pass printing to complete an image in the same area using two printing scans.
Figure 24B:
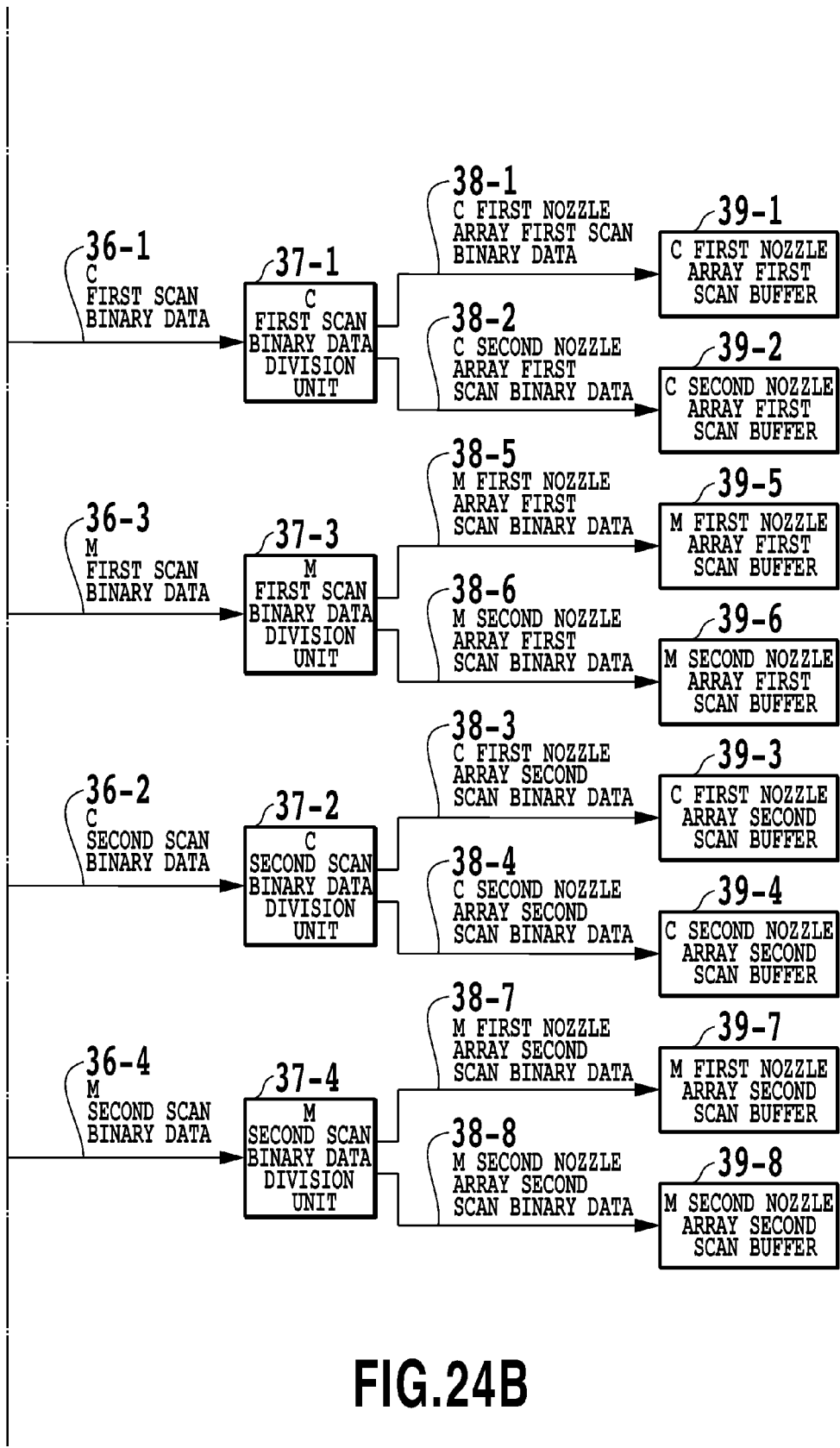
FIG. 24B is a block diagram for explaining image processing for the colors cyan and magenta when performing multi-pass printing to complete an image in the same area using two printing scans.

FIGS. 24A and 24B are block diagrams for explaining the image processing of this embodiment for cyan ink and magenta ink when performing multipass printing to complete an image in the same area of a printing medium using two scans.

The processing from the multi-valued image data input unit 31 to the color conversion circuit/image division unit 32 is the same as the processing from the multi-valued image data input unit 21 to the color conversion circuit/image division unit 22 in FIG. 21, so here an explanation thereof is omitted.

From this processing, preceding multi-value data (C1', M1', Y1', K1') for a first scan that is performed first and multi-value data (C2', M2', Y2', K2') for a second scan that follows are generated. The processing that is performed after will be explained for cyan ink (first ink color) a magenta ink (second ink color).

The multi-value data that is generated by the color conversion circuit/image division unit 32 is input to gradation correction processing units 33-1 to 33-4. The gradation correction processing units 33-1 to 33-9 generate multi-value data (C1') 34-1 for the first scan using color C, multi-value data (C2') 34-2 for the second scan using color C, multi-value data (M1') 39-3 for the first scan using color M, and multi-value data (M2') 34-4 for the second scan using color M. In addition, the gradation correction processing units 33-1 to 33-4 inputs these four kinds of multi-value data (C1', C2', M1', M2') to a quantization unit 35.

Figure 15:
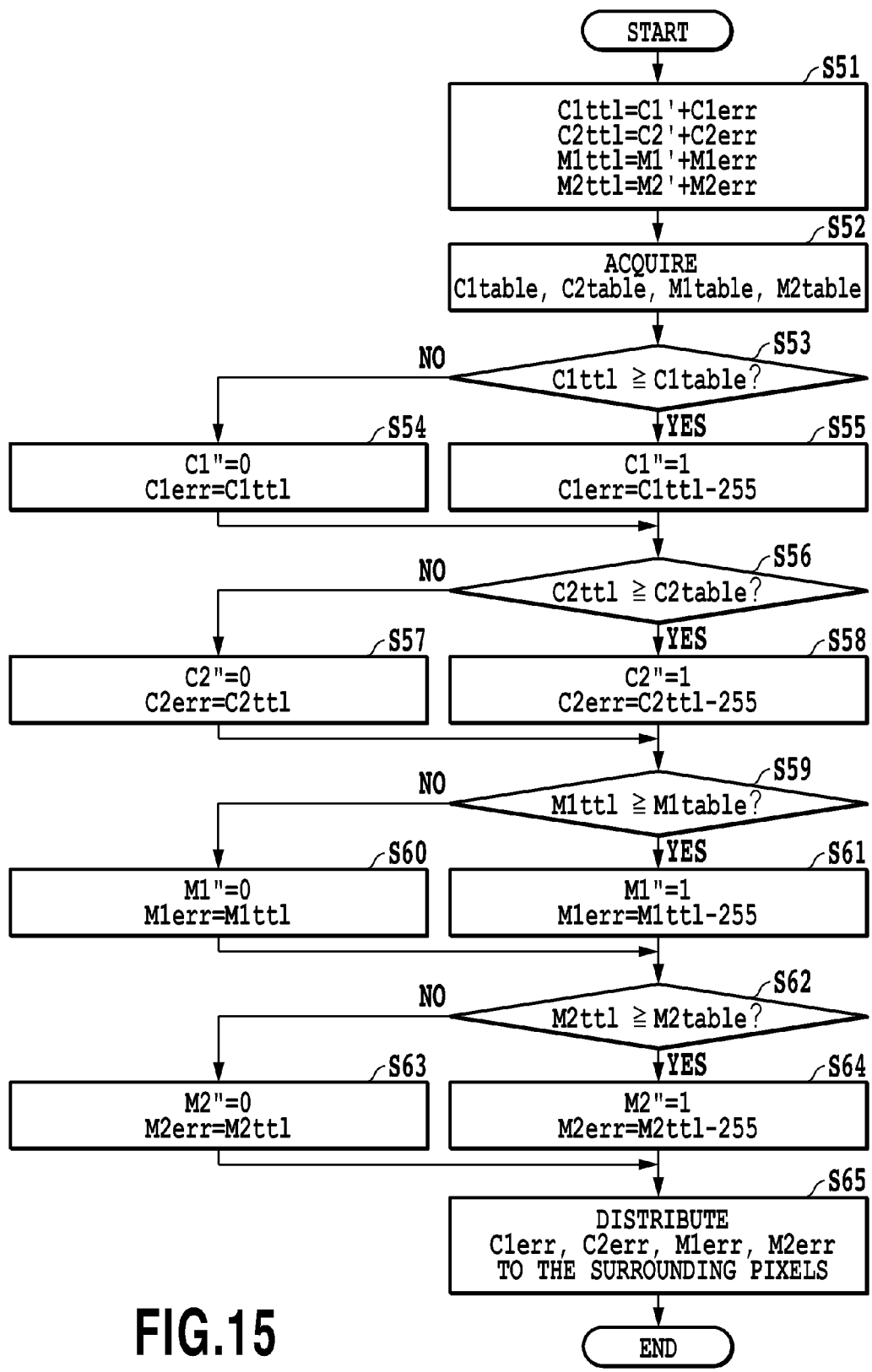
FIG. 15 is a flowchart for explaining one example of quantization processing that the control unit 3000 executes in order to reduce the dot overlap rate.

FIG. 15 is a flowchart for explaining one example of the quantization processing that the quantization unit 35 included in the control unit 3000 of this embodiment executes for reducing the dot overlap rate. C1' and C2' are multi-value data (first and third multi-valued image data) for two scans using the color cyan (first ink color) for the target pixel, and have a value 0 to 255. M1' and M2' are multi-value data (second and fourth multi-valued image data) for two scans using the color magenta (second ink color), and have a value 0 to 255. Moreover, C1*err*, C2*err*, M1*err* and M2*err* are accumulated error values that occur in the surrounding pixels for which quantization processing has already been executed. In addition, C1*ttl*, C2*ttl*, M1*ttl* and M2*ttl* are total values of the input multi-value data and accumulated error values for the target pixel.

Furthermore, C1" and C2" are binary output data (first binary data) of the respective scans. Also, M1" and M2" are binary output data (second binary data) of the respective scans. The value C1table is taken to be a threshold value for comparison with C1*ttl* when setting C1", and the value C2table is taken to be a threshold value for comparison with C2*ttl* when setting C2". Similarly, the value M1table is taken to be a threshold value for comparison with M1ttl when setting M1", and the value M2table is taken to be a threshold value for comparison with M2*ttl* when setting M2".

When this processing is started, first, in step S51 the values C1*ttl*, C2*ttl*, M1*ttl* and M2*ttl* are calculated, then in step S52, the values C1table, C2table, M1table and M2table are acquired by referencing the threshold value table. In this embodiment, the table that is referenced is the threshold value table in Table 1 in which the values C1table, C2table, M1table and M2table are set from one reference value. Here, the maximum value MAX[C2*ttl*, M1*ttl*, M2*ttl*] among the values C2*ttl*, M1*ttl* and M2*ttl* is the reference value for selecting the threshold value C1table. The maximum value MAX[C1*ttl*, M1*ttl*, M2*ttl*] among the values C1*ttl*, M1*ttl* and M2*ttl* is the reference value for selecting the threshold value C2table. Moreover, the maximum value MAX[C1*ttl*, C2*ttl*, M2*ttl*] among the values C1*ttl*, C2*ttl* and M2*ttl* is the reference value for selecting the threshold value M1table. Furthermore, the maximum value MAX[C1*ttl*, C2*ttl*, M1*ttl*] among the values C1*ttl*, C2*ttl* and M1*ttl* is the reference value for selecting the threshold value M2table.

In continuing steps S53 to S55 the value C1" is set, in steps S56 to S58 the value C2" is set, in steps S59 to S61 the value M1" is set, and in steps S62 to S64 the value M2" is set. When the values C1*ttl*, C2*ttl*, M1*ttl* or M2*ttl* are equal to or greater than the respective threshold values that were acquired in step S52, C1"=1 (S55), C2"=1 (S57), M1"=1 (S60) or M2"=1 (S63) respectively. However, when the values C1*ttl*, C2*ttl*, M1$ttl$ or M2$ttl$ less than the respective threshold values that were acquired in step S52, C1"=0 (S54), C2"=0 (S56), M1"=0 (S59) or M2"=0 (S62) respectively. In addition, the accumulated error values C1$err$, C2$err$, M1$err$ and M2$err$ are calculated and updated according to the respective output values. Furthermore, using a specified diffusion matrix (for example the diffusion matrix indicated in FIGS. 13A and 13B), the accumulated error values C1$err$, C2$err$, M1$err$ and M2$err$ are diffused into the surrounding pixels for which quantization processing has not yet been completed. The processing is then complete. By the quantization processing unit 35 quantizing the four kinds of multi-valued image data (C1', C2', M1', M2') 34-1 to 4 in this way, four kinds of binary image data (C1", C2", M1", M2") 36-1 to 4 are generated. In referencing FIG. 24 again, after obtaining the binary image data C1", C2", M1" and M2" for achieving the desired dot overlap rate, the quantization processing unit 35 sends these four kinds of data to the printer engine illustrated in FIG. 3 via an IEEE1284 bus 3022.

The printer engine 3004 divides the binary image data C1" for the first scan and the binary data C2" for the second scan into data to be printed by the two respective nozzle arrays 51 and 58. That is, a first scan binary data division processing unit 37-1 divides data C1"(36-1) into binary data 38-1 for the first scan by the first nozzle array and binary data 38-2 for the first scan by the second nozzle array. Also, a second scan binary data division processing unit 37-2 divides data C2" (36-2) into binary data 38-3 for the second scan by the first nozzle array and binary data 38-4 for the second scan by the second nozzle array. Moreover, a first scan binary data division processing unit 37-3 divides data M1" (36-3) into binary data 38-5 for the first scan by the first nozzle array and binary data 38-6 for the first scan by the second nozzle array. Furthermore, a second scan binary data division processing unit 37-4 divides data M2" (36-4) into binary data 38-7 for the second scan by the first nozzle array and binary data 38-8 for the second scan by the second nozzle array. The division processing by the binary data division processing units 37-1 to 37-4 is executed using masks that are stored in memory beforehand as in the first embodiment.

The image data 38-1 to 38-8 that is generated in this way is stored in buffers (39-1 to 39-8) that are prepared for each of the scans that correspond to the corresponding nozzle arrays. After that, the printing operation is executed according to the data that is stored in the corresponding buffers. With the embodiment explained above, a quantization table for achieving a desired dot overlap rate of cyan dots and magenta dots is prepared in advance, and using the table, quantization processing of multi-value data for a first scan and second scan of cyan and magenta is executed. By doing so, it becomes possible to output a high-quality image having excellent robustness and reduced graininess of mixed colors.

An example was explained above in which a combination of cyan ink and magenta ink are used as a combination of different inks for which dot overlap rate control is performed, however, in this embodiment, the combination of different color ink to which the embodiment can be applied is not limited to this. For example, this embodiment can also be applied to combinations such as a combination of yellow ink and cyan ink, or a combination of yellow ink and magenta ink. (Embodiment 3)

In the second embodiment, obtaining threshold values for acquiring binary data for a first scan and second scan by cyan nozzle arrays, and binary data for a first scan and second scan by magenta nozzle arrays from one common table was explained. However, actually, the degree to which image distortion due to a printing position displacement between a plurality of scans using the same color ink stands out, and the degree to which image distortion due to a printing position displacement between different color inks stands out are not always the same.

For example, generally when using a printing head 5004 in which nozzle arrays of each color are integrally arranged as illustrated in FIG. 20, it is expected that the printing position displacement between scans will be larger than the printing position displacement between different colors. In other words, in this case, it is preferred that the dot overlap rate between printing scans be larger than the dot overlap rate between different colors. On the other hand, in the case where the guide rails 5009 and 5010 as illustrated in FIG. 5 are curved and the inclination of the carriage 5008 fluctuates during scanning, for example, it can be expected that the printing position displacement between different colors will be larger than the print position displacement between printing scans. That is, in that case, it is preferred that the dot overlap rate between different colors be set larger than the dot overlap rate between printing scans.

In this embodiment, in or to handle this kind of situation, table (first threshold table) for performing quantization that places emphasis on the dot overlap rate between different colors (between cyan and magenta) and table (second threshold table) for performing quantization that places emphasis on dot overlap rate between printing scans are prepared. In these threshold value tables, contents are independently set according to the printer or printing head characteristics in order that the appropriate dot overlap rate is obtained.

Figure 16B:
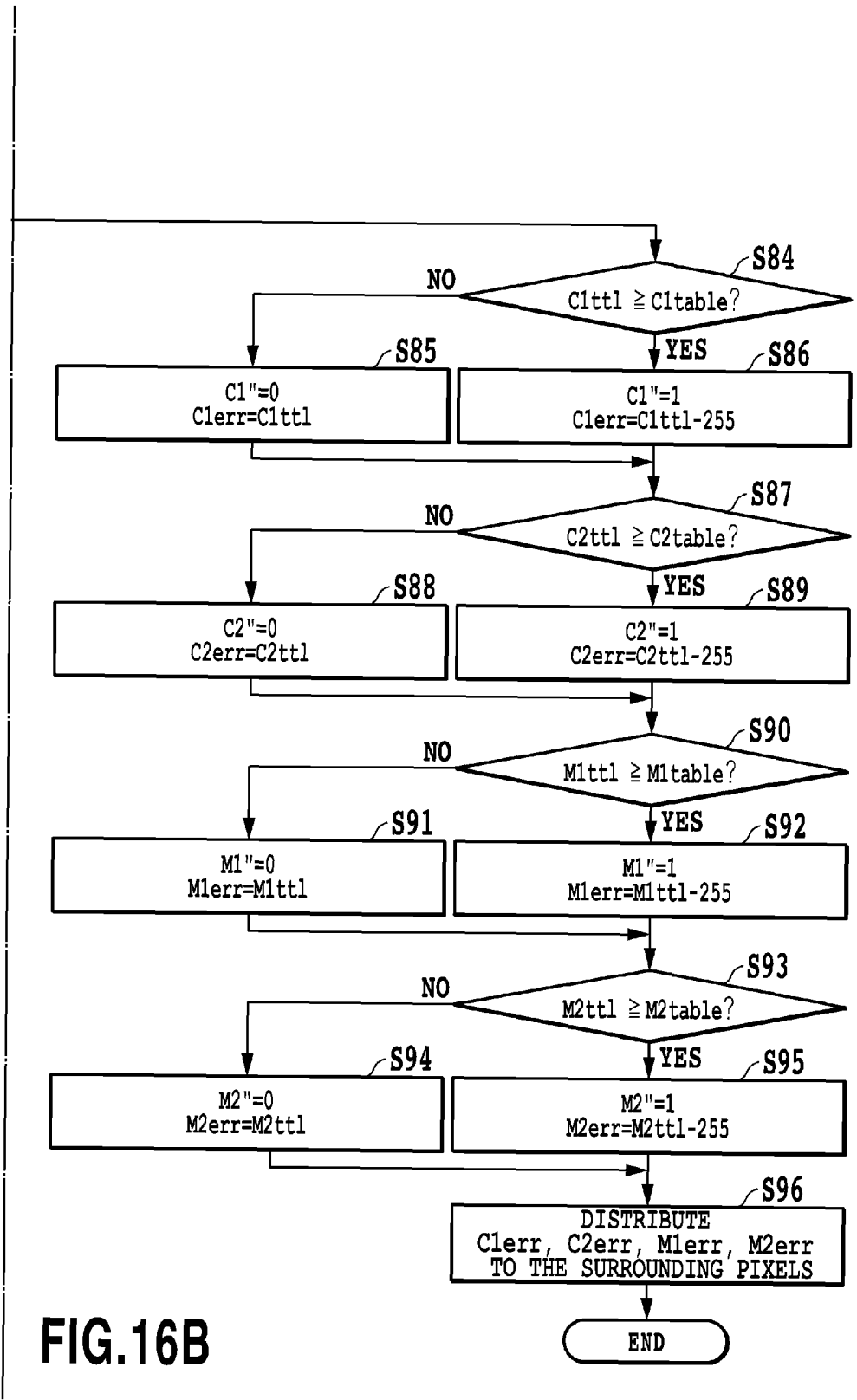
FIG. 16B is a flowchart for explaining the processing when the control unit 3000 executes quantization processing.

FIGS. 16A and 16B are a flowchart for explaining the processing when the control unit 3000 of this embodiment executes quantization processing. In this flowchart, the parameters are the same as those explained using FIG. 15. Here, the first tables for controlling the dot overlap rate, of multi-value data C1 for a first printing scan and multi-value data C2 for a second printing scan using cyan with respect to magenta, are taken to be C1table_col and C2table_col. In addition, the second tables for controlling the dot overlap rate between these printing scans are taken to be C1table_pass and C2table_pass. On the other hand, the tables for controlling the dot overlap rate, of multi-value data M1 for a first printing scan and multi-value data M2 for a second printing scan using magenta, with respect to cyan are taken to be M1table_col and M2table_col. Moreover, the second tables for controlling the dot overlap rate between these printing scans are taken to be M1table_pass and M2table_pass.

When this processing starts, first, in step S71, C1$ttl$, C2$ttl$, M1$ttl$ and M2$ttl$ are calculated. Next, in steps S72 to S82, tables that are referenced for setting threshold values when performing quantization are set for C1, C2, M1 and M2.

For example, for C1, it is determined in step S72 whether or not C2$ttl$ is the maximum value among the values C2$ttl$, M1$ttl$ and M2$ttl$. When C2$ttl$ is the maximum value, more emphasis is placed on the printing position displacement between printing scans than on the printing position displacement between different colors, so processing advances to step S74, and the table C1table_pass is referenced using C2$ttl$ as a reference value to obtain the threshold value C1table. On the other hand, when C2$ttl$ is not the maximum value, more emphasis is placed on the printing position displacement between different colors than on the printing position displacement between printing scans, so processing advances to step S73, and the C1table_col is referenced with the maximum value between M1$ttl$ and M1$ttl$ as a reference value to obtain the threshold value C1table. The process described above is also performed for C2, M1 and M2 to obtain the four threshold values C1table, C2table, M1table and M2table.

The processing after that is the same as in steps S53 to S65 explained using FIG. 15. In other words, the obtained threshold value is compared with the multi-value data to which the accumulated error is added, and either printing (1) or no printing (0) is set, after which the accumulated error is corrected and dispersed to the surrounding pixels.

With the embodiment explained above, even when there are a plurality of combinations as in the case of C1, C2, M1 and M2, it is possible to execute quantization by placing emphasis on the overlap rate of combinations for which there is more concern of problems due to printing position displacement.

In the flowchart explained using FIGS. 16A and 16B, in step S72 for example, the case of setting reference tables (C1table_pass, C1table_col) based on the size relationship of the multi-value data (C2, M1, M2) was explained. However, whether or not give preference to dot overlap rate between colors or to give preference to dot overlap rate between printing scans can be changed according to other various factors instead of the size relationship of the multi-value data. In the case of preparing a plurality of threshold value tables as in this embodiment, it is preferred to use various judgment materials to set the threshold value table to be referenced.

(Embodiment 4)

In the first thru third embodiments, cases were explained in which a series of processes from inputting image data to printing were all performed at a resolution that is equal to the printing resolution. However, recently, as printing resolution continues to increase, when all processes are performed at a resolution that is equal to the printing resolution, that processing requires a very large amount of memory and time, and the load on the printer becomes large. Therefore, it is useful to perform the main image processing at a resolution that is lower (rougher) than the printing resolution, and to send data to the printer engine of the printer after converting 256 gradation multi-valued image data to multi-value data having a lower gradation L value (L is 3 or greater). In this case, the printer engine has dot patterns (index patterns) in memory for converting the received multi-value data having a low gradation L value to binary data that corresponds to the printing resolution. In the following, an example of 3-value conversion will be presented as an example of L-value conversion; however, the value of L is not limited to 3, and needless to say, various values such as L=4, 5, 9 or 16 are possible.

Figure 23:
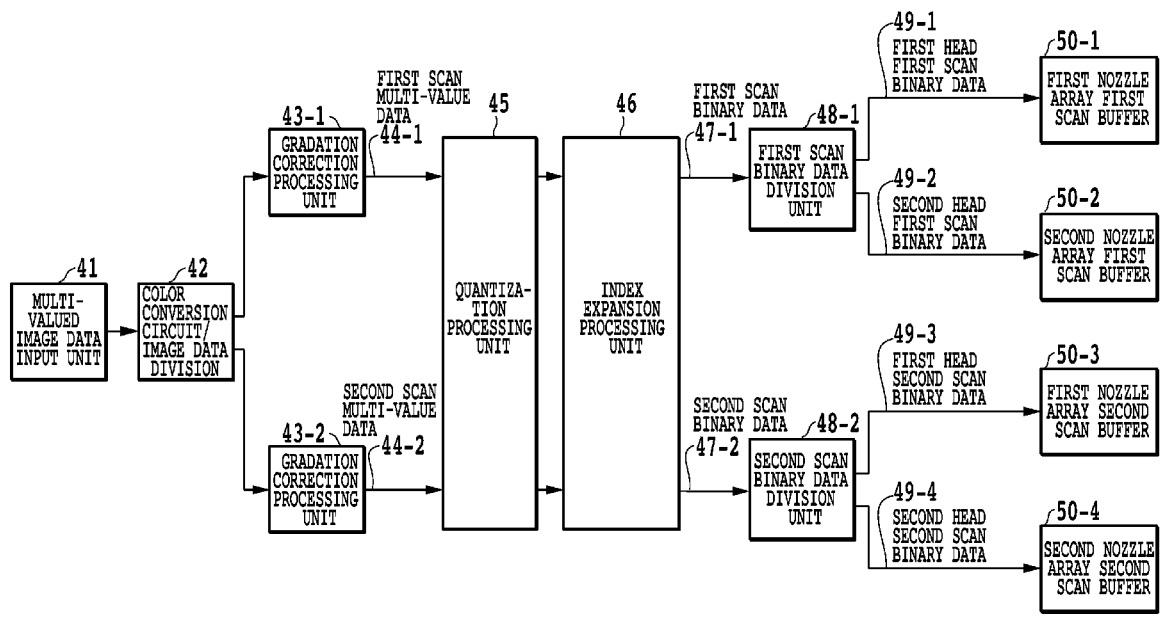
FIG. 23 is a block diagram for explaining image processing of a fourth embodiment when performing multipass printing to complete an image in the same area using two printing scans.

FIG. 23 is a block diagram for explaining image processing in the case of performing multi-pass printing to complete an image in the same area (for example, pixel area) by two printing scans. The processing from the multi-valued image data input unit 41 to the gradation correction processing unit 43 is the same as the processing from the multi-valued image data input unit 21 to the gradation correction processing unit 23 illustrated in FIG. 21, so an explanation thereof is omitted here. The following explanation is only for the color black (K).

The multi-value data (K1') 44-1 for the first scan and the multi-value data (K2') 44-2 for the second scan are inputted to the quantization processing unit 45. The quantization processing unit 45 quantizes multi-value data (K1') for the first scan and the multi-value data (K2') for the second scan to the three values 0 to 2, to generate quantized data (K1") for the first scan and quantized data (K2") for the second scan. More specifically, as in the quantization processing performed by the quantization processing unit 25 in the third embodiment, first the values K1$ttl$ and K2$ttl$ of accumulated error around K1' and K2' are obtained. After that, a threshold value that is used when quantizing the multi-value data (K1') for the first scan is set based on K2$ttl$, and a threshold value that is used when quantizing the multi-value data (K2') for the second scan is set based on K1$ttl$.

In this embodiment, quantization to three values is performed, so that two threshold values, or in other words, a first threshold value and a second threshold value that is greater than the first are used. Moreover, an output value is set according to the size relationship of the total values of the input multi-value data for the target pixel and accumulated error values (total values: K1$ttl$ and K2$ttl$), and the first and second threshold values. In other words, when a total value is equal to or greater than the second threshold value, the output value becomes '2'; when a total value is equal to or greater than the first threshold value but less than the second threshold value, the output value becomes '1', and when a total value is less than the first threshold value, the output value becomes '0'.

In this way, the multi-value data (K1') for the first scan is quantized based on the threshold value that is set based on K2$ttl$ to obtain quantized data (K1") for the first scan. Similarly, the multi-value data (K2') for the second scan is quantized based on the threshold value that is set based on K1$ttl$ to obtain quantized data (K2") for the second scan. As the method for setting the first threshold value and the second threshold value, as in the example of binarization, a first threshold value table and second threshold value table can be set using the same reference values.

Figure 18:
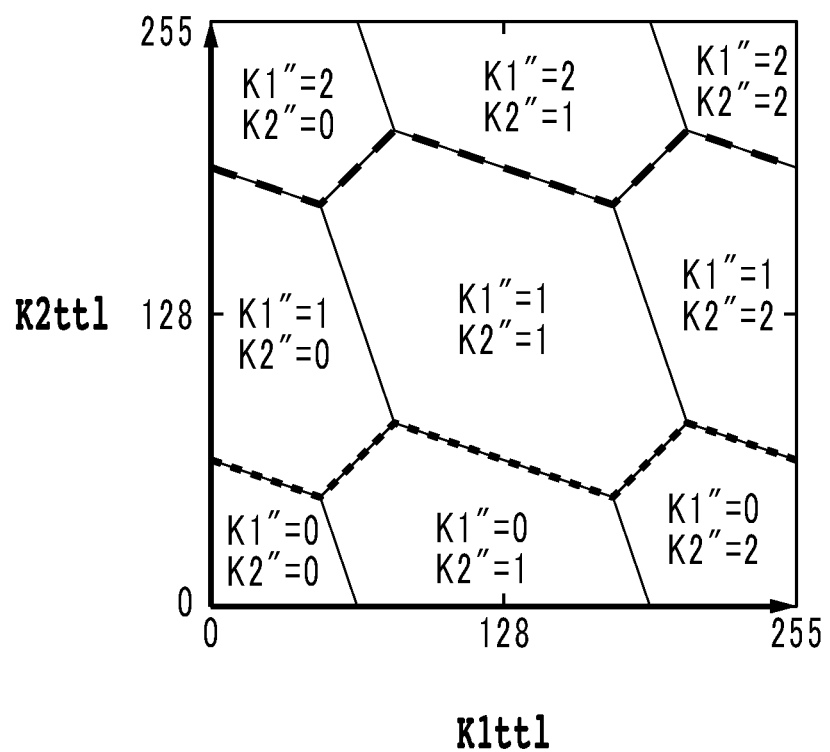
FIG. 18 is a diagram illustrating the correlation between 3-value quantization processing (K1", K2") and input values (K1$ttl$, K2$ttl$) of the quantization processing unit 45.

FIG. 18 is a diagram similar to FIGS. 22A to 22G that illustrates the correlation between results (K1" and K2") of quantization (trinarization) processing by the quantization processing unit 45, and the input values (K1$ttl$ and K2$ttl$). In FIG. 18, the values K1" and K2" indicate the number of dots printed for the target pixel for both the first printing scan and the second printing scan. Here, the first threshold value that is used for quantizing K2$ttl$ is indicated by a thick dotted line, and the second threshold value is indicated by thick dashed line.

For example, two dots each are printed in both the first printing scan and second printing scan for the target pixel when both K1" and K2" are 2. In addition, one dot is printed in the first scan and two dots are printed in the second scan for the target pixel when K1" is 1 and K2" is 2. Moreover, no dots are printed for the target pixel when both K1" and K2" are 0.

Referring to FIG. 23 again, the 3-value image data (quantized data) K1" and K2" that are quantized by the quantization processing unit 45 are sent to the printer engine 3004, and the index expansion processing unit 46 performs index processing. The index expansion process is a binarization process of the L (L is an integer 3 or greater) value quantized data, so can be taken to be part of the quantization process. This index expansion processing will be explained in detail below.

Next, this index expansion processing unit 46 converts the 3-value image data K1" to binary image data 47-1 for the first scan (binary quantized data for first scan), and converts the 3-value image data K2" to binary image data 47-2 for the second scan (binary quantized data for first scan). After that, a first scan binary data division unit 48-1 divides the binary image data 47-1 for the first scan into binary data 49-1 for the first scan by the first nozzle array, and binary data 49-2 for the first scan by the second nozzle array. Similarly, a second scan binary data division unit 48-2 divides the binary image data 47-2 for the second scan into binary data 49-3 for the second scan by the first nozzle array, and binary data 49-4 for the second scan by the second nozzle array. This division process is executed using mask patterns as in the first embodiment. In addition, these four kinds of binary data (49-1 to 4) are stored in corresponding buffers (50-1 to 4). After that, after a specified amount of binary data has been stored in each individual buffer, the printing operation is executed according to the data stored in the corresponding buffers.

Figure 19:
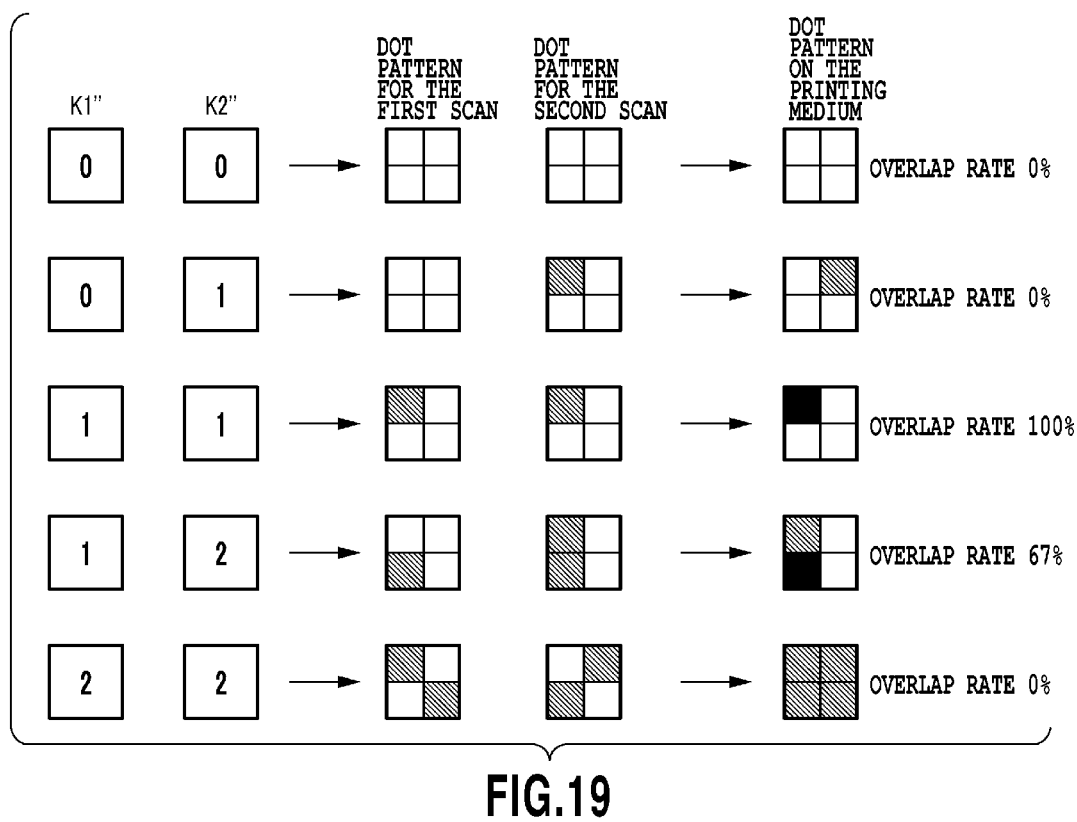
FIG. 19 is a diagram for explaining the dot overlap rate when performing an index expansion process.

FIG. 19 is a diagram for explaining one example of the index expansion processing and index patterns (dot patterns) of this embodiment. The index expansion processing unit 46 of this embodiment converts 3-value image data (K1", K2") that corresponds to one pixel to binary image data (dot patterns) that corresponds to 2 sub pixels×2 sub pixels. More specifically, 3-value image data K1" having any value from 0 to 2 is converted to a dot pattern for the first scan. Similarly, 3-value image data K2" having a value from 0 to 2 is converted to a dot pattern for the second scan. Moreover, a pattern (the dot pattern on the printing medium that is illustrated on the very right side of the figure) obtained by overlapping the dot pattern for the first scan and the dot pattern for the second scan is printed for the pixel. In regards to the dot patterns for the first and second scans, a shaded section is data ('1' data) indicating that a dot is printed for the sub pixel, and a white section is data ('0' data) indicating that no dot is printed for the sub pixel. Also, in regards to the dot pattern on the printing medium, a black section means that two dots are printed for the sub pixel, a shaded section means that one dot is printed for the sub pixel, and a white section means that no dots are printed for the sub pixel.

Here, FIG. 19 is used to explain the dot overlap rate for the case in which image process that converts 3-value or greater image data corresponding to a pixel to a binary dot pattern corresponding to m×n sub pixels is used. The 'dot overlap rate' in such a case indicates the percentage of dots that are overlapped and printed in the same sub pixel position in a pixel area by different scans (or different printing element groups) with respect to the total number of dots to be printed in the pixel area which is made up of a plurality of sub pixels. To explain in more detail, referencing FIG. 19, when both K1" and K2" are '0', no dots are printed in either the first printing scan or second printing scan and the dot overlap rate is 0%. When one of K1" and K2" is '0', and the other of K1" and K2" is '1', a dot is printed in only one of the scans, so the dot overlap rate remains 0%. When both K1" and K2" are '1', two dots are overlapped and printed in the upper left sub pixel of the 2 sub pixels×2 sub pixels, so the dot overlap rate is 100% (=2÷2×100). Moreover, when one is '1' and the other is '2', two dots are overlapped and printed for the lower left sub pixels of the 2 sub pixels×2 sub pixels, and only one dot is printed for the upper left sub pixel, so that the dot overlap rate is 67% (=2÷3×100). Furthermore, when both K1" and K2" are '2', no dots are overlapped in the sub pixels, so the overlap rate is 0%. In other words, by preparing index patterns (dot patterns) in advance that having one-to-one correspondence with each of the levels illustrated in FIG. 19, the dot overlap rates of pixel areas are also set by setting the combinations of K1" and K2" in the quantization process illustrated in FIG. 18.

With this embodiment as explained above, by using a method as illustrated in FIG. 18 and dot patterns as illustrated in FIG. 19, as well as by using index expansion processing, it is possible to output an image having the desired dot overlap rate. As a result, it is possible to output a high-quality image having excellent robustness and reduced graininess at high speed and high resolution.

(Embodiment 5)

Density unevenness that occurs when there is a printing position displacement between a plurality of planes can be reduced by a certain extent by designing masks. Therefore, in this embodiment, by further adjusting the dot overlap rate between planes while taking advantage of the effect of these masks, it is possible to output an image having even better robustness.

The image processing method of this embodiment is the same as the image processing method explained for the first embodiment except that the masks used are different. Therefore, in this embodiment, as in the first embodiment, dot overlap rate control processing is performed by the quantization processing unit 25. In addition, the point of performing division processing by using masks is common in these two embodiments, however, in this embodiment, horizontally long masks as will be described later, are used, which is different than in the first embodiment.

In the following, the mask will be explained. The masks are a collection of binary data for which allowing (1) and not allowing (0) printing is set in advance for each individual pixel (or sub pixel). When actually executing the division process, a logical AND operation is performed for binary data (K1" or K2") having value 1 or 0 and the binary data of the mask for each individual pixel (or sub pixel), and that result becomes the output value for the first nozzle array or second nozzle array.

Here, in the case of a horizontally long mask in which data (printing allowed mask pixels) that allow printing (1) continue for a certain extent in the main scanning direction, it is difficult for density unevenness to occur even when there is the printing position displacement in the main scanning direction such as when there is scanning fluctuation of the carriage. Moreover, in the case of a vertically long mask in which data (printing allowed mask pixels) that allow printing (1) continue for a certain extent in the sub scanning direction, it is difficult for density unevenness to occur even when there is printing position displacement in the sub scanning directions such as when there conveyance fluctuation of the printing medium. However, on the other hand, when using these vertically long and horizontally long masks, density unevenness may be found easily in a case in which a printing position displacement occurs in the direction perpendicular to the longitudinal direction of mask, or in other words, the sub scanning direction in the case of a vertically long mask, and the main scanning direction in the case of a horizontally long mask.

Moreover, as was explained in the embodiment above, in the method of reducing density unevenness by increasing the dot overlap rate, graininess begins to become noticeable as the dot overlap rate becomes too high. Therefore, in this embodiment, by using both the method of reducing density unevenness by using masks, and the method of reducing density unevenness by controlling the dot overlap rate in a complimentary way so that the respective adverse effects do not appear, it is possible to output a high-quality image in which density unevenness does not stand out. In the following, that method will be explained in detail.

In a printer, printing position displacement between planes occurs due to various reasons, however, it is possible to predict to a certain extent the direction and amount of displacement that will occur during printing. For example, printing displacement in the main scanning direction due to factor 1 is taken to be Xerr1, printing displacement in the sub scanning direction due to factor 1 is taken to be Yerr1, printing displacement in the main scanning direction due to factor 2 is taken to be Xerr2 and printing displacement in the sub scanning direction due to factor 2 is taken to be Yerr2. Moreover, Xerr1 ≈0, Yerr2≈0 and Xerr2>Yerr1. In this case, the sum of the amount of printing displacement due to factor 1 and factor 2 becomes $\sqrt{(Yerr1)^2+(Xerr2)^2}$, with this value being larger than Yerr1 and Xerr2.

In this embodiment, the method of adjusting the dot overlap rate and the method of handling the mask horizontally long (or vertically long) are separately applied to the two factors that are different in displacement amount and displacement directions. More specifically, printing position displacement due to factor 1 is handled by adjusting the dot overlap rate, and printing position displacement due to factor 2 is handled by applying a horizontally long mask. By doing so, the printing position displacement which is to be reduced by controlling the dot overlap rate can be limited to Yerr1. As a result, it is possible to reduce the density unevenness without the graininess becoming bad due to increasing the dot overlap rate more than is necessary.

This embodiment as explained above adjusts the dot overlap rate while performs the method of reducing density unevenness through the use of masks when a printing position displacement occurs caused by plurality of factor. This makes it possible to output a high-quality image having excellent robustness without a drop in the processing speed.

(Embodiment 6)

In the first embodiment described above, when executing the M-pass mode of 3 passes or more, M groups of multi-valued image data that corresponds to M number of relative movements were generated, however, the present invention is not limited to this. In the M-pass printing mode of 3 passes or more, it is not absolutely necessary to generate M groups of density data, and it is possible to generate P (N is an integer 2 or greater) groups of density data, where P is less than M. In this case, first, P groups of density data are generated, where P is less than M, after which the P groups of density data are quantized according to the contents of the embodiments described above to generate P groups of quantized data. After that, at least one group of the P groups of quantized data is divided to obtain M groups of quantized data for M number of passes.

In the following, an example of the 3-pass mode will be explained in more detail. First, first multi-valued image data which corresponds to both the first and third relative displacements, and second multi-valued image data that corresponds to the second relative movement are generated based on input image data (RGB data) that corresponds to the same area (pixel area). Next, quantized data A is obtained by performing quantization processing on the first multi-valued image data based on the second multi-valued image data, and by dividing this quantized data A using a mask pattern, quantized data for the first relative movement and quantized data for the third relative movement are obtained. On the other hand, quantized data for the second relative movement is obtained by performing quantization processing of the second multi-valued image data based on the first multi-valued image data. In this way it is possible to obtain quantized data (binary data) for three relative movements.

Next, an example of a 4-pass mode will be explained. In the case of a 4-pass mode, first, first multi-valued image data that corresponds to both a first and second relative movements, and second multi-valued image data that corresponds to both a third and fourth relative movements are generated based on input image data (RGB) data that corresponds to the same area (pixel area). Next, quantized data B is obtained by performing quantization processing of the first multi-valued image data based on the second multi-valued image data, and by dividing this quantized data B using a mask pattern, quantized data for the first relative movement and quantized data for the second relative movement are obtained. On the other hand, quantized data C is obtained by performing quantization processing of the second multi-valued image data based on the first multi-valued image data, and by dividing this quantized data C using a mask pattern, quantized data for the third relative movement and quantized data for the fourth relative movement are obtained. In this way, quantized data (binary data) for four relative movements can be obtained.

As is clear from the explanation above, in the M-pass printing mode of the present invention, P groups (where P is less than M) of multi-valued image data can be generated as in this sixth embodiment, or M groups of multi-valued image data can be generated as in the first embodiment described above. In short, in the present invention, first multi-valued image data that corresponds to at least one relative movement from among a plurality of relative movements, and second multi-value image that corresponds to at least one other relative movement from among a plurality of relative movements are generated.

(Embodiment 7)

In the first thru sixth embodiments, cases of generating a plurality of multi-valued image data that corresponds to a plurality of relative scans based on input image data, and performing characteristic quantization processing of this plurality of multi-valued image data were explained, however, the present invention is not limited to this. It is also possible to replace the plurality of relative movement (scans) in the first thru sixth embodiments with a plurality of printing element groups. In other words, as described above, there may also be cases in which a printing position displacement between nozzle arrays is greater than a printing position displacement between printing scans. In such a case, it is feasible to apply dot overlap rate control just between nozzle arrays, and to apply mask division processing between scans. Therefore, in this embodiment, as illustrated in FIG. 17, a plurality of multi-image data that corresponds to a plurality of printing element groups is generated based on input image data, and special quantization processing is performed for that plurality of multi-image data.

Figure 17:
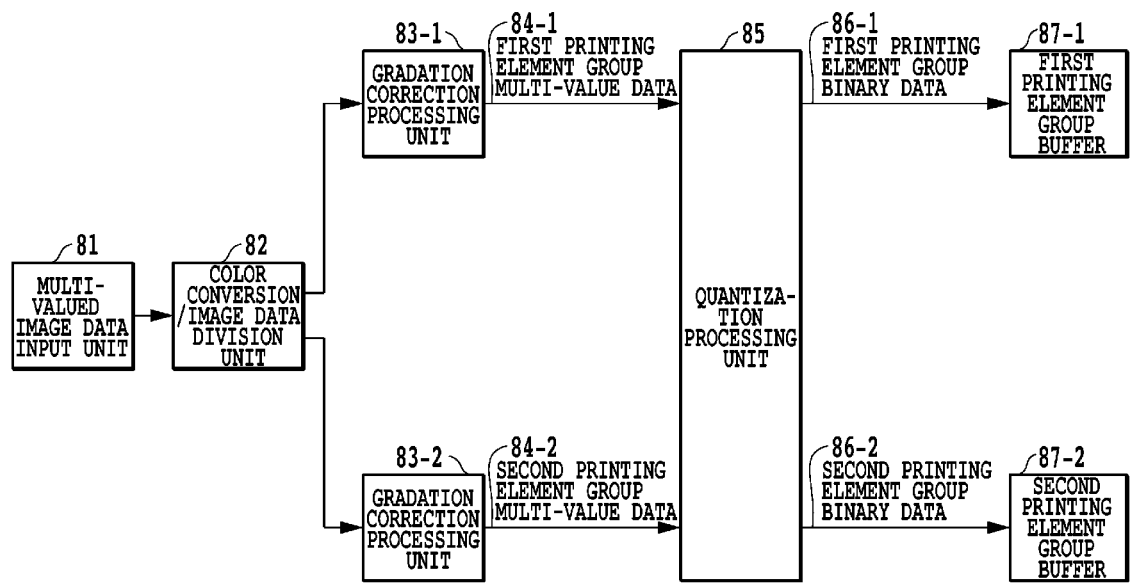
FIG. 17 is a block diagram for explaining image processing of a seventh embodiment when performing multipass printing to complete an image in the same area using two printing element groups.

FIG. 17 is a block diagram for explaining the image processing of this embodiment. In this embodiment, a printing head having two printing element groups for discharging the same kind of ink as illustrated in FIG. 20 is used. Moreover, printing is performed in the same area during one relative movement by the two printing element groups (first printing element group, second printing element group) discharging this same kind of ink. In the figure, the multi-valued image data input unit 81 and gradation correction processing unit 83-1 and 83-2 having the same functions as the multi-valued image data input unit 21 and gradation correction processing unit 23 illustrated in FIG. 21. Furthermore, the color conversion/image data division processing unit 82 and quantization processing unit 85 are functionally the same as the color conversion/image data division processing unit 22 and quantization processing unit 25 illustrated in FIG. 21, however, the data that they handle is different. In FIG. 21, data that corresponds to printing scans is handled, and in this figure, data that corresponds to printing element groups is handled.

Multi-value RGB data (256 values) is inputted by the multi-valued image data input unit 81. For each pixel, the color conversion/image data division unit 82 converts this inputted image data (RGB data) to two divisions of multi-valued image data (CMYK data) that correspond to two printing element groups. The gradation correction processing units 83-1 and 83-2 perform gradation correction processing (density correction processing) of these two divisions of multi-valued image data. By doing so, multi-valued image data 84-1 for the first printing element group and multi-valued image data 84-2 for the second printing element group are generated.

The multi-valued image data 84-1 for the first printing element group and the multi-image data 84-2 for the second printing element group for which gradation correction processing is performed are then quantized by the quantization processing unit 85. The quantization processing by this quantization processing unit 85 is the same as the processing of the first embodiment that was explained in FIG. 25, FIG. 26 and FIG. 14. As a result of this kind of quantization processing, binary image data 86-1 for the first printing element group (first quantized data) and binary image data 86-2 for the second printing element group (second quantized data) are generated.

After that, the binary image data 86-1 for the first printing element group is transferred to the first printing element group, and the binary image data 86-2 for the second printing element group is transferred to the second printing element group. In addition, during one relative movement, as the first printing element group is driven based on the binary image data 86-1 for the first printing element group, the second printing element group is driven based on the binary image data 86-2 for the second printing element group. By doing so, printing is performed for the same area during one relative movement by the two printing element groups (first printing element group, second printing element group) for discharging the same kind of ink.

In this embodiment, an example of using a printing head in which two arrays each of nozzle arrays (printing element groups) for discharging the same color ink are arranged was explained, however the invention is not limited to this. The number of nozzle arrays (printing element groups) for discharging ink of the same color could be N (N is an integer 2 or greater) such as 4, 8 or the like. In that case, N groups of multi-valued image data that correspond to N number of printing element groups can be generated from input image data, and the special quantization processing described above can be performed for the N groups of multi-value data that correspond to the N number of printing element groups.

Moreover, in the explanation above, when N number of printing element groups are used, N groups of multi-valued image data that correspond to the N number of printing element groups are generated, however, the invention is not limited to this. When using N number of printing element groups (where N is 3 or more), it is not absolutely necessary to generate N groups of multi-valued image data, and form is possible in which Q groups (Q is an integer 2 or more, and is less than N) of multi-valued image data are generated. In that case, it is possible to apply the sixth embodiment, where first Q groups of multi-valued image data are generated (where Q is less than N), after which Q groups of quantized data are obtained by quantizing the Q groups of multi-valued image data according to the contents of the embodiment described above. After that, at least one group of quantized data of the Q groups of quantized data is divided to obtain N groups of quantized data that correspond to the N number of printing element groups. For example, when N is 4, first multi-valued image data that is common for the first and second printing element groups, and second multi-valued image data that is common for the third and fourth printing element groups are generated, and quantization processing is performed for this first and second multi-valued image data. As is clear from the explanation above, when using N number of printing element groups, it is possible to generate P groups of multi-valued image data (where P is less than N), or it is possible to generate N groups of multi-valued image data. In short, in the present invention, first multi-valued image data that corresponds to at least one printing element group from among N number of printing element groups, and second multi-value image that corresponds to at least one other printing element group from among a N number of printing element groups are generated.

There is a printing apparatus mounting a connecting type printing head (connecting head) is cited as another construction for printing by using a plurality of printing element groups. In the connecting head, a plurality of printing element groups arrange in a printing elements arraying direction being out of line each other such that they have overlap regions in a direction crossing the printing elements arraying direction. The present invention can be applied to a printing apparatus using such connecting head.

Figure 27:
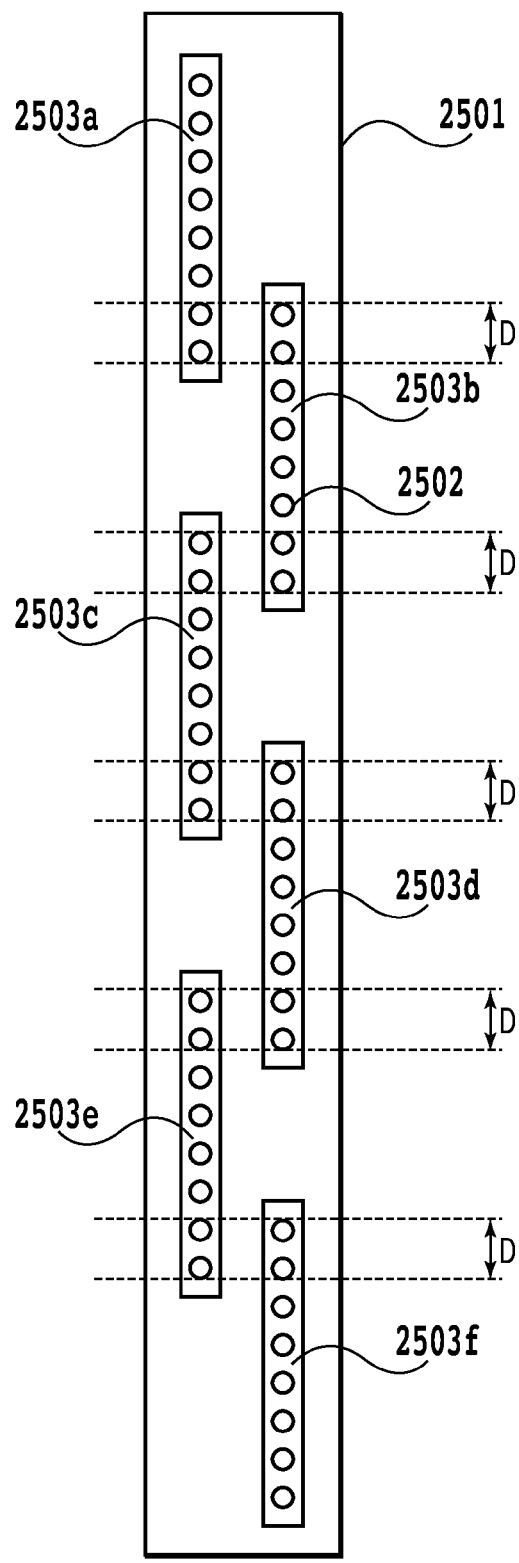
FIG. 27 is a schematic diagram of a printing head of connecting type.

FIG. 27 is a schematic diagram of a print head 2501 of connecting type. According to FIG. 27, in the print head 2501, head chips 2503*a* to 2503*f* each of which has nozzle arrays comprising of a plurality of nozzle 2502 (printing element) are arranged checkerwise, and there are overlap regions D between two head chips. There are two principal type of printing system which uses the connecting head. One is a system in which the print head 2501 scans indirection crossing the printing element arraying direction to print while a printing medium is conveyed in the printing element arraying direction, such as the apparatus illustrated in FIG. 5. The other is a system in which the print head 2501 is fixed and a printing medium is conveyed in direction crossing the printing element arraying direction to perform printing. The present invention can be applied to either printing system as long as the printing apparatus uses a connecting type print head.

For this kind of printing apparatus, the input multi-value image data (256-value RGB data) corresponding to a overlap region is converted into two set of multi-value data (CMYK data) corresponding to two printing element groups for each pixel by the color conversion/image data division processing unit 82. These two multi-value image data undergo gradation correction process (density correction process) by a gradation correction process unit respectively. By doing this, multi-vale data for the first printing element group and multi-value data for the second printing element group are generated from input image data corresponding to the overlap region.

Next, the multi-value data for the first printing element group and the second printing element group that are processed the gradation correction process, then, undergoes quantization processing by a quantization process unit 85. For result of the quantization process, a binary image data for the first printing element group (a first quantized data) and a binary image data for the second printing element group (a second quantized data) are generated. After that, the binary image data for the first printing element group is sent to the first printing element group and the binary image data for the second printing element group is sent to the second printing element group. In addition, the first printing element group is driven according to the binary image data for the first printing element group and the second printing element group is driven according to the binary image data for the second printing element group.

(Other Embodiments)

In the first thru sixth embodiments described above, examples were explained in which a print head having two nozzle arrays (printing element groups) each for discharging ink of the same color were prepared; however, the present invention is not limited to two nozzle arrays (printing element groups) for ejecting ink of the same color. The number of nozzle arrays (printing element groups) for ejecting ink of the same color could be N (N is an integer 1 or greater) such as 1, 4 or 8.

In the embodiment above, when quantizing multi-valued image data that corresponds to a relative movement, all of the multi-valued image data that corresponds to all other relative movements are taken into consideration, however, the present invention is not limited to this. For example, in the 3-pass mode, when quantizing three groups of multi-valued image data that corresponds to three relative movements, two groups of multi-valued image data are quantized taking each other into consideration, and the remaining one group of multi-valued image data can be quantized independently without taking the other two groups of multi-valued image data into consideration. Even in this case, it is possible to control the dot overlap rate of dots that are printed in one relative movement and the dots that are printed in another relative movement, so it is possible to obtain the effect of improving robustness and reduce graininess.

Moreover, in the embodiments described above, the case of using four colors of ink, CMYK, was explained; however, the type and number of colors of ink that can be used is not limited to this. It is also possible to add special color inks to the four colors of ink, such as light cyan (Lc) and light magenta (Lm), or red ink (R) and blue ink (B). In addition, in the embodiments described above, the case of executing the color printing mode in which a plurality of color inks are used was explained; however, the invention can also be applied to a mono color mode in which only a single color ink is used. In that case, a plurality of single-color density data that corresponds to a plurality of relative movements is generated from the input image data (RGB). Furthermore, the present invention can be applied to either a color printer or a monochromic printer.

In the embodiments described above, a printing head having a plurality of nozzles arrays that are integrated in a parallel arrangement as illustrated in FIG. 20 is used; however, the present invention is not limited to this form. The nozzle arrays that discharge ink of the same color can be one array at a time, or a plurality of nozzle arrays that discharge ink of the same color and be arranged in a parallel arrangement on one printing head. Moreover, each nozzle array could be arranged on a different printing head. When the number of printing heads is increased in this way, a further increase in printing position displacement between nozzle arrays for the same printing scan can be expected.

Furthermore, in the embodiments described above, the case of using a printer having an electrical block diagram as illustrated in FIG. 3 to FIG. 4 was explained; however, the present invention is not limited to this kind of construction. For example, the printer control unit and printer engine unit were explained as being separate independent modules; however, the control unit and printer engine unit can share the same ASIC, CPU, ROM and RAM. In addition, in the figures, the control unit and printer engine unit are connected by a general I/F such as a USB or IEEE1284; however, the present invention can use any connection method. Moreover, connection from a PC takes the form of direct connection to the printer engine unit via a USB HUB; however the control unit can also relay the image data. Furthermore, as necessary, the control unit can send image data from the PC to the printer engine after performing suitable image processing of the image data.

In the embodiments described above, construction in which the image processing up through quantization was executed by the control unit 3000, and processing after that was executed by the printer engine 3004 was explained; however, the invention is not limited to that kind of construction. As long as the series of processes described above are executed, any form and any processing method, regardless of hardware or software, is within the scope of the present invention.

In the embodiments described above, an image processing apparatus that executes the characteristic image processing of the present invention was explained using a printer that comprises a control unit 3000 having an image processing function as an example; however, the invention is not limited to this kind of construction. The characteristic image processing of the present invention could be executed by a host device in which a printer driver is installed (for example, the PC 3010 in FIG. 3), or construction could be such that image data is input to the printer after performing quantization processing or division processing. In such a case, the host device (external device) that is connected to the printer corresponds to the image processing apparatus of the present invention. The characteristic image processing of the present invention is a process of quantizing second multi-valued image data that corresponds to at least one relative movement based on first multi-valued image data that corresponds to at least another relative movement, and quantizes the first multi-valued image data based on the second multi-valued image data.

The invention can also be realized by program code of a program that can be read by a computer in order achieve the image processing functions described above, or a memory medium that stores that program code. In that case, the image processing described above is realized by a computer (or CPU or MPU) of a host device or image formation device reading and executing the program code. The program that can be read by a computer and cause the computer to execute the image processing described above in this way, and the memory medium that stores that program are also included in the present invention.

It is possible to use a memory medium such as a floppy (registered trademark) disk, hard disk, optical disk, magneto optical disk, CD-ROM, CD-R, magnetic tape, non-volatile memory card and ROM as the memory medium for supplying the program code.

Moreover, by the computer executing the read program code, not only can the functions of the embodiments described above be realized, but it is also possible for the OS of the computer to perform part or all of the actual processing based on the instructions of that program code. Furthermore, after the program code has been written on the function expansion board installed in the computer, or function expansion unit that is connected to the computer, the CPU or the like can perform part or all of the actual processing based on the instructions of that program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-145719, filed Jun. 18, 2009, which is hereby incorporated by reference herein in its entirety.

What is claimed is:

1. An image processing apparatus for processing input image data that corresponds to a pixel area in order to perform printing in the pixel area by a plurality of relative movement including a first relative movement and a second relative movement of a print unit with respect to a printing medium, comprising:
   a generation unit configured to generate, based on the input image data, first multi-valued image data that corresponds to the first relative movement and second multi-valued image data that corresponds to the second relative movement; and a quantization unit configured to perform quantization processing of the second multi-valued image data based on the first multi-valued image data, and perform quantization processing of the first multi-valued image data based on the second multi-valued image data.

2. The image processing apparatus according to claim 1, wherein
the quantization processing is error diffusion processing, and
the quantization unit sets threshold values, which are used when performing error diffusion processing of the first multi-valued image data, based on the second multi-valued image data, and performs error diffusion processing of the first multi-valued image data based on the set threshold values, and sets threshold values, which are used when performing error diffusion processing of the second multi-valued image data, based on the first multi-valued image data, and performs error diffusion processing of the second multi-valued image data based on the set threshold values.

3. The image processing apparatus according to claim 1, wherein
the generation unit further generates third multi-valued image data that corresponds to a third relative movement among the plurality of relative movements,
the quantization processing is error diffusion processing, and
the quantization unit sets threshold values, which are used when performing error diffusion processing of the first multi-valued image data, based on the second and third multi-valued image data, and performs error diffusion processing of the first multi-valued image data based on the set threshold values; sets threshold values, which are used when performing error diffusion processing of the second multi-valued image data, based on the first and third multi-valued image data, and performs error diffusion processing of the second multi-valued image data based on the set threshold values; and sets threshold values, which are used when performing error diffusion processing of the third multi-valued image data, based on the first and second multi-valued image data, and performs error diffusion processing of the third multi-valued image data based on the set threshold values.

4. The image processing apparatus according to claim 3, wherein the quantization unit sets a threshold value, which is used when performing error diffusion processing of the first multi-valued image data, based on the sum of the second and third multi-value data or the maximum value of the second and third multi-valued image data; sets the threshold value, which is used when performing error diffusion processing of the second multi-valued image data, based on the sum of the first and third multi-valued image data or the maximum value of the first and third multi-valued image data; and sets the threshold value, which is used when performing error diffusion processing of the third multi-valued image data, based on the sum of the first and second multi-valued image data or the maximum value of the first and second multi-valued image data.

5. The image processing apparatus according to claim 1, wherein the quantization unit generates binary quantized data by binary quantization processing.

6. The image processing apparatus according to claim 1, wherein the quantization unit generates L-value quantized data by L-value (L is an integer 3 or greater) quantization processing that uses an error diffusion method, and converts the L-value quantized data to binary quantized data by using dot patterns.

7. The image processing apparatus according to claim 1, wherein the generation units has a table that correlates the input image data with at least the first and second multi-valued image data, and uses that table to convert the input image data to at least the first multi-valued image data and the second multi-valued image data.

8. The image processing apparatus according to claim 1, wherein the input image data is RGB data.

9. An image processing apparatus for processing input image data that corresponds to a pixel area in order to execute printing in the pixel area by a plurality of relative movements of a print unit and a printing medium, comprising:
a generation unit configured to generate, based on the input image data, first multi-valued image data that corresponds to at least one relative movement among the plurality of relative movements and second multi-valued image data that corresponds to at least one other relative movement among the plurality of relative movements; and
a quantization unit configured to perform quantization processing of the second multi-valued image data based on the first multi-valued image data, and perform quantization processing of the first multi-valued image data based on the second multi-valued image data.

10. The image processing apparatus according to claim 9, wherein
the plurality of relative movements is at least three relative movements, and
the first multi-valued image data corresponds to at least two relative movements.

11. The image processing apparatus according to claim 9, wherein
the plurality of relative movements is at least four relative movements,
the first multi-valued image data corresponds to at least two relative movements, and
the second multi-valued image data corresponds to at least two relative movements.

12. An image processing apparatus for processing input image data that corresponds to a pixel area in order to print in the pixel area by a relative movement of a plurality of printing element groups, which eject ink of the same color in nearly equal amount, with respect to a printing medium, comprising:
a generation unit configured to generate, based on the input image data, first multi-valued image data that corresponds to at least one printing element group among the plurality of printing element groups and second multi-valued image data that corresponds to at least one other printing element group among the plurality of printing element groups; and
a quantization unit configured to perform quantization processing of the second multi-valued image data based on the first multi-valued image data, and perform quantization processing of the first multi-valued image data based on the second multi-valued image data.

13. The image processing apparatus according to claim 12, wherein
the plurality of printing element groups are arranged in a printing elements arraying direction being out of line each other such that the plurality of printing element groups have overlap regions in a direction crossing the printing elements arraying direction, and
the generation unit, based on the input image data corresponding to the overlap region, generates a first multi-value image data that corresponds to one printing element group related to the overlap region and a second multi-value image data that corresponds to the other printing element group related to the overlap region.

14. The image processing apparatus according to claim 12, wherein:
the quantization processing is error diffusion processing, and
the quantization unit sets threshold values, which are used when performing error diffusion processing of the first multi-valued image data, based on the second multi-valued image data, and performs error diffusion processing of the first multi-valued image data based on the set threshold values, and sets threshold values, which are used when performing error diffusion processing of the second multi-valued image data, based on the first multi-valued image data, and performs error diffusion processing of the second multi-valued image data based on the set threshold values.

15. An image processing apparatus for processing input image data that corresponds to a pixel area in order to perform printing in the pixel area by a plurality of relative movements of a first printing element group for discharging a first color of ink and a second printing element group for discharging a second color of ink with respect to a printing medium, comprising:
a generation unit configured to generate, based on the input image data, first multi-valued image data for the first printing element group that corresponds to a preceding relative movement, second multi-valued image data for the second printing element group that corresponds to the preceding relative movement, third multi-valued image data for the first printing element group that corresponds to a following relative movement, and fourth multi-valued image data for the second printing element group that corresponds to the following relative movement; and
a quantization unit configured to perform quantization processing of the first multi-valued image data based on the second, third and fourth multi-valued image data, perform quantization processing of the second multi-valued image data based on the first, third and fourth multi-valued image data, perform quantization processing of the third multi-valued image data based on the first, second and fourth multi-valued image data, and perform quantization processing of the fourth multi-valued image data based on the first, second and third multi-valued image data.

16. The image processing apparatus according to claim 15, wherein the quantization unit sets a threshold value, which is used when performing error diffusion processing of the first multi-valued image data, based on the second, third and fourth multi-valued image data, and performs error diffusion processing of the first multi-valued image data based on the set threshold value; sets a threshold value, which is used when performing error diffusion processing of the second multi-valued image data, based on the first, third and fourth multi-valued image data, and performs error diffusion processing of the second multi-valued image data based on the set threshold value; sets a threshold value, which is used when performing error diffusion processing of the third multi-valued image data, based on the first, second and fourth multi-valued image data, and performs error diffusion processing of the third multi-valued image data based on the set threshold value; and sets a threshold value, which is used when performing error diffusion processing of the fourth multi-valued image data, based on the first, second and third multi-valued image data, and performs error diffusion processing of the fourth multi-valued image data based on the set threshold value.

17. An image processing method executed by an image processing apparatus for processing input image data that corresponds to a pixel area in order to perform printing in the pixel area by a plurality of relative movements, including a first relative movement and second relative movement, of a print unit with respect to a printing medium, comprising the steps of:
generating, based on the input image data, first multi-valued image data that corresponds to the first relative movement and second multi-valued image data that corresponds to the second relative movement; and
performing quantization processing of the second multi-valued image data based on the first multi-valued image data, and performing quantization processing of the first multi-valued image data based on the second multi-valued image data,
wherein a processor of the image processing apparatus executes at least one of the generating and performing steps.

18. An image processing method executed by an image processing apparatus for processing input image data that corresponds to a pixel area in order to perform printing in the pixel area by a plurality of relative movements of a print unit with respect to a printing medium, comprising the steps of:
generating, based on the input image data, first multi-valued image data that corresponds to at least one relative movement among the plurality of relative movements and second multi-valued image data that corresponds to at least one other relative movement among the plurality of relative movements; and
performing quantization processing of the second multi-valued image data based on the first multi-valued image data, and performing quantization processing of the first multi-valued image data based on the second multi-valued image data,
wherein a processor of the image processing apparatus executes at least one of the generating and performing steps.

19. An image processing method executed by an image processing apparatus for processing input image data that corresponds to a pixel area in order to print in the pixel area by a relative movement of a plurality of printing element groups, which eject ink of the same color in nearly equal amount, with respect to a printing medium, comprising the steps of:
generating, based on the input image data, first multi-value data that corresponds to at least one printing element group among the plurality of printing element groups and second multi-valued image data that corresponds to at least one other printing element group among the plurality of printing element groups; and
performing quantization processing of the second multi-valued image data based on the first multi-valued image data, and perform quantization processing of the first multi-valued image data based on the second multi-valued image data,
wherein a processor of the image processing apparatus executes at least one of the generating and performing steps.

20. The image processing method according to claim 19, wherein
the plurality of printing element groups are arranged in a printing elements arraying direction being out of line each other such that the plurality of printing element groups have overlap regions in a direction crossing the printing elements arraying direction, and
in the generation step a first multi-value image data that corresponds to one printing element group related to the overlap region and a second multi-value image data that corresponds to the other printing element group related to the overlap region are generated based on the input image data corresponding to the overlap region.

* * * * *